United States Patent
Miyasaka et al.

(10) Patent No.: US 8,451,704 B2
(45) Date of Patent: May 28, 2013

(54) REFLECTION TYPE WAVELENGTH PLATE AND OPTICAL HEAD DEVICE

(75) Inventors: Koji Miyasaka, Fukushima (JP); Takuji Nomura, Fukushima (JP); Mamoru Isobe, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/450,838

(22) Filed: Apr. 19, 2012

(65) Prior Publication Data

US 2012/0207007 A1  Aug. 16, 2012

Related U.S. Application Data

(63) Continuation of application No. PCT/JP2010/068524, filed on Oct. 20, 2010.

(30) Foreign Application Priority Data

Oct. 20, 2009 (JP) ................................. 2009-241523

(51) Int. Cl.
*G11B 7/00* (2006.01)
(52) U.S. Cl.
USPC ............ 369/112.03; 369/112.09; 369/112.14; 369/112.21; 369/44.12
(58) Field of Classification Search
None
See application file for complete search history.

(56) References Cited

U.S. PATENT DOCUMENTS

| | | | |
|---|---|---|---|
| 6,819,646 B1 * | 11/2004 | Kitaoka et al. | 369/112.01 |
| 7,688,700 B2 * | 3/2010 | Ooi et al. | 369/112.05 |
| 2002/0093902 A1 | 7/2002 | Hirai et al. | |
| 2006/0158977 A1 | 7/2006 | Hirai et al. | |
| 2007/0147218 A1 | 6/2007 | Hirai et al. | |
| 2010/0128593 A1 | 5/2010 | Murata et al. | |
| 2011/0170397 A1 * | 7/2011 | Sato et al. | 369/112.16 |

FOREIGN PATENT DOCUMENTS

| | | |
|---|---|---|
| JP | 2001-093180 A | 4/2001 |
| JP | 2003-098350 A | 4/2003 |
| JP | 3545008 | 4/2004 |
| JP | 2009-217915 A | 9/2009 |
| JP | 2010-267337 A | 11/2010 |
| WO | 2009/017037 A1 | 2/2009 |

OTHER PUBLICATIONS

International Search Report mailed on Jan. 11, 2011, issued for International Application No. PCT/JP2010/068524, filed on Oct. 20, 2010 (with English translation).

International Written Opinion mailed on Jan. 11, 2011, issued for International Application No. PCT/JP2010/068524, filed on Oct. 20, 2010.

* cited by examiner

*Primary Examiner* — Muhammad N Edun
(74) *Attorney, Agent, or Firm* — Oblon, Spivak, McClelland, Maier & Neustadt, L.L.P.

(57) ABSTRACT

A phase difference layer 12 and a reflection layer 13 are provided. Then, adjustment is performed such that the phase difference layer 12 and the reflection layer 13 impart a predetermined phase difference to light having a particular wavelength bandwidth or plural kinds of light of different wavelengths that enter in an oblique direction relative to the normal direction of the plane of the phase difference layer 12. By virtue of this, the light 16a that goes forward and backward through the phase difference layer 12 and then exits the layer has an ellipticity κ of 0.7 or greater. Thus, in particular, when this wave plate is employed in an optical head device, the function of reflection and the function of a ¼-wave plate are integrated. Thus, stable recording and reproduction of an optical disk are achieved, and size reduction is achieved in the optical head device.

20 Claims, 29 Drawing Sheets

REFLECTION TYPE WAVELENGTH PLATE AND OPTICAL HEAD DEVICE

TECHNICAL FIELD

The present invention relates to: a reflection type wave plate for reflecting or alternatively reflecting and transmitting entering light so as to control the polarization state; and an optical head device employing an optical system utilizing this reflection type wave plate so as to record and read information onto and from an optical recording medium such as a CD, a DVD, and a magneto-optic disk or a high-density optical recording medium such as "Blu-ray" (registered trademark: a BD, hereinafter).

BACKGROUND ART

In recent years, for example, as an optical system for optical storage, developments are carried out on optical head devices for recording and reading (referred to as "recording/reading", hereinafter) information onto and from an optical recording medium such as a CD, a DVD, and a magneto-optic disk, as well as a high-density optical recording medium such as a BD (referred to as an "optical disk", hereinafter). In optical devices including optical head devices, wave plates are widely employed for changing the polarization state of entering light. Examples of these include: a ¼-wave plate for converting linearly-polarized entering light into circularly polarized light; and a ½-wave plate for converting linearly-polarized entering light into linearly polarized light whose direction of electric field is different from the direction of electric field of the entering light.

For example, an optical head device employs a polarization beam splitter for separating, by deflection, a forward optical path extending from a light source such as a semiconductor laser to an optical disk and a returning optical path extending from the point of reflection by the optical disk to a photodetector for detecting the light. Here, for the purpose that the polarization beam splitter should achieve a high efficiency of light utilization, a ¼-wave plate is arranged in the optical path between the polarization beam splitter and the optical disk such that the linearly polarized light in the forward-going path and in the return path should be perpendicular to each other. That is, in the forward-going path, first linearly polarized light goes straight and is transmitted through the polarization beam splitter so as to be brought into circularly polarized light by the ¼-wave plate. In contrast, the light of return path reflected by the optical disk is brought into circularly polarized light of reverse polarization and is transmitted through the ¼-wave plate again so as to be brought into second linearly polarized light perpendicular to the first linearly polarized light and then reflected by the polarization beam splitter. Thus, the light is guided to the photodetector with a high efficiency of light utilization.

The ¼-wave plate is arranged as a discrete optical element in the optical head device. However, for the purpose of size reduction of the optical head device, it is considered that the ¼-wave plate is integrated with another optical element. For example, when the function corresponding to a ¼-wave plate is imparted to the surface of a (raise-up) mirror for changing the direction of travel of the laser from the light source by 90°, that is, when an optical element is employed that deflects the direction of travel of entering light by 90° and that converts linearly polarized light into circularly polarized light and circularly polarized light into linearly polarized light, size reduction is realized in the optical head device.

As such a wave plate for reflecting and deflecting entering light and having the function of a ¼-wave plate, an optical head device has been reported in which a wave plate for generating a phase difference of ½ wavelength for light entering in the normal direction of the plane is arranged at an inclination of 45° relative to the optical axis so that the function of reflection of light and the function of a ¼-wave plate are achieved (Patent Document 1).

Further, an optical head device has been reported that employs a wave plate in which entering light is not limited to light of one wavelength, that is, light of two mutually different wavelengths like light having a wavelength of 780 nm for CD and linearly polarized light having a wavelength of 650 nm for DVD are reflected and deflected and in which the function of a ¼-wave plate is provided (Patent Document 2).

PRIOR ART REFERENCES

Patent Documents

Patent Document 1: Japanese Patent Publication No. 3545008
Patent Document 2: Japanese Laid-Open Patent Publication No. 2003-98350

SUMMARY OF THE INVENTION

Problems To Be Solved By The Invention

Nevertheless, in the wave plates described in Patent Documents 1 and 2, when the entering light has a particular band, a satisfactory state of circular polarization is not obtained over the entire band. Thus, a problem is present that fluctuation in the wavelength causes variation in the polarization state of the exiting light so that stable characteristics are not obtained. Further, in the case of entering light of three mutually different wavelengths, a problem is present that desired characteristics are not obtained.

Means for Solving the Problems

The present invention has been devised in order to solve the above-mentioned problems, and provides a reflection type wave plate comprising a phase difference layer having birefringence and a reflection layer for reflecting entering light, wherein as for light entering the phase difference layer and the reflection layer in this order from an oblique direction relative to a normal direction of a plane of the phase difference layer, light having gone forward and backward through the phase difference layer exits in a changed polarization state, and wherein when the entering light has a wavelength $\lambda_1$ with a 20-nm bandwidth, the exiting light has an ellipticity of 0.7 or greater.

Further, the above-mentioned reflection type wave plate is provided in which when the entering light has a wavelength $\lambda_2$ ($\lambda_1 \neq \lambda_2$) with a 20-nm bandwidth, the exiting light has an ellipticity of 0.7 or greater.

Further, the above-mentioned reflection type wave plate is provided in which the wavelength $\lambda_1$ is 770 to 790 nm and the wavelength $\lambda_2$ is 650 to 670 nm.

Further, a reflection type wave plate is provided that comprises a phase difference layer having birefringence and a reflection layer for reflecting entering light, wherein as for light entering the phase difference layer and the reflection layer in this order from an oblique direction relative to a normal direction of a plane of the phase difference layer, light having gone forward and backward through the phase difference layer exits in a changed polarization state, and wherein when the entering light is light of wavelength $\lambda_1$, light of wavelength $\lambda_2$, and light of wavelength $\lambda_3$ ($\lambda_1 \neq \lambda_2 \neq \lambda_3$), the exiting light has an ellipticity of 0.7 or greater.

Further, a reflection type wave plate is provided that comprises a phase difference layer having birefringence and a reflection layer for wavelength-selectively reflecting and transmitting the entering light, wherein as for light entering the phase difference layer and the reflection layer in this order from an oblique direction relative to a normal direction of a plane of the phase difference layer, light reflected by the reflection layer so as to go forward and backward through the phase difference layer and then exit in a changed polarization state has an ellipticity of 0.7 or greater and light transmitted through the reflection layer has an ellipticity of 0.7 or greater.

Further, the above-mentioned reflection type wave plate is provided in which when the entering light is light of wavelength $\lambda_1$, light of wavelength $\lambda_2$, and light of wavelength $\lambda_3$ ($\lambda 1 \neq \lambda_2 \neq \lambda_3$), the light of wavelength $\lambda_1$ and the light of wavelength $\lambda_2$ are reflected and the light of wavelength $\lambda_3$ is transmitted.

Further, a reflection type wave plate is provided that comprises a phase difference layer having birefringence and a reflection layer for wavelength-selectively reflecting and transmitting the entering light, wherein as for light entering the phase difference layer and the reflection layer in this order from an oblique direction relative to a normal direction of a plane of the phase difference layer, light reflected by the reflection layer so as to go forward and backward through the phase difference layer and then exit in a changed polarization state has an ellipticity of 0.7 or greater and light transmitted through the reflection layer has elliptical polarization whose major axis of ellipse is in a direction of approximate ±45° relative to a direction of p-polarized light which is a light component in parallel to an incident plane.

Further, the above-mentioned reflection type wave plate is provided in which when the entering light is light of wavelength $\lambda_1$, light of wavelength $\lambda_2$, and light of wavelength $\pi_3$ ($\lambda_1 \neq \lambda_2 \neq \lambda_3$), the light of wavelength $\lambda_1$ and the light of wavelength $\lambda_2$ are reflected and the light of wavelength $\lambda_3$ is transmitted.

Further, the above-mentioned reflection type wave plate is provided in which the phase difference plate has a first phase difference layer and a second phase difference layer whose slow axes are aligned when viewed from a thickness direction, and in which these layers are stacked in a manner that the slow axis of the first phase difference layer and the slow axes of the second phase difference layer are different from each other.

Further, the above-mentioned reflection type wave plate is provided in which the wavelength $\lambda_1$ is 780 nm, the wavelength $\lambda_2$ is 660 nm, and the wavelength $\lambda_3$ is 405 nm.

Further, the above-mentioned reflection type wave plate is provided in which an antireflection layer is provided on the light-entering side.

Further, the above-mentioned reflection type wave plate is provided in which the entering light is linearly polarized.

Further, an optical head device is provided that comprises: alight source; an objective lens for focusing light emitted from the light source onto an optical disk; and a photodetector for detecting light reflected by the optical disk, wherein the above-mentioned reflection type wave plate is provided in the optical path between the light source and the objective lens.

Further, the above-mentioned optical head device is provided in which the light source emits plural kinds of light of different wavelengths and in which the above-mentioned reflection type wave plate and a reflection mirror are provided in the optical path between the light source and the objective lens.

Further, the above-mentioned optical head device is provided in which the reflection mirror reflects the entering light without changing the phase, or alternatively reflects the light with changing the phase by 180°.

Further, the above-mentioned optical head device is provided in which the reflection mirror brings entering light, having elliptical polarization whose major axis of ellipse is in a direction of approximate ±45° relative to a direction of p-polarized light which is a light component in parallel to an incident plane, into a polarization state of ellipticity of 0.7 or greater.

Effects of the Invention

The present invention provides a reflection type wave plate in which one or plural kinds of light of different wavelengths are used and light entering from an oblique direction is reflected or alternatively reflected and transmitted so that its polarization state is changed and hence stably circularly polarized light exits especially for light of wavelength in a predetermined band. Further, this reflection type wave plate provides an optical head device for recording/reading each optical disk, in which a high efficiency of light utilization is achieved, size reduction is achieved, and stable recording/reading is realized.

MODES FOR CARRYING OUT THE INVENTION

First Embodiment of Reflection Type Wave Plate

Figure 1A:
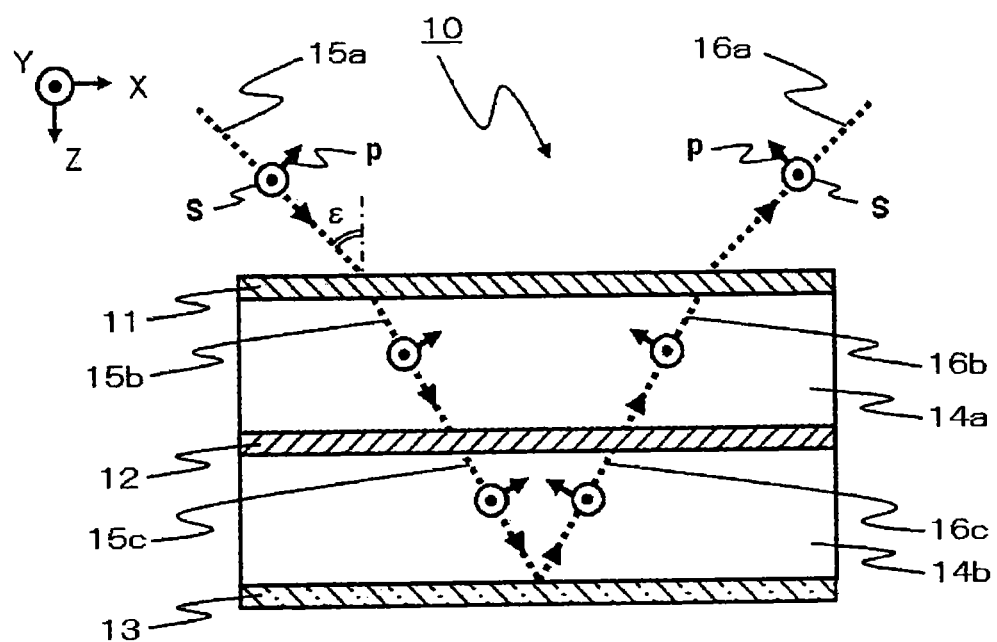
FIG. 1A is a schematic diagram showing a reflection type wave plate according to a first embodiment and a situation of light in the incident plane.

FIG. 1A is a schematic diagram showing the structure of a reflection type wave plate 10 according to the present embodiment and the situation of light entering, reflected by, and exiting the reflection type wave plate 10. The reflection type wave plate 10 has a phase difference layer 12 between a transparent substrate 14a and a transparent substrate 14b. In the transparent substrate 14b, the surface opposite to the phase difference layer 12 is provided with a reflection layer 13. Further, in the transparent substrate 14a, when the surface opposite to the phase difference layer 12 is provided with an antireflection layer 11 as shown in FIG. 1A, a high efficiency of light utilization is obtained and hence this situation is preferable. Further, the reflection type wave plate 10 has an integrated structure. Instead, the phase difference layer 12 may be separated from the transparent substrate 14a and/or the transparent substrate 14b. Further, the transparent substrate 14b may be separated from the reflection layer 13.

Figure 1B:
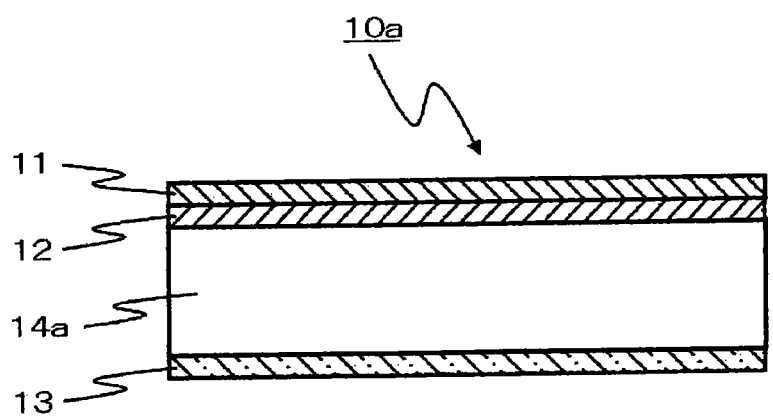
FIG. 1B is a schematic diagram showing another reflection type wave plate according to a first embodiment.
Figure 1C:
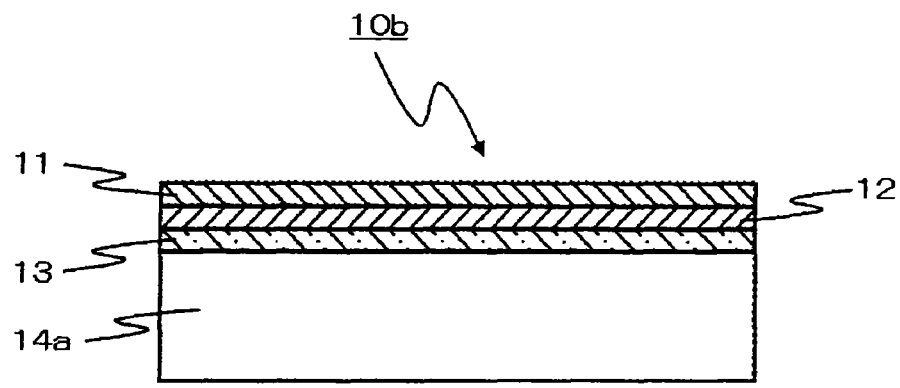
FIG. 1C is a schematic diagram showing another reflection type wave plate according to a first embodiment.

Further, as in a reflection type wave plate 10a shown in FIG. 1B serving as another configuration of the present embodiment, a configuration may be employed that includes: a transparent substrate 14a; a phase difference layer 12 provided on one surface of the transparent substrate 14a; an antireflection layer 11 provided on the phase difference layer 12; and a reflection layer 13 provided on the other surface of the transparent substrate 14a. Further, as in a reflection type wave plate 10b shown in FIG. 1C serving as another configuration of the present embodiment, a configuration may be employed that includes: a transparent substrate 14a; a reflection layer 13 provided on one surface of the transparent substrate 14a; a phase difference layer 12 provided on the reflection layer 13; and an antireflection layer 11 provided on the phase difference layer 12. Here, unless mentioned otherwise, the following description is given for the reflection type wave plate 10 in FIG. 1A among these configurations.

The transparent substrates 14a and 14b may be fabricated from various kinds of materials such as resin board and a resin film, as long as the material is transparent to entering light. However, when an optically isotropic material such as glass and quartz glass is employed, an influence of birefringence is not caused to the transmitted light. Thus, this arrangement is preferable. The antireflection layer 11 may be fabricated from an antireflective multilayer film fabricated by multilayer formation of a high refractive index material and a low refractive index material, or alternatively from a moth-eye structure constructed from concave and convex with a submicron repetition period. Then, a suppressed reflectivity is obtained in the interface and hence a high efficiency of light utilization is realized. Further, it is preferable that the antireflection layer 11 has a structure that suppresses degradation of optical characteristics caused by interference between unnecessary reflected light reflected by interfaces other than the reflection layer 13 and the main reflected light reflected by the reflection layer 13.

It is sufficient for the phase difference layer 12 to be fabricated from a material having birefringence. Examples of this include: an optical crystal such as quartz; a resin film such as polycarbonate in which birefringence is obtained by one-axis extension; and a liquid crystal polymer obtained by polymerization and curing of a liquid crystal monomer. These materials may be integrated with the transparent substrates 14a and 14b. Alternatively, the phase difference layer 12 may be implemented by a structural birefringence or a photonic crystal. Further, as in other embodiments described later, the phase difference layer may be composed of a plurality of layers in place of a monolayer. The reflection layer 13 may be composed of: a reflective multilayer film fabricated by multilayer formation of a high refractive index material and a low refractive index material; a metal reflection film; or the like.

Next, the situation of light is described that enters the reflection type wave plate 10 shown in FIG. 1A in an oblique direction relative to the plane of the antireflection layer 11 and is then reflected by the reflection layer 13 so as to exit in an oblique direction relative to the plane of the antireflection layer 11. In FIG. 1A, the cross section of the reflection type wave plate is denoted by the X-Z plane and the plane of the transparent substrate 14a is denoted by the X-Y plane. Then, light enters at an incident angle $\epsilon$ ($|\epsilon|>0$) relative to the normal direction (the Z-direction) of the plane of the antireflection layer 11.

Here, an orthogonal coordinate system is considered that includes the direction of travel of the light entering the reflection type wave plate 10 in an oblique direction. At that time, in the plane perpendicular to the direction of travel of the light, the light component in the Y-direction parallel to the plane of the transparent substrate 14a is referred to as s-polarized light and the light component in the direction perpendicular to the s-polarized light in the plane is referred to as p-polarized light. Here, the X-Z plane corresponds to the incident plane of the light. Then, the light component in the polarization direction perpendicular to the incident plane may be referred to as s-polarized light and the light component in the polarization direction parallel to the incident plane may be referred to as p-polarized light. This situation holds also in other embodiments of a reflection type wave plate described below. This situation is applicable also for light 15a, light 15b, and light 15c shown in FIG. 1A and for light 16c, light 16b, and light 16a reflected by the reflection layer 13. Here, in the light traveling to the reflection layer 13 and the light reflected by the reflection layer 13, the directions of s-polarized light and p-polarized light are defined as shown in FIG. 1A.

Figure 2A:
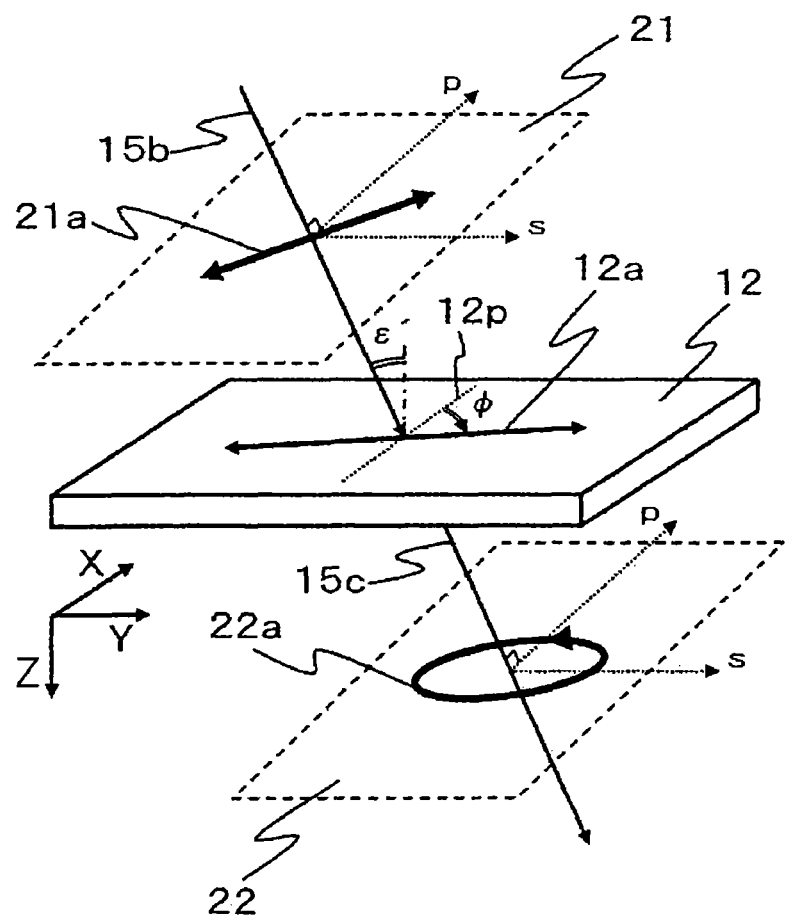
FIG. 2A is a schematic diagram showing a situation of light in a reflection type wave plate.
Figure 2B:
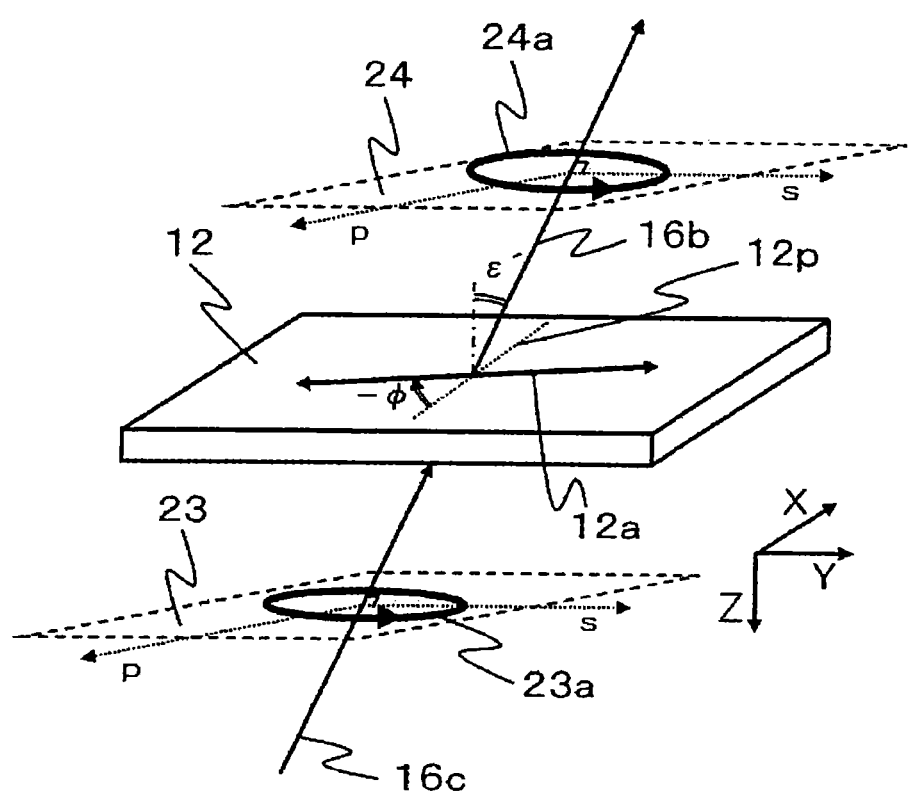
FIG. 2B is a schematic diagram showing a situation of light in a reflection type wave plate.

FIGS. 2A and 2B is a perspective view showing in detail the state of light transmitted through the phase difference layer 12 in the reflection type wave plate 10 in FIG. 1A. FIG. 2A shows the state of light traveling toward the reflection layer 13. FIG. 2B shows the state of light reflected by the reflection layer. Further, when necessary, the reflection type wave plate 10 in FIG. 1A is referred to. Further, the phase difference layer 12 is formed in a manner that the optic axes are aligned in a direction parallel to the X-Y plane and in the thickness direction (the Z-direction). Here, in FIG. 2A, the light 15b incident on the phase difference layer 12 enters at an incident angle $\epsilon'$ ($|\epsilon'|>0$) relative to the normal direction (the Z-direction) of the (X-Y) plane of the phase difference layer 12. Further, when a plane 21 perpendicular to the direction of travel of the light 15b is given, the direction of s-polarization is in the Y-direction parallel to the plane of the phase difference layer 12 and, on the other hand, the direction of p-polarization is in a direction parallel to the plane 21 and perpendicular to the direction of s-polarization.

In an orthogonal coordinate system constructed from the direction of travel of the light 15b, the direction of s-polarization in the plane 21, and the direction of p-polarization in the plane 21, the phase difference layer 12 serves as a phase difference plate having an effective azimuth angle θ and an effective phase difference Γ. Here, the effective azimuth angle θ represents the angle of direction of the optic axis (e.g., the slow axis 12a) of the phase difference layer 12 with reference to the direction of p-polarization in the plane 21. Further, the effective phase difference Γ represents the phase difference imparted to linearly polarized light when the linearly polarized light enters at an effective azimuth angle θ or alternatively when the linearly polarized light enters at an effective azimuth angle θ+90°.

Here, the effective azimuth angle θ and the effective phase difference Γ are obtained by measuring a change in the polarization state between the light 15b and the light 15c. For example, light in a predetermined polarization state may be projected onto the phase difference layer 12 inclined at a predetermined angle (=$\epsilon'$). Then, a change in the polarization state may be measured by the Senarmont method of birefringence measurement or the like. Here, in a case that the refractive index of the transparent substrate 14a in FIG. 1A is different from the refractive index of the transparent substrate 14b, the direction of travel of the light 15b differs from the direction of travel of the light 15c owing to the operation of refraction. Even in this case, when a change in the polarization state is measured between the light 15b and the light 15c, the effective azimuth angle θ and the effective phase difference Γ are obtained.

Further, the direction of p-polarization in the plane 21 is projected to the direction indicated by a straight line 12p in the (X-Y) plane of the phase difference layer 12. Then, the azimuth angle φ is defined with reference to the direction of the straight line 12p. Here, the azimuth angle φ indicates the angle of the optic axis 12a in the X-Y plane in a situation that the positive (+) direction is defined to be the clockwise direction of rotation with reference to the straight line 12p when viewed in the direction of travel of the light 15b. Here, the light 15b exits in the form of the light 15c to which the effective phase difference Γ is imparted by the phase difference layer 12. Here, when the direction of travel of the light 15b is in parallel to the direction of travel of the light 15c, the direction of p-polarization in the plane 21 is parallel to the direction of p-polarization in the plane 22 and the direction of s-polarization in the plane 21 is parallel to the direction of s-polarization in the plane 22.

The reflection layer 13 in FIG. 1A reflects the entering light 15c so as to generate a phase difference $\psi_r$ between the p-polarized light and the s-polarized light. At that time, the ratio of the electric field component of p-polarization of the light 16c reflected by the reflection layer 13 relative to the electric field component of p-polarization of the light 15c is denoted by $r_p$. Further, the ratio of the electric field component of s-polarization of the light 16c reflected by the reflection layer 13 relative to the electric field component of s-polarization of the light 15c is denoted by $r_s$. Then, the phase difference $\psi_r$ is expressed as $$\psi_r = \arg(r_p) - \arg(r_s) \quad (1)$$

Next, the optical operation of the reflection type wave plate 10 is described below with reference to the optical path from the light 15a to the light 16a in FIG. 1A. Here, in the antireflection layer 11, the phase difference generated in the transmitted light is regarded as approximate 0. Also in the following embodiments, approximately 0 is adopted. Further, as for the light 15a entering the reflection type wave plate 10 and the light 16a exiting the reflection type wave plate 10, the function of a wave plate is obtained in which when light of wavelength λ enters, circularly polarized light exits. For example, even when the light 15a enters in the form of linearly polarized light, the light 16a exits in the form of circularly polarized light. On the other hand, in the case of a wave plate having the function of changing linearly polarized light into circularly polarized light, when the light 15a enters in the form of circularly polarized light, the light 16a exits in the form of linearly polarized light. Here, in the following description, the light 15 in the form of linearly polarized light enters the reflection type wave plate 10, unless mentioned otherwise.

After transmitting through the antireflection layer 11, the light 15a of linear polarization is refracted by the transparent substrate 14a and then enters the phase difference layer 12 as the light 15b that becomes the light 21a of linear polarization in the plane 21 in FIG. 2A. In the phase difference layer 12, the effective azimuth angle θ and the effective phase difference Γ described above are imparted to the light 15b so that the polarization state is changed and then the light 15b is transmitted as the light 15c. Here, the light 15c becomes the light 22a of elliptical polarization in the plane 22 perpendicular to the direction of travel of the light 15c, and then travels toward the reflection layer 13. Here, the refractive index of the transparent substrate 14a is assumed to be equal to the refractive index of the transparent substrate 14b. Further, the direction of travel of the light 15b is assumed to be approximately the same as the direction of travel of the light 15c, and the direction of travel of the light 16b described later is assumed to be approximately the same as the direction of travel of the light 16c.

Then, the light 15c is reflected by the reflection layer 13 so that a phase difference $\psi_r$ is imparted and hence the light 15c becomes the light 16c whose polarization state has been changed further. Further, when a plane 23 perpendicular to the direction of travel of the light 16c is given, the direction of s-polarization is in the Y-direction parallel to the plane of the phase difference layer 12 and, on the other hand, the direction of p-polarization is in a direction parallel to the plane 23 and perpendicular to the direction of s-polarization. Here, before and after the reflection by the reflection layer 13, the direction of p-polarization is different. Then, when the light 16c that becomes light 23a of elliptical polarization in the plane 23 enters the phase difference layer 12 again, an effective azimuth angle −θ and an effective phase difference Γ are imparted. Here, the effective azimuth angle has a sign reverse to that of the light traveling toward the reflection layer 13.

This is because the azimuth angle of the light 16c reflected by the reflection layer 13 and then entering the phase difference layer 12 is defined as the angle of the optic axis 12a in a situation that the positive (+) direction is defined as the clockwise direction with reference to the straight line 12p when viewed in the direction of travel of the light 16c in the X-Y plane of the phase difference layer 12, thus, in this case, the azimuth angle is equal to −ϕ. Accordingly, the effective azimuth angle has a reverse sign and hence is equal to −θ. Thus, in the phase difference layer 12, when the effective phase difference Γ is imparted, the light 16c becomes the light 16b whose polarization state has been changed further. Further, when a plane 24 perpendicular to the direction of travel of the light 16b is given, light 24a of approximately circular polarization is obtained in the plane 24.

Next, for the purpose of obtaining the above-mentioned optical effects, the reflection type wave plate is formulated by using the Stokes parameter and the Mueller matrix. In general, the Stokes parameter is expressed by a four-dimensional vector ($S_0$, $S_1$, $S_2$, $S_3$). Here, $S_0$ indicates the luminance of light, $S_1$ indicates the intensity of polarized light at 0°, $S_2$ indicates the intensity of polarized light at 45°, and $S_3$ indicates the intensity of circularly polarized light. In the following description, the intensity $S_0$ of polarized light is omitted (assumed to be $S_0=1$) so that a three-dimensional vector ($S_1$, $S_2$, $S_3$) is employed. Further, the Mueller matrix of 3×3 is employed. Then, the Stokes parameter for linearly polarized light of p-polarization is defined as (1, 0, 0).

Here, the Mueller matrix representing a phase difference plate having an effective azimuth angle θ and an effective phase difference Γ is denoted by A. The Mueller matrix representing a phase difference plate having an azimuth angle of 0° and a phase difference $\psi_r$ is denoted by B. The Mueller matrix representing a phase difference plate having an effective azimuth angle of −θ and an effective phase difference Γ is denoted by C. These Mueller matrices are expressed respectively as Formulas (2a) to (2c). The Mueller matrices A, B, and C correspond respectively to: the phase difference layer 12 for the light traveling toward the reflection layer 13; the reflection layer 13; and the phase difference layer 12 for the light reflected by the reflection layer 13. Then, the Mueller matrix D representing the reflection type wave plate is expressed as D=CBA.

[Mathematical Expression 1]

$$A = \begin{pmatrix} \cos^2 2\theta + \sin^2 2\theta \cos\Gamma & \cos 2\theta \sin 2\theta (1 - \cos\Gamma) & -\sin 2\theta \sin\Gamma \\ \cos 2\theta \sin 2\theta (1 - \cos\Gamma) & \sin^2 2\theta + \cos^2 2\theta \cos\Gamma & \cos 2\theta \sin\Gamma \\ \sin 2\theta \sin\Gamma & -\cos 2\theta \sin\Gamma & \cos\Gamma \end{pmatrix} \quad (2a)$$

$$B = \begin{pmatrix} 1 & 0 & 0 \\ 0 & \cos\psi_r & \sin\psi_r \\ 0 & -\sin\psi_r & \cos\psi_r \end{pmatrix} \quad (2b)$$

$$C = \begin{pmatrix} \cos^2 2\theta + \sin^2 2\theta \cos\Gamma & -\cos 2\theta (1 - \cos\Gamma) & \sin 2\theta \sin\Gamma \\ -\cos 2\theta (1 - \cos\Gamma) & \sin^2 2\theta + \cos^2 2\theta \cos\Gamma & \cos 2\theta \sin\Gamma \\ -\sin 2\theta \sin\Gamma & -\cos 2\theta \sin\Gamma & \cos\Gamma \end{pmatrix} \quad (2c)$$

When linearly polarized light of p-polarization or s-polarization enters the reflection type wave plate 10, $S_{3o}$ which is the $S_3$ component of the Stokes parameter of the light 16a is expressed as Formula (3). Here, the negative (−) sign in the first term on the right-hand side of Formula (3) indicates a case of entering of p-polarized light. The positive (+) sign indicates a case of entering of s-polarized light. Here, "o" in $S_{3o}$ indicates that the light exits (out) the reflection type wave plate.

[Mathematical Expression 2]

$$S_{3o} \pm \sin 2\theta \{\sin \Gamma(\cos^2 2 + \sin^2 2\theta \cos \Gamma) + \sin \Gamma \cos \psi_r [\cos^2 2\theta(1-\cos \Gamma) - \cos \Gamma] + \cos 2\theta \sin \psi_r [\cos \Gamma(1-\cos \Gamma) + \sin^2 \Gamma]\} \quad (3)$$

Further, a situation is considered that the light 15a having a polarization state different from the linearly polarized light of p-polarization or s-polarization enters the reflection type wave plate 10. At that time, among the entering light components, when the ratio of the electric field intensity in the direction of the s-polarized light to the electric field intensity in the direction of the p-polarized light is denoted by $\tan \alpha$ and the difference between the phase of the electric field in the direction of the s-polarized light and the phase of the electric field in the direction of the p-polarized light is denoted by $\delta$, $S_{3o}$ which is the $S_3$ component of the Stokes parameter of the light 16a is expressed as Formula (4).

[Mathematical Expression 3]

$$S_{3o} = \xi \cos 2\alpha + \eta \sin 2\alpha \cos \delta + \zeta \sin 2\alpha \sin \delta \quad (4)$$

Here, $\xi$, $\eta$, and $\zeta$ in Formula (4) are expressed respectively as Formulas (5a) to (5c).

[Mathematical Expression 4]

$$\xi = -\sin 2\theta \{\sin \Gamma(\cos^2 2\theta + \sin^2 2\theta \cos \Gamma) + \sin \Gamma \cos \psi_r [\cos^2 2\theta(1-\cos \Gamma)] + \cos 2\theta \sin \psi_r [\cos \Gamma(1-\cos \Gamma) + \sin^2 \Gamma]\} \quad (5a)$$

$$\eta = -\sin 2\theta \sin \Gamma \cos 2\theta \sin 2\theta 1 - \cos \Gamma) - (\cos 2\theta \sin \Gamma \cos \psi_r + \cos \Gamma \sin \psi_r)(\sin^2 2\theta + \cos^2 2\theta \cos \Gamma) + (\cos 2\theta \sin \Gamma \sin \psi_r - \cos \Gamma \cos \psi_r) \cos 2\theta \sin \Gamma \quad (5b)$$

$$\zeta = \sin^2 2\theta \sin^2 \Gamma - \cos 2\theta \sin \Gamma(\cos 2\theta \sin \Gamma \cos \psi_r + \cos \Gamma \sin \psi_r) - \cos \Gamma(\cos 2\theta \sin \Gamma \sin \psi_r - \cos \Gamma \cos \psi_r) \quad (5c)$$

The $S_3$ component $(S_{3o})$ of the Stokes parameter and the ellipticity $\kappa$ are in the following relation with each other.

$$\kappa = \tan(\sin^{-1}(S_3)/2) \quad (6)$$

Here, the ellipticity $\kappa$ indicates the ratio of the minor axis to the major axis of the ellipse for the light 24a of (elliptical) circular polarization in the plane 24 perpendicular to the direction of travel of the light 16b in FIG. 2B. Then, the ellipticity $\kappa=1$ holds for completely circularly polarized light. Then, when $|S_{3o}|$ is 0.94 or greater, the ellipticity $\kappa$ becomes 0.7 or greater. Thus, this situation is preferable. When $|S_{3o}|$ is 0.96 or greater, the ellipticity $\kappa$ becomes 0.75 or greater. Thus, this situation is more preferable. When $|S_{3o}|$ is 0.976 or greater, the ellipticity $\kappa$ becomes 0.8 or greater. Thus, this situation is still more preferable. Further, for light having a wavelength band around a particular wavelength and entering the reflection type wave plate 10, when $|S_{3o}|$ is 0.94 or greater, light of circular polarization ($\kappa \geq 0.7$) above a certain level is obtained even in case of presence of fluctuation in the wavelength of the entering light. Thus, this situation is preferable. Further, in place of a case that the entering light has one particular wavelength band, setup may be such that $|S_{3o}|$ should be 0.94 or greater even for light of a plurality of discrete wavelength bands, for example, light of wavelength $\lambda_1$ and wavelength $\lambda_2$ ($\lambda_1 \neq \lambda_2$) having a predetermined wavelength bandwidth. Here, when the center wavelength is expressed by $\lambda_c$ [nm], it is preferable that the wavelength bandwidth is in the range from $(\lambda_c-10)$ nm to $(\lambda_c+10)$ nm. Further, the range from $(\lambda_c-20)$ nm to $(\lambda_c+20)$ nm is more preferable.

Second Embodiment of Reflection Type Wave Plate

Figure 3:
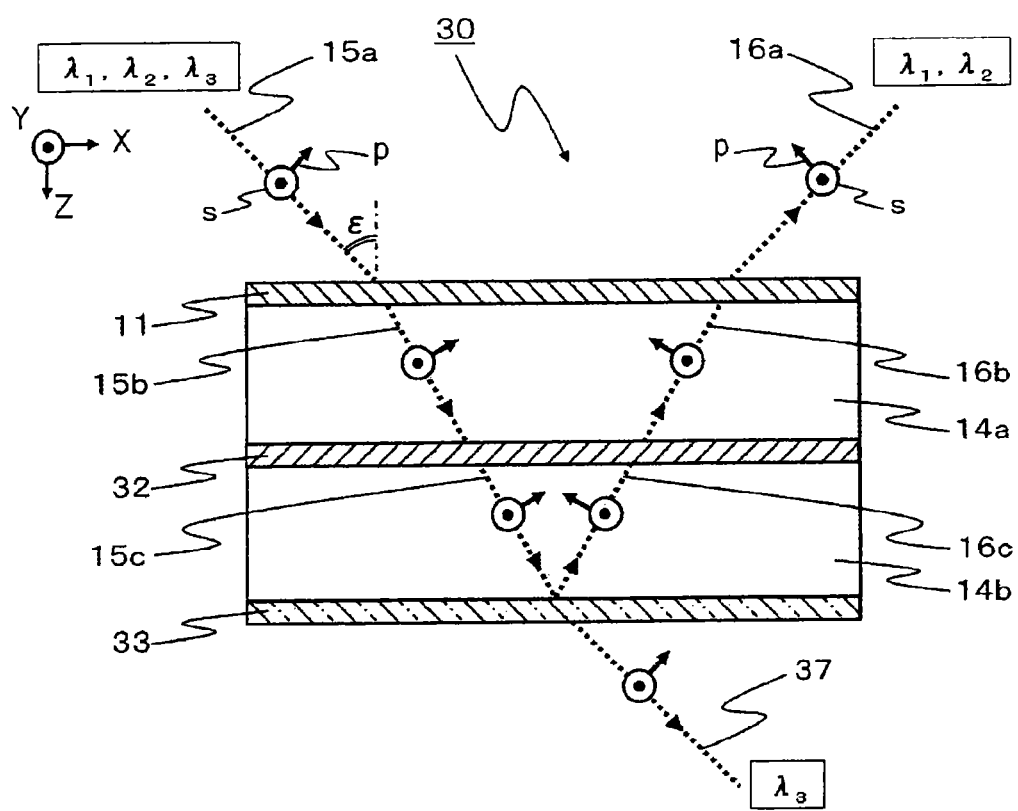
FIG. 3 is a schematic diagram showing a reflection type wave plate according to a second embodiment and a situation of light in the incident plane.

FIG. 3 is a schematic diagram showing the structure of a reflection type wave plate 30 according to the present embodiment and the situation of light entering, transmitted through or reflected by, and exiting the reflection type wave plate 30. Further, in the reflection type wave plate 30, like sites to those of the reflection type wave plate 10 according to the first embodiment are designated by like numerals. Then, duplicated description is omitted. The reflection type wave plate 30 has a phase difference layer 32 between the transparent substrate 14a and the transparent substrate 14b. Then, in the transparent substrate 14b, the surface opposite to the phase difference layer 32 is provided with a reflection layer 33. Here, as described later, the reflection layer 33 has the function of wavelength-selectively reflecting the entering light.

The reflection type wave plate 10 according to the first embodiment has served as a wave plate for reflecting one-component light or alternatively light of wavelength $\lambda_1$ and/or light of wavelength $\lambda_2$ ($\lambda_1 \neq \lambda_2$) having a particular wavelength bandwidth so as to bring linearly polarized light or elliptically polarized light into circularly polarized light and then emit the light. However, the reflection type wave plate 30 according to the present embodiment serves also as a wave plate for transmitting light of wavelength $\lambda_3$ ($\lambda_1 \neq \lambda_2 \neq \lambda_3$) having a particular wavelength bandwidth so as to emit the light as circularly polarized light. The phase difference layer 32 is fabricated from a material having birefringence, a structural birefringence, a photonic crystal, or the like. The reflection layer 33 has a function of wavelength-selective reflection so as to reflect entering light of wavelength $\lambda_1$ and light of wavelength $\lambda_2$ at high reflectivities and transmit entering light of wavelength $\lambda_3$ at a high transmissivity. The reflection layer 33 is composed of a reflective multilayer film fabricated by multilayer formation of a high refractive index material and a low refractive index material. Further, in the reflection type wave plate 30 in FIG. 3, the definitions of the direction of p-polarized light and the direction of s-polarized light are the same as those in the reflection type wave plate 10 according to the first embodiment.

Next, the operation of light of each wavelength that enters the reflection type wave plate 30 is described below. The reflection type wave plate 30 is designed such that $|S_{3o}|$ shown in Formula (3) or (4) should have a desired value for light of wavelength $\lambda_1$ and/or light of wavelength $\lambda_2$ by using the above-mentioned Formulas (2a) to (2c). On the other hand, the phase difference layer 32 of the reflection type wave plate 30 has an effective azimuth angle $\theta(\lambda_3)$ and an effective phase difference $\Gamma(\lambda_3)$ for light of wavelength $\lambda_3$. Further, the reflection layer 33 has the function of transmitting light of wavelength $\lambda_3$. At that time, a phase difference $\psi_t$ is assumed to be generated in the reflection layer 33.

Here, the operation of the reflection type wave plate 30 onto light of wavelength $\lambda_3$ is formulated by using the Stokes parameter and the Mueller matrix. Similarly to the first embodiment, it is assumed that the Stokes parameter is a three-dimensional vector $(S_1, S_2, S_3)$ and that the Mueller matrix is a 3×3 matrix. Further, the Stokes parameter for linearly polarized light of p-polarization is defined as $(1, 0, 0)$. Then, when the Mueller matrix having an effective azimuth angle $\theta(\lambda_3)$ and an effective phase difference $\Gamma(\lambda_3)$ for light of wavelength $\lambda_3$ is denoted by $A(\lambda_3)$ and the Mueller matrix representing a phase difference plate having an azimuth angle of 0° and a phase difference $\psi_t$ is denoted by $B(\lambda_3)$, these Mueller matrices are expressed respectively as Formulas (7a) and (7b).

[Mathematical Expression 5]

$$A(\lambda_3) = \begin{pmatrix} \cos^2 2\theta + \sin^2 2\theta \cos\Gamma & \cos 2\theta \sin 2\theta (1 - \cos\Gamma) & -\sin 2\theta \sin\Gamma \\ \cos 2\theta \sin 2\theta (1 - \cos\Gamma) & \sin^2 2\theta + \cos^2 2\theta \cos\Gamma & \cos 2\theta \sin\Gamma \\ \sin 2\theta \sin\Gamma & -\cos 2\theta \sin\Gamma & \cos\Gamma \end{pmatrix} \quad (7a)$$

$$B(\lambda_3) = \begin{pmatrix} 1 & 0 & 0 \\ 0 & \cos\psi_t & \sin\psi_t \\ 0 & -\sin\psi_t & \cos\psi_t \end{pmatrix} \quad (7b)$$

The Mueller matrices $A(\lambda_3)$ and $B(\lambda_3)$ correspond respectively to: the phase difference layer 32 for the light traveling toward the reflection layer 33; and the reflection layer 33. Then, the Mueller matrix $C_t(\lambda_3)$ representing the operation of the light of wavelength $\lambda_3$ transmitting through the reflection type wave plate 30 is expressed as $C_t(\lambda_3) = B(\lambda_3)A(\lambda_3)$. Here, in Formula (7a), $\theta(\lambda_3)$ is denoted by $\theta$ and $\Gamma(\lambda_3)$ is denoted by $\Gamma$.

Further, among the entering light components, when the ratio of the electric field intensity in the direction of the s-polarized light to the electric field intensity in the direction of the p-polarized light is denoted by tan α and the difference between the phase of the electric field in the direction of the s-polarized light and the phase of the electric field in the direction of the p-polarized light is denoted by δ, $S_{3ot}$ which is the $S_3$ component of the Stokes parameter of the light 37 transmitted through the reflection type wave plate 30 is expressed as Formula (8).

[Mathematical Expression 6]

$$S_{3ot} = \xi \cos 2\alpha + \eta \sin 2\alpha \cos\delta + \zeta \sin 2\alpha \sin\delta \quad (8)$$

Here, ξ, η, and ζ in Formula (8) are expressed respectively as Formulas (9a) to (9c).

[Mathematical Expression 7]

$$\xi = -\sin\psi_t \sin 2\theta \cos 2\theta (1 - \cos\Gamma) + \sin 2\theta \sin\Gamma \cos\psi_t \quad (9a)$$

$$\eta = -\sin\psi_t (\sin^2 1\theta + \cos^2 2\theta \cos\Gamma) - \cos\psi_t \cos 2\theta \sin\Gamma \quad (9b)$$

$$\zeta = -\sin\psi_t \cos 2\theta \sin\Gamma + \cos\psi_t \cos\Gamma \quad (9c)$$

Here, the $S_3$ component ($S_{3ot}$) of the Stokes parameter and the ellipticity κ have the relation of the above-mentioned Formula (6). Thus, when $|S_{3ot}|$ is 0.94 or greater, the ellipticity κ becomes 0.7 or greater. Thus, this situation is preferable. When $|S_{3ot}|$ is 0.96 or greater, the ellipticity κ becomes 0.75 or greater. Thus, this situation is more preferable. When $|S_{3ot}|$ is 0.976 or greater, the ellipticity κ becomes 0.8 or greater. Thus, this situation is still more preferable. Further, the phase difference layer 32 and the reflection layer 33 are designed such that when any one or both of the light of wavelength $\lambda_1$ and the light of wavelength $\lambda_2$ having a different wavelength band from the light of wavelength $\lambda_3$ are incident, the light reflected or transmitted through the reflection type wave plate 30 has an ellipticity κ of 0.7 or greater. This provides the function of a wave plate that reflects or transmits entering light in a wavelength-selective manner so as to separate the light by deflection and that emits the light of whichever wavelength as circularly polarized light.

Third Embodiment of Reflection Type Wave Plate

Figure 4:
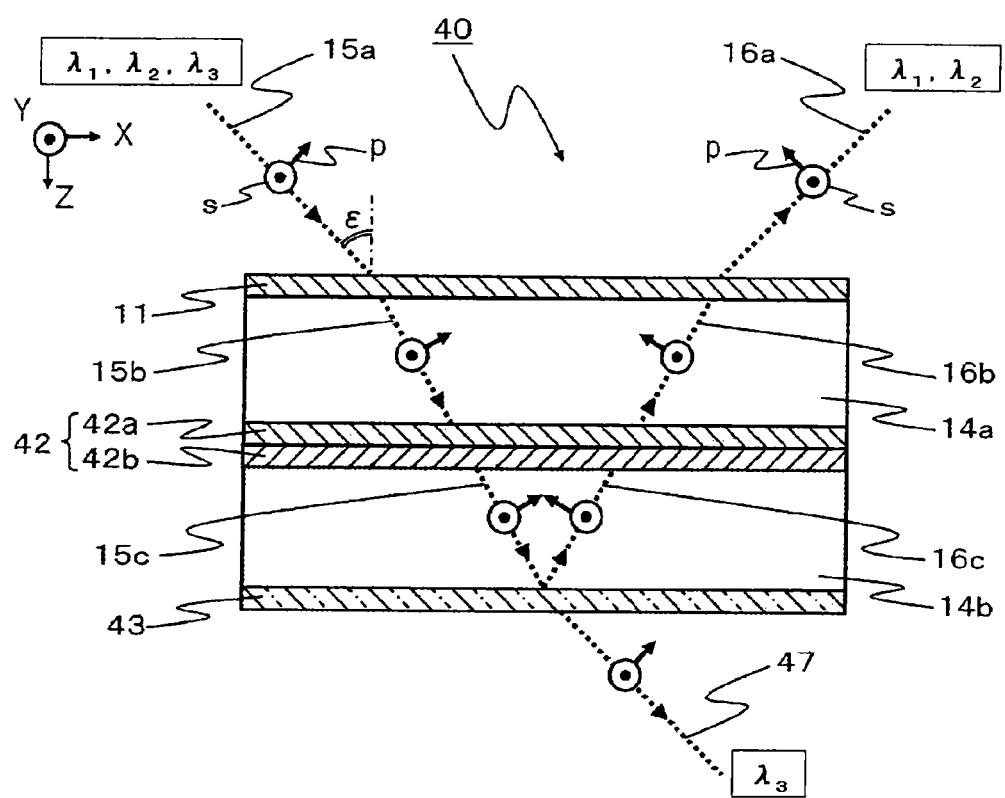
FIG. 4 is a schematic diagram showing a reflection type wave plate according to a third embodiment and a situation of light in the incident plane.

FIG. 4 is a schematic diagram showing the structure of a reflection type wave plate 40 according to a third embodiment and the situation of light entering, transmitted through or reflected by, and exiting the reflection type wave plate 40. The reflection type wave plate 40 is different from the reflection type wave plate 30 according to the second embodiment in the point that the phase difference layer 42 is constructed such that the first phase difference layer 42a and the second phase difference layer 42b are stacked with each other. Further, in the first phase difference layer 42a and the second phase difference layer 42b, the directions of the optic axes are in parallel to the (X-Y) plane and aligned in the thickness direction, but the direction of the slow axis of the first phase difference layer 42a and the direction of the slow axis of the second phase difference layer 42b are different from each other. Further, in the reflection type wave plate 40, like sites to those of the reflection type wave plate 10 according to the first embodiment are designated by like numerals. Then, duplicated description is omitted.

Further, the reflection type wave plate 40 has a first phase difference layer 42a and a second phase difference layer 42b between the transparent substrate 14a and the transparent substrate 14b. However, the structure employed in the phase difference layer 42 is not limited to this stack structure. That is, an optically transparent and isotropic material such as adhesives may be provided between the first phase difference layer 42a and the second phase difference layer 42b so that these layers may be integrated. Alternatively, these layers may be separated. Further, a structure may be employed that the transparent substrate 14a is not arranged and that the antireflection layer 11 is formed on the first phase difference layer 42a. Further, the reflection layer 43 is provided on the transparent substrate 14b surface opposite to the second phase difference layer 42b.

The reflection type wave plate 40 according to the present embodiment serve as a wave plate for reflecting light of wavelength $\lambda_1$ and light of wavelength $\lambda_2$ having a particular wavelength bandwidth, by means of the reflection layer 43, so as to emit the light as circularly polarized light, and serves also as a wave plate for transmitting light of wavelength $\lambda_3$ ($\lambda_1 \neq \lambda_2 \neq \lambda_3$) having a particular wavelength bandwidth so as to emit the light as circularly polarized light. The first phase difference layer 42a and the second phase difference layer 42b are composed of a material having birefringence, a structural birefringence, a photonic crystal, or the like. The reflection layer 43 has a function of wavelength-selective reflection so as to reflect entering light of wavelength $\lambda_1$ and light of wavelength $\lambda_2$ at high reflectivities and transmit entering light of wavelength $\lambda_3$ at a high transmissivity. The reflection layer 43 is composed of a reflective multilayer film fabricated by multilayer formation of a high refractive index material and a low refractive index material. Further, in the reflection type wave plate 40 in FIG. 4, the definitions of the direction of p-polarized light and the direction of s-polarized light are the same as those in the reflection type wave plate 10 according to the first embodiment.

Next, the operation of light of each wavelength that enters the reflection type wave plate 40 is described below. In the reflection type wave plate 40, when the wavelength of entering light is denoted by λ, the first phase difference layer 42a has an effective azimuth angle $\theta_1(\lambda)$ and an effective phase difference $\Gamma_1(\lambda)$. Further, the second phase difference layer 42b has an effective azimuth angle $\theta_2(\lambda)$ and an effective phase difference $\Gamma_2(\lambda)$. Further, the reflection layer 43 has the function of wavelength-selective reflection of reflecting light of wavelength $\lambda_1$ and light of wavelength $\lambda_2$ after imparting a phase difference $\psi_r$ and transmitting light of wavelength $\lambda_3$ after imparting a phase difference $\psi_t$.

For example, when light of wavelength $\lambda_1$ enters, the light is brought into a polarization state determined by the effective azimuth angle $\theta_1(\lambda_1)$ and the effective phase difference $\Gamma_1(\lambda_1)$ of the first phase difference layer 42a and by the effective azimuth angle $\theta_2(\lambda_1)$ and the effective phase difference $\Gamma_2(\lambda_1)$ of the second phase difference layer 42b, and then transmitted through the phase difference layer 42. Similarly, when the light of wavelength $\lambda_2$ and the light of wavelength $\lambda_3$ are incident, the light is transmitted through the phase difference layer 42 after being brought into the light of a polarization state determined by the effective azimuth angle and the effective phase difference of the first phase difference layer 42a and the second phase difference layer 42b corresponding to the light of each wavelength.

Then, the light of each wavelength transmitted through the phase difference layer 42 enters the reflection layer 43. At that time, the light of wavelength $\lambda_1$ and the light of wavelength $\lambda_2$ are reflected by the reflection layer 43 and brought into a polarization state that a phase difference $\psi_r$ is imparted. The light of wavelength $\lambda_1$ and the light of wavelength $\lambda_2$ reflected by the reflection layer 43 are transmitted through the phase difference layer 42 again. At this time, for example, when light of wavelength $\lambda_1$ enters, the light is brought into a polarization state determined by the effective azimuth angle $-\theta_2(\lambda_1)$ and the effective phase difference $\Gamma_2(\lambda_1)$ of the second phase difference layer 42b and by the effective azimuth angle $-\theta_1(\lambda_1)$ and the effective phase difference $\Gamma_1(\lambda_1)$ of the first phase difference layer 42a, and then transmitted through the phase difference layer 42. On the other hand, the light of wavelength $\lambda_3$ transmitted through the phase difference layer 42 enters the reflection layer 43, and then is transmitted through the reflection layer 43 in the form of light 47 having a polarization state that a phase difference $\psi_t$ is imparted.

Here, the operation of the reflection type wave plate 40 onto light of wavelength $\lambda_1$ and light of wavelength $\lambda_2$ is formulated by using the Stokes parameter and the Mueller matrix. Similarly to the first embodiment, it is assumed that the Stokes parameter is a three-dimensional vector $(S_1, S_2, S_3)$ and that the Mueller matrix is a 3×3 matrix. Further, the Stokes parameter for linearly polarized light of p-polarization is defined as (1, 0, 0).

Then, the first phase difference layer 42a has a Mueller matrix $A_1$ corresponding to a phase difference plate having an effective azimuth angle $\theta_1(\lambda)$ and an effective phase difference $\Gamma_1(\lambda)$. Further, the second phase difference layer 42b has a Mueller matrix $A_2$ corresponding to a phase difference plate having an effective azimuth angle $\theta_2(\lambda)$ and an effective phase difference $\Gamma_2(\lambda)$. Here, $\lambda$ is applied at least to wavelength $\lambda_1$, wavelength $\lambda_2$, and wavelength $\lambda_3$. Further, the reflection layer 43 has a Mueller matrix $B_r$ corresponding to a phase difference plate having an azimuth angle of 0 and a phase difference $\psi_r$, and has a Mueller matrix $B_t$ corresponding to a phase difference plate having an azimuth angle of 0 and a phase difference $\psi_t$. Here, the phase difference $\psi_r$ is applied to the light of wavelength $\lambda_1$ and the light of wavelength $\lambda_2$, and the phase difference $\psi_t$ is applied to the light of wavelength $\lambda_3$.

Further, the first phase difference layer 42a has a Mueller matrix $C_1$ corresponding to a phase difference plate having an effective azimuth angle of $-\theta_1(\lambda)$ and an effective phase difference $\Gamma_1(\lambda)$. Further, the second phase difference layer 42b has a Mueller matrix $C_2$ corresponding to a phase difference plate having an effective azimuth angle of $-\theta_2(\lambda)$ and an effective phase difference $\Gamma_2(\lambda)$. Here, $\lambda$ is applied at least to wavelength $\lambda_1$ and wavelength $\lambda_2$. Then, these Mueller matrices $A_1$, $A_2$, $B_r$, $B_t$, $C_1$, and $C_2$ are expressed as Formulas (10a) to (10f), respectively. Here, in Formulas (10a), (10b), (10e), and (10f), for example, $\theta_1(\lambda)$ is expressed as $\theta_1$, $\Gamma_1(\lambda)$ is expressed as $\Gamma_1$, and so on.

[Mathematical Expression 8]

$$A_1 = \begin{pmatrix} \cos^2 2\theta_1 + \sin^2 2\theta_1 \cos\Gamma_1 & \cos 2\theta_1 \sin 2\theta_1 (1-\cos\Gamma_1) & -\sin 2\theta_1 \sin\Gamma_1 \\ \cos 2\theta_1 \sin 2\theta_1 (1-\cos\Gamma_1) & \sin^2 2\theta_1 + \cos^2 2\theta_1 \cos\Gamma_1 & \cos 2\theta_1 \sin\Gamma_1 \\ \sin 2\theta_1 \sin\Gamma_1 & -\cos 2\theta_1 \sin\Gamma_1 & \cos\Gamma_1 \end{pmatrix} \quad (10a)$$

$$A_2 = \begin{pmatrix} \cos^2 2\theta_2 + \sin^2 2\theta_2 \cos\Gamma_2 & \cos 2\theta_2 \sin 2\theta_2 (1-\cos\Gamma_2) & -\sin 2\theta_2 \sin\Gamma_2 \\ \cos 2\theta_2 \sin 2\theta_2 (1-\cos\Gamma_2) & \sin^2 2\theta_2 + \cos^2 2\theta_2 \cos\Gamma_2 & \cos 2\theta_2 \sin\Gamma_2 \\ \sin 2\theta_2 \sin\Gamma_2 & -\cos 2\theta_2 \sin\Gamma_2 & \cos\Gamma_2 \end{pmatrix} \quad (10b)$$

$$B_r = \begin{pmatrix} 1 & 0 & 0 \\ 0 & \cos\psi_r & \sin\psi_r \\ 0 & -\sin\psi_r & \cos\psi_r \end{pmatrix} \quad (10c)$$

$$B_t = \begin{pmatrix} 1 & 0 & 0 \\ 0 & \cos\psi_t & \sin\psi_t \\ 0 & -\sin\psi_t & \cos\psi_t \end{pmatrix} \quad (10d)$$

$$C_1 = \begin{pmatrix} \cos^2 2\theta_1 + \sin^2 2\theta_1 \cos\Gamma_1 & -\cos 2\theta_1 \sin 2\theta_1 (1-\cos\Gamma_1) & \sin 2\theta_1 \sin\Gamma_1 \\ -\cos 2\theta_1 \sin 2\theta_1 (1-\cos\Gamma_1) & \sin^2 2\theta_1 + \cos^2 2\theta_1 \cos\Gamma_1 & \cos 2\theta_1 \sin\Gamma_1 \\ -\sin 2\theta_1 \sin\Gamma_1 & -\cos 2\theta_1 \sin\Gamma_2 & \cos\Gamma_1 \end{pmatrix} \quad (10e)$$

$$C_2 = \begin{pmatrix} \cos^2 2\theta_2 + \sin^2 2\theta_2 \cos\Gamma_2 & -\cos 2\theta_2 \sin 2\theta_2 (1-\cos\Gamma_2) & \sin 2\theta_2 \sin\Gamma_2 \\ -\cos 2\theta_2 \sin 2\theta_2 (1-\cos\Gamma_2) & \sin^2 2\theta_2 + \cos^2 2\theta_2 \cos\Gamma_2 & \cos 2\theta_2 \sin\Gamma_2 \\ -\sin 2\theta_2 \sin\Gamma_2 & -\cos 2\theta_2 \sin\Gamma_2 & \cos\Gamma_2 \end{pmatrix} \quad (10f)$$

Then, the Mueller matrix $D_r(\lambda_1)$ expressing the operation of the light of wavelength $\lambda_1$ and the light of wavelength $\lambda_2$ corresponding to the light 16a reflected by the reflection layer 43 so as to exit the reflection type wave plate 40 is expressed as $D_r(\lambda_i) = C_1 C_2 B_r A_2 A_1$ (i=1, 2). Then, the Mueller matrix $D_t(\lambda_3)$ expressing the operation of the light of wavelength $\lambda_3$ corresponding to the light 47 transmitted through the reflection layer 43 so as to exit the reflection type wave plate 40 is expressed as $D_t(\lambda_3) = B_t A_2 A_1$.

Further, in the entering light, a situation is considered that the ratio of the electric field intensity in the direction of the s-polarized light to the electric field intensity in the direction of the p-polarized light at wavelength $\lambda$ is denoted by $\tan\alpha(\lambda)$ and the difference between the phase of the electric field in the direction of the s-polarized light and the phase of the electric field in the direction of the p-polarized light is denoted by $\delta(\lambda)$. At that time, $S_{3or}(\lambda)$ which is the $S_3$ component of the Stokes parameter of the light 16a reflected by the reflection layer 43 and transmitted through the reflection type wave plate 40 is expressed as Formula (11a). $S_{3ot}(\lambda)$ which is the $S_3$ component of the Stokes parameter of the light 47 transmitted through the reflection layer 43 so as to exit the reflection type wave plate 40 is expressed as Formula (11b). Here, "r" in $S_{3or}$ indicates light reflected by and exiting the reflection layer, and "t" in $S_{3ot}$ indicates light transmitted through and exiting the reflection layer. Further, in Formula (11a) and (11b), for example, $\alpha(\lambda)$ is denoted by $\alpha$ and $\delta(\lambda)$ is denoted by $\delta$.

[Mathematical Expression 9]

$$S_{3or} = \xi_r \cos 2\alpha + \eta_T \sin 2\alpha \cos \delta + \zeta_r \sin 2\alpha \sin \delta \quad (11a)$$

$$S_{3ot} = \xi_t \cos 2\alpha + \eta_t \sin 2\alpha \cos \delta + \zeta_t \sin 2\alpha \sin \delta \quad (11b)$$

Here, in Formula (11a) $\xi_r$, $\eta_r$, and $\zeta_r$ denotes respectively the (3, 1) component, the (3, 2) component, and the (3, 3) component of the Mueller matrix $D_r$. Here, in Formula (11b), $\xi_t$, $\eta_t$, and $\zeta_t$ denotes respectively the (3, 1) component, the (3, 2) component, and the (3, 3) component of the Mueller matrix $D_t$.

Here, the $S_3$ component of the Stokes parameter and the ellipticity κ are in the relation described by the above-mentioned Formula (6). Thus, when $|S_{3or}|$ corresponding to the light of wavelength $\lambda_1$ and the light of wavelength $\lambda_2$ and $|S_{3ot}|$ corresponding to the light of wavelength $\lambda_3$ are 0.94 or greater, the ellipticity κ becomes 0.7 or greater. Thus, this situation is preferable. Further, when $|S_{3or}|$ and $|S_3|$ are 0.96 or greater, the ellipticity κ becomes 0.75 or greater. Thus, this situation is more preferable. Furthermore, when $|S_{3or}|$ and $|S_{3ot}|$ are 0.976 or greater, the ellipticity κ becomes 0.8 or greater. Thus, this situation is still more preferable. This provides the function of a wave plate that reflects or transmits entering light in a wavelength-selective manner so as to separate the light by deflection and that emits the light of whichever wavelength as circularly polarized light.

Fourth Embodiment of Reflection Type Wave Plate

Figure 5:
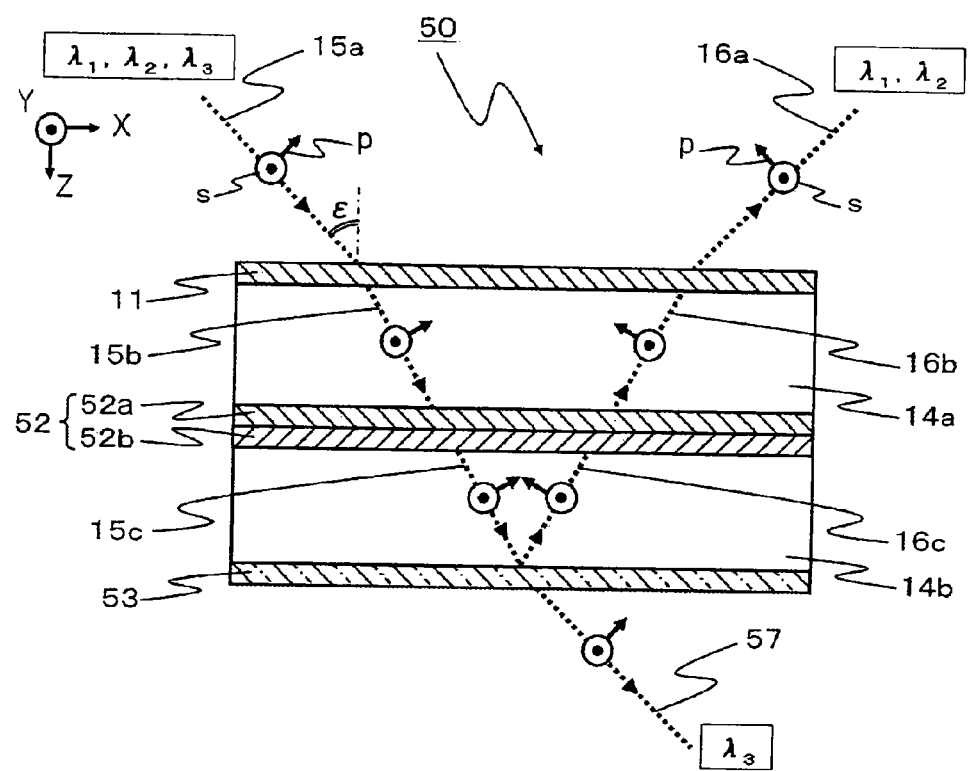
FIG. 5 is a schematic diagram showing a reflection type wave plate according to a fourth embodiment and a situation of light in the incident plane.

FIG. 5 is a schematic diagram showing the structure of a reflection type wave plate 50 according to a fourth embodiment and the situation of light entering, transmitted through or reflected by, and exiting the reflection type wave plate 50. In comparison with the reflection type wave plate 40 according to the third embodiment, the reflection type wave plate 50 according to the fourth embodiment may be designed such that light of wavelength $\lambda_3$ is transmitted through the reflection layer 53 and is transmitted in the form of elliptically polarized light whose major axis of ellipse agrees with the direction of approximate ±45° relative to the direction of p-polarized light serving as the light component parallel to the incident plane. This configuration is preferable, as described later, for a case that a mirror for reflecting the exiting light is provided so that the light is further brought into circularly polarized light. Here, the reflection type wave plate 50 has a phase difference layer 52 formed such that a first phase difference layer 52a and a second phase difference layer 52b stacked with each other. The phase difference layer is similarly to the phase difference layer 42 of the reflection type wave plate according to the third embodiment.

In the reflection type wave plate 50 according to the present embodiment, the operation on entering light of wavelength $\lambda_1$ and of wavelength $\lambda_2$ is the same as that in the third embodiment. In the case of entering of light of wavelength $\lambda_3$, the operation is expressed by the Mueller matrix $D_t(\lambda_3) = B_t A_2 A_1$ by using the above-mentioned Formulas (10a), (10b), and (10d). Here, in a case that the light 57 transmitted through the reflection layer 53 is assumed to be elliptically polarized light and that the azimuth angle representing the direction of major axis of the ellipse of the elliptically polarized light is denoted by ω, the Stokes parameter ($S_1$, $S_2$, $S_3$) of three-dimensional vector satisfies the following relation.

$$\tan(2\omega) = S_2/S_1 \quad (12)$$

At that time, it is preferable that ω calculated from Formula (12) is 35° or greater and 55° or smaller, or alternatively −65° or greater and −25° or smaller. That is, as the interpretation of approximate ±45°, in terms of absolute values, approximate +45° indicates the range from 35° to 55° and approximate −45° indicates the range from −55° to −35°.

Further, in the reflection type wave plate 50 according to the present embodiment, a situation is considered that a reflection mirror (not shown) is provided for the light of wavelength $\lambda_3$ transmitted through the reflection layer 53. At that time, the reflection mirror is composed of a multilayer film fabricated by multilayer formation of a high refractive index material and a low refractive index material, and has the function of reflecting the light of wavelength $\lambda_3$ exiting the reflection type wave plate 50 in the form of elliptically polarized light and bringing the light into circularly polarized light. Here, the phase difference imparted when the light of wavelength $\lambda_3$ is reflected by the reflection mirror is denoted by $\psi_{rm}$. Then, from the Stokes parameter ($S_{1mi}$, $S_{2mi}$, $S_{3mi}$) of the light entering the reflection mirror, the Stokes parameter ($S_{1mo}$, $S_{2mo}$, $S_{3mo}$) of the light reflected by the reflection mirror is calculated as shown in Formulas (13a) to (13c). Here, for example, "m" in $S_{1mi}$ indicates a mirror, "i" indicates light entering the reflection mirror, and "o" in $S_{1mo}$ indicates light reflected by and exiting the reflection mirror.

[Mathematical Expression 10]

$$S_{1mo} = S_{1mi} \quad (13a)$$

$$S_{2mo} = S_{2mi} \cos \psi_{rm} + S_{3mi} \sin \psi_{rm} \quad (13b)$$

$$S_{3mo} = -S_{2mi} \sin \psi_{rm} + S_{3mi} \cos \psi_{rm} \quad (13c)$$

Here, the Stokes parameter satisfies the relation $S_1^2 + S_2^2 + S_3^2 = 1$. Thus, in order that $S_{3mo} \geq 0.94$ should hold for the light reflected by the reflection mirror, it is sufficient that $S_{1mi}$ is 0.34 or smaller. Thus, in a case that the light of wavelength $\lambda_3$ transmitted through the reflection type wave plate 50 according to the present embodiment is to be reflected by a reflection mirror so as to be brought into circularly polarized light, it is sufficient that the Stokes parameter $S_1$ ($=S_{1mi}$) of the light of wavelength $\lambda_3$ transmitted through the reflection type wave plate 50 is designed to be 0.34 or smaller.

Fifth Embodiment of Reflection Type Wave Plate

Figure 6:
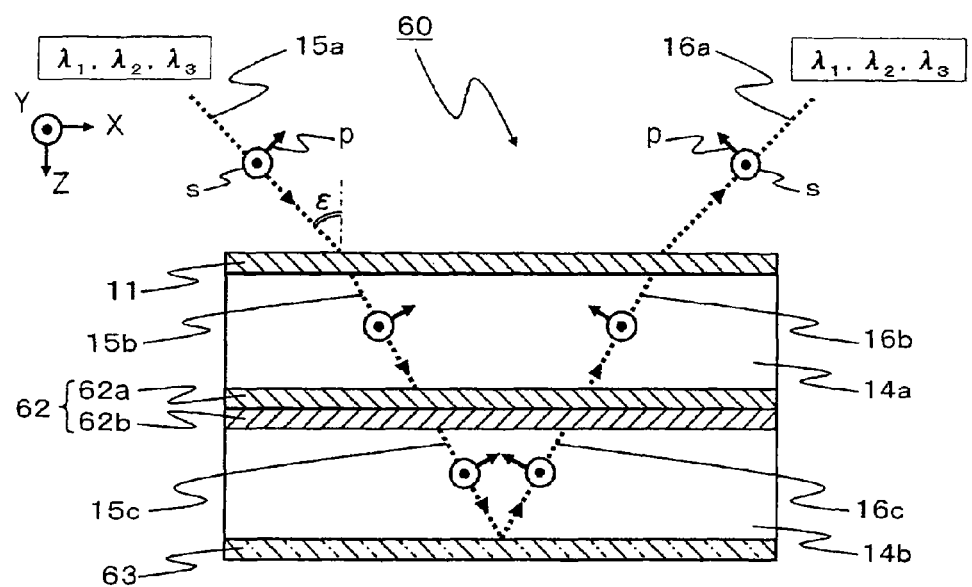
FIG. 6 is a schematic diagram showing a reflection type wave plate according to a fifth embodiment and a situation of light in the incident plane.

FIG. 6 is a schematic diagram showing the structure of a reflection type wave plate 60 according to the present embodiment and the situation of light entering, reflected by, and exiting the reflection type wave plate 60. The reflection type wave plate 60 has a phase difference layer 62 formed such that a first phase difference layer 62a and a second phase difference layer 62b stacked with each other. Further, in the reflection type wave plate 60, like sites to those of the reflection type wave plate 10 according to the first embodiment are designated by like numerals. Then, duplicated description is omitted.

Further, the reflection type wave plate 60 has a first phase difference layer 62a and a second phase difference layer 62b between the transparent substrate 14a and the transparent substrate 14b. However, the structure employed in the phase difference layer 62 is not limited to this stack structure. That is, an optically transparent and isotropic material such as adhesives may be provided between the first phase difference layer 62a and the second phase difference layer 62b so that these layers may be integrated. Alternatively, these layers may be separated. Further, the reflection layer 63 is provided on the transparent substrate 14b surface opposite to the second phase difference layer 62b. The reflection layer 63 may be composed of: a reflective multilayer film fabricated by multilayer formation of a high refractive index material and a low refractive index material; a metal reflection film; or the like.

The reflection type wave plate 60 according to the present embodiment serve as a wave plate for reflecting light of wavelength $\lambda_1$, light of wavelength $\lambda_2$, and light of wavelength $\lambda_3$ ($\lambda_1 \neq \lambda_2 \neq \lambda_3$) having a particular wavelength bandwidth, by means of the reflection layer 63, so as to emit the light as circularly polarized light. The first phase difference layer 62a and the second phase difference layer 62b are composed of a material having birefringence, a structural birefringence, a photonic crystal, or the like. Further, in the reflection type wave plate 60 in FIG. 6, the definitions of the direction of p-polarized light and the direction of s-polarized light are the same as those in the reflection type wave plate 10 according to the first embodiment.

Next, the operation of light of each wavelength that enters the reflection type wave plate 60 is described below. In the reflection type wave plate 60, when the wavelength of entering light is denoted by $\lambda$, the first phase difference layer 62a has an effective azimuth angle $\theta_1(\lambda)$ and an effective phase difference $\Gamma_1(\lambda)$. Further, the second phase difference layer 62b has an effective azimuth angle $\theta_2(\lambda)$ and an effective phase difference $\Gamma_2(\lambda)$.

Then, the light of each wavelength transmitted through the phase difference layer 62 enters the reflection layer 63 so as to be reflected and brought into a polarization state that a phase difference $\psi_r$ is imparted. The light of each wavelength reflected by the reflection layer 63 is transmitted through the phase difference layer 62 again. At this time, for example, when light of wavelength $\lambda_1$ enters, the light is brought into a polarization state determined by the effective azimuth angle $-\theta_2(\lambda_1)$ and the effective phase difference $\Gamma_2(\lambda_1)$ of the second phase difference layer 62b and by the effective azimuth angle $-\theta_1(\lambda_1)$ and the effective phase difference $\Gamma_1(\lambda_1)$ of the first phase difference layer 62a, and then transmitted through the phase difference layer 62.

Here, the operation of the reflection type wave plate 60 onto the light of each wavelength is formulated by using the Stokes parameter and the Mueller matrix. Similarly to the first embodiment, it is assumed that the Stokes parameter is a three-dimensional vector $(S_1, S_2, S_3)$ and that the Mueller matrix is a 3×3 matrix. Further, the Stokes parameter for linearly polarized light of p-polarization is defined as $(1, 0, 0)$.

Then, the first phase difference layer 62a has a Mueller matrix $A_1$ corresponding to a phase difference plate having an effective azimuth angle $\theta_1(\lambda)$ and an effective phase difference $\Gamma_1(\lambda)$. Further, the second phase difference layer 62b has a Mueller matrix $A_2$ corresponding to a phase difference plate having an effective azimuth angle $\theta_2(\lambda)$ and an effective phase difference $\Gamma_2(\lambda)$. Further, the reflection layer 63 has a Mueller matrix $B_r$ corresponding to a phase difference plate having an azimuth angle of 0 and a phase difference $\psi_r$. Here, $\lambda$ is applied at least to wavelength $\lambda_1$, wavelength $\lambda_2$, and wavelength $\lambda_3$.

Further, the first phase difference layer 62a has a Mueller matrix $C_1$ corresponding to a phase difference plate having an effective azimuth angle of $-\theta_1(\lambda)$ and an effective phase difference $\Gamma_1(\lambda)$. Further, the second phase difference layer 62b has a Mueller matrix $C_2$ corresponding to a phase difference plate having an effective azimuth angle of $-\theta_2(\lambda)$ and an effective phase difference $\Gamma_2(\lambda)$. Here, $\lambda$ is applied at least to wavelength $\lambda_1$, wavelength $\lambda_2$, and wavelength $\lambda_3$. Then, these Mueller matrices $A_1, A_2, B_r, C_1$, and $C_2$ are expressed as Formulas (14a) to (14e), respectively. Here, in Formulas (14a), (14b), (14d), and (14e), for example, $\theta_1(\lambda)$ is expressed as $\lambda_1$, $\Gamma_1(\lambda)$ is expressed as $\Gamma_1$, and so on.

[Mathematical Expression 11]

$$A_1 = \begin{pmatrix} \cos^2 2\theta_1 + \sin^2 2\theta_1 \cos\Gamma_1 & \cos\theta_1 \sin 2\theta_1 (1 - \cos\Gamma_1) & -\sin 2\theta_1 \sin\Gamma_1 \\ \cos 2\theta_1 \sin 2\theta_1 (1 - \cos\Gamma_1) & \sin^2 2\theta_1 + \cos^2 2\theta_1 \cos\Gamma_1 & \cos 2\theta_1 \sin\Gamma_1 \\ \sin 2\theta_1 \sin\Gamma_1 & -\cos 2\theta_1 \sin\Gamma_1 & \cos\Gamma_1 \end{pmatrix} \quad (14a)$$

$$A_2 = \begin{pmatrix} \cos^2 2\theta_2 + \sin^2 2\theta_2 \cos\Gamma_2 & \cos 2\theta_2 \sin 2\theta_2 (1 - \cos\Gamma_2) & -\sin 2\theta_2 \sin\Gamma_2 \\ \cos 2\theta_2 \sin 2\theta_2 (1 - \cos\Gamma_2) & \sin^2 2\theta_2 + \cos^2 2\theta_2 \cos\Gamma_2 & \cos 2\theta_2 \sin\Gamma_2 \\ \sin 2\theta_2 \sin\Gamma_2 & -\cos 2\theta_2 \sin\Gamma_2 & \cos\Gamma_2 \end{pmatrix} \quad (14b)$$

$$B_r = \begin{pmatrix} 1 & 0 & 0 \\ 0 & \cos\psi_r & \sin\psi_r \\ 0 & -\sin\psi_r & \cos\psi_r \end{pmatrix} \quad (14c)$$

$$C_1 = \begin{pmatrix} \cos^2 2\theta_1 + \sin^2 2\theta_1 \cos\Gamma_1 & -\cos 2\theta_1 \sin 2\theta_1 (1 - \cos\Gamma_1) & \sin 2\theta_1 \sin\Gamma_1 \\ -\cos 2\theta_1 \sin 2\theta_1 (1 - \cos\Gamma_1) & \sin^2 2\theta_1 + \cos^2 2\theta_1 \cos\Gamma_1 & \cos 2\theta_1 \sin\Gamma_1 \\ -\sin 2\theta_1 \sin\Gamma_1 & -\cos 2\theta_1 \sin\Gamma_2 & \cos\Gamma_1 \end{pmatrix} \quad (14d)$$

$$C_2 = \begin{pmatrix} \cos^2 2\theta_2 + \sin^2 2\theta_2 \cos\Gamma_2 & -\cos 2\theta_2 \sin 2\theta_2 (1 - \cos\Gamma_2) & \sin 2\theta_2 \sin\Gamma_2 \\ -\cos 2\theta_2 \sin 2\theta_2 (1 - \cos\Gamma_2) & \sin^2 2\theta_2 + \cos^2 2\theta_2 \cos\Gamma_2 & \cos 2\theta_2 \sin\Gamma_2 \\ -\sin 2\theta_2 \sin\Gamma_2 & -\cos 2\theta_2 \sin\Gamma_2 & \cos\Gamma_2 \end{pmatrix} \quad (14e)$$

Then, the Mueller matrix $D_r(\lambda_i)$ expressing the operation of the light of wavelength $\lambda_1$, light of wavelength $\lambda_2$, and the light of wavelength $\lambda_3$ corresponding to the light 16a reflected by the reflection layer 63 so as to exit the reflection type wave plate 60 is expressed as $D_r(\lambda_i) = C_1 C_2 B_r A_2 A_1$ (i=1, 2, 3).

Further, in the entering light, a situation is considered that the ratio of the electric field intensity in the direction of the s-polarized light to the electric field intensity in the direction of the p-polarized light at wavelength $\lambda$ is denoted by $\tan\alpha(\lambda)$ and the difference between the phase of the electric field in the direction of the s-polarized light and the phase of the electric field in the direction of the p-polarized light is denoted by $\delta(\lambda)$. At that time, $S_{3or}(\lambda)$ which is the $S_3$ component of the Stokes parameter of the light 16a reflected by the reflection layer 63 and then transmitted through the reflection type wave plate 60 is expressed as Formula (15). Here, in Formula (15), for example, $\alpha(\lambda)$ is denoted by $\alpha$, $\delta(\lambda)$ is denoted by $\delta$, and so on.

[Mathematical Expression 12]

$$S_{3or} = \xi_r \cos 2\alpha + \eta_r \sin 2\alpha \cos \delta + \zeta_r \sin 2\alpha \sin \delta \quad (15)$$

Here, in Formula (15), $\xi_r$, $\eta_r$, and $\zeta_r$ denotes respectively the (3, 1) component, the (3, 2) component, and the (3, 3) component of the Mueller matrix $D_r$.

Here, the $S_3$ component of the Stokes parameter and the ellipticity $\kappa$ are in the relation described by the above-mentioned Formula (6). Thus, when $|S_{3or}|$ corresponding to the light of wavelength the light of wavelength $\lambda_2$, and the light of wavelength $\lambda_3$ are 0.94 or greater, the ellipticity $\kappa$ becomes 0.7 or greater. Thus, this situation is preferable. Further, when $|S_{3or}|$ is 0.96 or greater, the ellipticity $\kappa$ becomes 0.75 or greater. Thus, this situation is more preferable. Furthermore, when $|S_{3or}|$ is 0.976 or greater, the ellipticity κ becomes 0.8 or greater. Thus, this situation is still more preferable. This provides the function of a wave plate that reflects the entering light and emits the light of whichever wavelength as circularly polarized light.

First Embodiment of Optical Head Device

Figure 7:
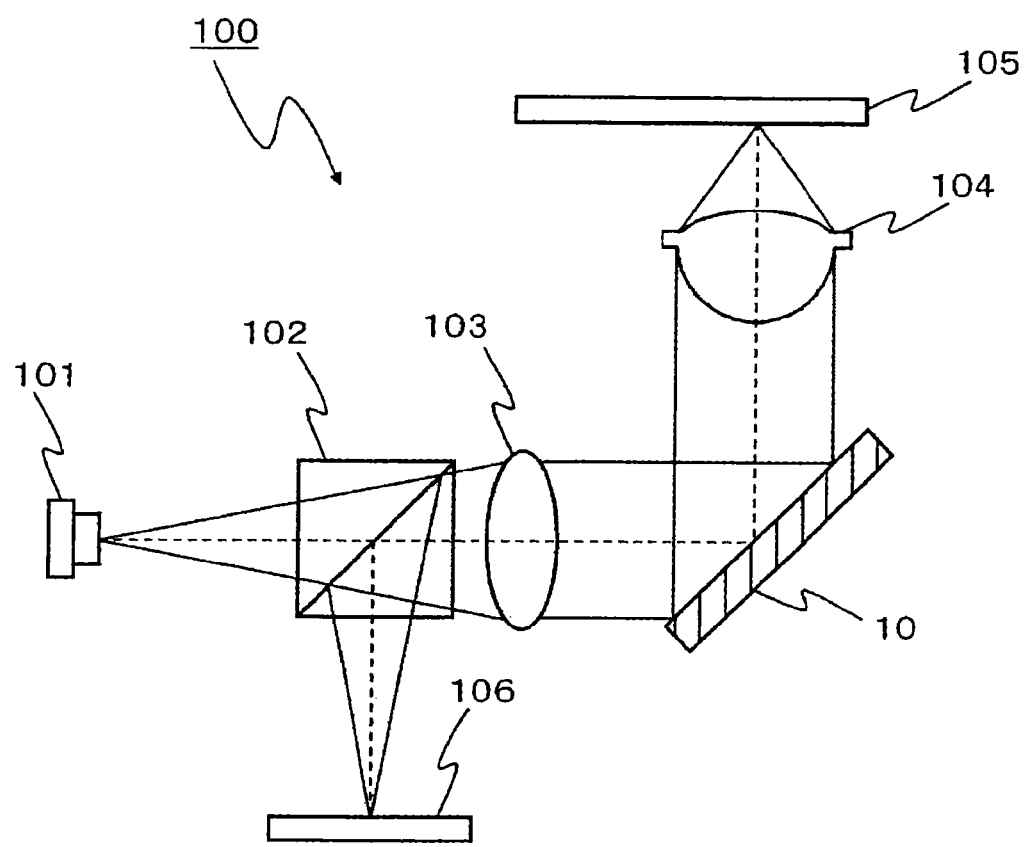
FIG. 7 is a schematic diagram showing an optical head device according to a first embodiment.

FIG. 7 is a conceptual schematic diagram showing an optical head device 100 according to the present embodiment, and describes a case that the optical head device 100 employs the reflection type wave plate 10. The optical head device 100 has: a light source 101 for emitting light having a predetermined wavelength; a beam splitter 102 for transmitting (forward) the light emitted from the light source 101 toward the reflection type wave plate 10 and for separating by deflection the returned light reflected by an optical disk 105; a collimator lens 103 for converting the light transmitted through the beam splitter 102 into a parallel light beam; an objective lens 104 for focusing the light reflected by the reflection type wave plate 10 onto the optical disk 105; and a photodetector 106 for detecting the light reflected by the optical disk 105 and reflected by the beam splitter 102. Further, in the optical path between the light source 101 and the beam splitter 102, a diffraction element may be provided that diffracts apart of the light emitted from the light source 101 so as to generate three beams consisting of a main beam and two sub beams.

The light source 101 is composed, for example, of a semiconductor laser for emitting divergent light of linear polarization of 660-nm wavelength band. Here, the light emitted from the light source 101 employed in the present invention is not limited to that of 660-nm wavelength band. That is, for example, light of 405-nm wavelength band, light of 780-nm wavelength band, or light of other wavelength band may be employed. Here, the 405-nm wavelength band, the 660-nm wavelength band, and the 780-nm wavelength band indicate respectively the ranges of 385 nm to 425 nm, 640 nm to 680 nm, and 760 nm to 800 nm.

Further, the light emitted from the light source 101 is not limited to that of one kind of wavelength, and may be light of two kinds of wavelengths. A light source of this configuration may be: a so-called hybrid-type dual-wavelength laser light source composed of two semiconductor laser chips mounted on the same substrate; or a monolithic-type dual-wavelength laser light source provided with two emission points each emitting light of a wavelength different from each other.

Here, the linearly polarized light emitted from the light source 101 is transmitted through the polarization the beam splitter 102, then brought into a parallel light beam by the collimator lens 103, then enters the reflection type wave plate 10 so as to be brought into circularly polarized light, and then is focused onto the optical disk 105 by the objective lens 104. Here, the optical path extending from the light source to the optical disk is referred to as a "forward path", and the optical path extending from the optical disk to the photodetector is referred to as a "return path". Similar definitions are employed also in the following embodiments. The light reflected by the optical disk 105 is in the state of circularly polarized light of reverse polarization, then is transmitted again through the objective lens 104, then enters the reflection type wave plate 10 so as to be brought into linearly polarized light perpendicular to the linearly polarized light in the forward path, then is transmitted through the collimator lens 103, then is reflected by the polarization beam splitter 102, and then reaches the photodetector 106.

As such, in the optical head device 100, in addition to the function of a raise-up mirror, the reflection type wave plate 10 has the function of a ¼-wave plate. This reduces the number of components in the optical head device 100, and hence realizes size reduction. Here, the optical head device 100 has been described for an example that the reflection type wave plate 10 is provided. Instead, an element may be employed that has the function of reflecting light of utilized wavelength and changing, for example, elliptically polarized light into circularly polarized light may be provided. Further, as long as the functions of reflection and of a ¼-wave plate are provided, the reflection type wave plate according to other embodiments consisting of the second to the fifth embodiments may be employed. As such, in the optical head device 100, without the necessity of a ¼-wave plate provided separately from the raise-up mirror, satisfactory recording/reading is achieved. Thus, in particular, Thus, the thickness is reduced and hence limit on the space for the actuator is reduced, so that high design flexibility is obtained.

Second Embodiment of Optical Head Device

Figure 8:
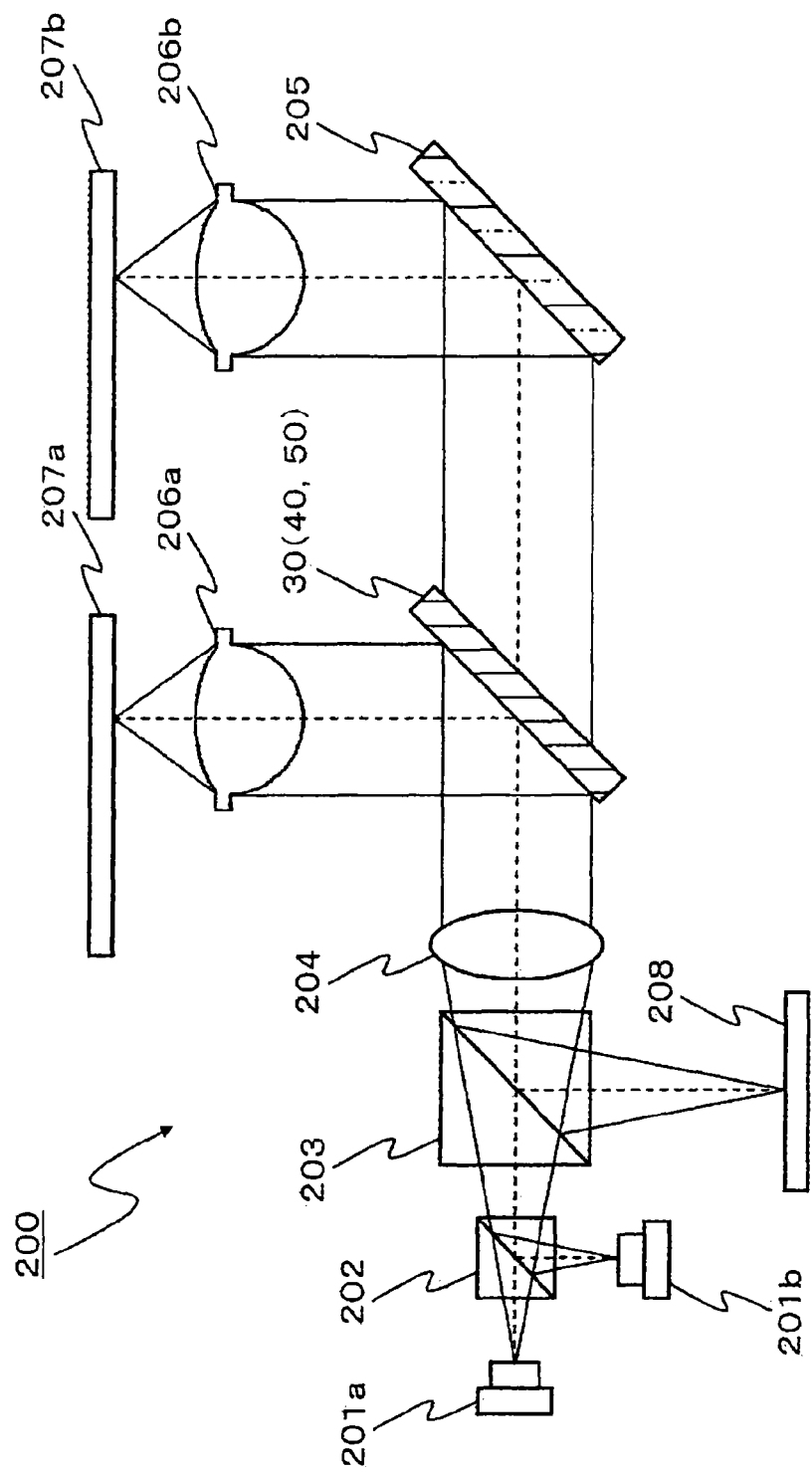
FIG. 8 is a schematic diagram showing an optical head device according to a second embodiment.

FIG. 8 is a conceptual schematic diagram showing an optical head device 200 according to the present embodiment, and describes a case that the optical head device 200 employs the reflection type wave plate 30. The optical head device 200 has: a light source 201a for emitting light of wavelength $\lambda_1$ and light of wavelength $\lambda_2$ ($\lambda_1 \neq \lambda_2$) serving as linearly polarized light of two mutually different wavelengths (bands); and a light source 201b for emitting linearly polarized light of wavelength $\lambda_3$ ($\lambda_1 \neq \lambda_2 \neq \lambda_3$). A dichroic prism 202 is provided immediately after the emission of the light source 201a and the light source 201b. The dichroic prism 202 has the function of transmitting the light of wavelength $\lambda_1$ and the light of wavelength $\lambda_2$ and reflecting the light of wavelength $\lambda_3$. By virtue of this, the direction of travel of the light of three wavelengths is deflected toward the polarization beam splitter 203.

The light beams of these three wavelengths are brought into parallel light beams by the collimate lens 204, and then enter the reflection type wave plate 30. Here, the reflection type wave plate 30 reflects the light of wavelength $\lambda_1$ and the light of wavelength $\lambda_2$ and converts the linearly polarized light into circularly polarized light. Then, the light of wavelength $\lambda_1$ and the light of wavelength $\lambda_2$ reflected by the reflection type wave plate 30 are focused onto the optical disk 207a by the objective lens 206a. The light of wavelength $\lambda_1$ and the light of wavelength $\lambda_2$ reflected by the optical disk 207a is in the state of circularly polarized light of reverse polarization, then is transmitted through the objective lens 206a, then is brought by the reflection type wave plate 30 into linearly polarized light perpendicular to the forward path, then is transmitted through the collimator lens 204, then is reflected by the polarization beam splitter 203, and then reaches the photodetector 208.

On the other hand, in the forward optical path, without being reflected by the reflection type wave plate 30, the light of wavelength $\lambda_3$ becomes circularly polarized light and travels forward so as to be transmitted. The light of wavelength $\lambda_3$ traveling forward so as to be transmitted through the reflection type wave plate 30 and brought into circularly polarized light is reflected by the reflection mirror 205 in a state that the phase of circularly polarized light is maintained, or alternatively reflected in a state that the phase is changed by an integral multiple of 180°. Then, the light is focused onto the optical disk 207b by the objective lens 206b. For example, in a case that the reflection mirror 205 has the characteristics of imparting a phase change of 180°, when light of clockwise circular polarization enters the reflection mirror 205, the light is brought into counterclockwise circular polarization and reflected. Further, the light of wavelength $\lambda_3$ reflected by the optical disk 207b is brought into circularly polarized light of reverse polarization, then transmitted through the objective lens 206b so as to be reflected by the reflection mirror 205, and then transmitted through the reflection type wave plate 30 again so as to be brought into linearly polarized light perpendicular to the forward path. Then, the light is transmitted through the collimator lens 204, then reflected by polarization beam splitter 203, and then reaches the photodetector 208.

As such, in the optical head device 200, for the light of wavelength $\lambda_1$ and the light of wavelength $\lambda_2$, the reflection type wave plate 30 has the function of a ¼-wave plate in addition to the function of a raise-up mirror. This reduces the number of components of the optical head device 200 and hence realizes size reduction. Further, the reflection type wave plate 30 has the function of a ¼-wave plate and transmits the light of wavelength $\lambda_3$. Thus, a separate ¼-wave plate need not be arranged in the optical path of the light of $\lambda_3$, and hence the number of components of the optical head device 200 is reduced. Here, the optical head device 200 has been described for an example that the reflection type wave plate 30 is provided. Instead, as long as the function of a ¼-wave plate for reflecting the light of wavelength $\lambda_1$ and the light of wavelength $\lambda_2$ and the function of a ¼-wave plate for transmitting the light of wavelength are provided, the reflection type wave plate 40 may be employ.

Further, in the optical head device 200, the reflection mirror 205 had the function of reflecting the circularly polarized light in a state that the phase is maintained or alternatively reflecting the light in a state that the phase is changed by an integral multiple of 180°. Instead, an element may be employed that has the function of reflecting the light and changing elliptically polarized light into circularly polarized light may be provided. Further, the optical head device 200 may be designed such that the reflection type wave plate 50 according to the fourth embodiment is employed so that only the light of wavelength $\lambda_3$ is transmitted in the form of elliptically polarized light whose major axis of the ellipse agrees with the direction of approximate ±45° (relative to the direction of p-polarization) and then brought into circularly polarized light by the reflection mirror 205.

Further, when the wavelength $\lambda_1$ and the wavelength $\lambda_2$ are assigned to 780-nm wavelength band and 660-nm wavelength band corresponding to CD use and DVD use, respectively, and the wavelength $\lambda_3$ is assigned to 405-nm wavelength band corresponding to BD use, a CD/DVD-compatible objective lens may be employed as the objective lens 206a and a BD-use objective lens may be employed as the objective lens 206b. Here, the objective lenses 206a and 206b may be accommodated in a lens holder (not shown). As such, in the optical head device 200, without the necessity of a ¼-wave plate provided separately from the raise-up mirror, satisfactory recording/reading is achieved. Thus, in particular, Thus, the thickness is reduced and hence limit on the space for the actuator is reduced, so that high design flexibility is obtained.

Third Embodiment of Optical Head Device

Figure 9:
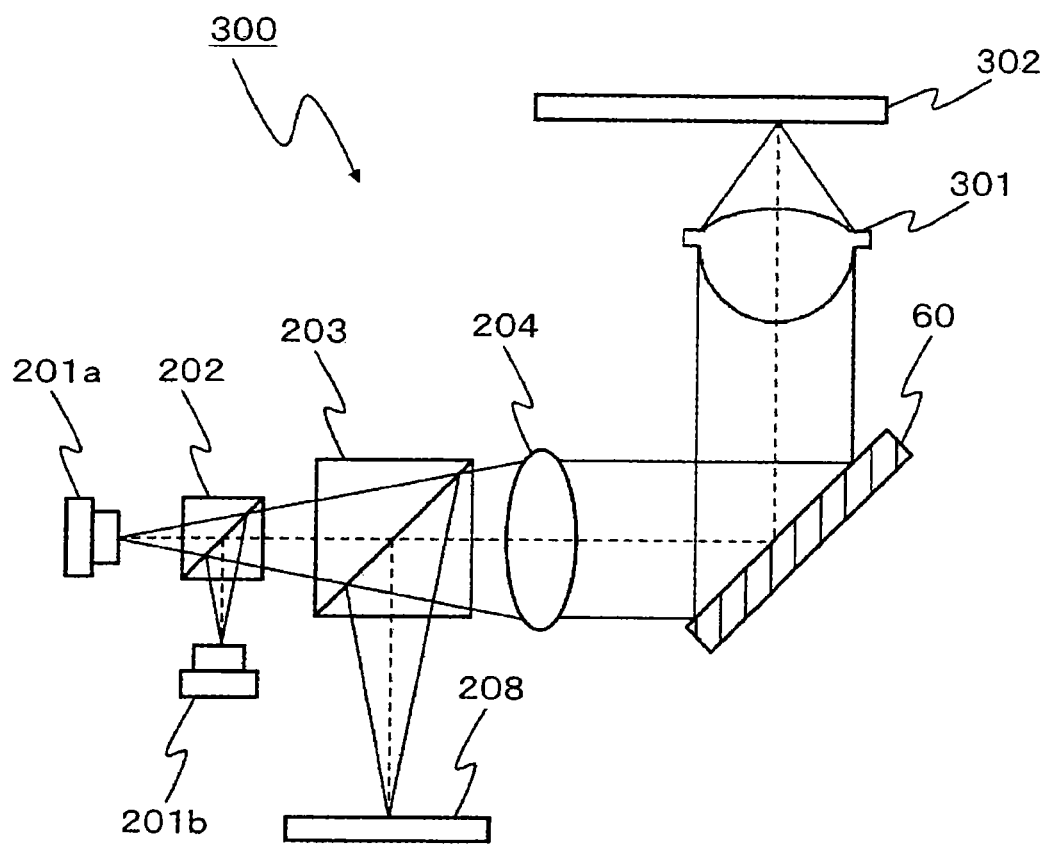
FIG. 9 is a schematic diagram showing an optical head device according to a third embodiment.

FIG. 9 is a conceptual schematic diagram showing an optical head device 300 according to the present embodiment, and describes a case that the optical head device 300 employs the reflection type wave plate 60. Similarly to the optical head device 200, the optical head device 300 processes light of wavelength light of wavelength $\lambda_2$, and light of wavelength $\lambda_3$ serving as light of three wavelengths having mutually different wavelengths (bands). Like sites to those of the optical head device 200 in FIG. 8 are designated by like numerals. Then, duplicated description is omitted.

In the optical head device 300, in the forward optical path, the light of wavelength the light of wavelength $\lambda_2$, and the light of wavelength $\lambda_3$ which are linearly polarized light transmitted through the collimator lens 204 so as to be brought into parallel light beams are all reflected by the reflection type wave plate 60 and then the linearly polarized light is converted into circularly polarized light. Then, the light of wavelength $\lambda_1$ and the light of wavelength $\lambda_2$ reflected by the reflection type wave plate 60 are focused onto the optical disk 302 by the objective lens 301. The light of wavelength $\lambda_1$, the light of wavelength $\lambda_2$, and the light of wavelength $\lambda_3$ reflected by the optical disk 302 is in the state of circularly polarized light of reverse polarization, then is transmitted through the objective lens 301, then is brought by the reflection type wave plate 60 into linearly polarized light perpendicular to the forward path, then is transmitted through the collimator lens 204, then is reflected by the polarization beam splitter 203, and then reaches the photodetector 208.

As such, in the optical head device 300, for the light of wavelength $\lambda_1$, light of wavelength $\lambda_2$, and the light of wavelength $\lambda_3$, the reflection type wave plate 60 has the function of a ¼-wave plate in addition to the function of a raise-up mirror. This reduces the number of components of the optical head device 300 and hence realizes size reduction. As such, in the optical head device 300, without the necessity of a ¼-wave plate provided separately from the raise-up mirror, satisfactory recording/reading is achieved. Thus, in particular, Thus, the thickness is reduced and hence limit on the space for the actuator is reduced, so that high design flexibility is obtained.

EXAMPLES

Examples 1 to 13

A fabrication method for the reflection type wave plate 10 according to the first embodiment of a reflection type wave plate is described below with reference to FIG. 1A. The antireflection layer 11 is formed on one surface of a quartz glass substrate serving as the transparent substrate 14a. Specifically, as described in Table 1, $Ta_2O_5$ and $SiO_2$ are alternately stacked into a predetermined film thickness by vacuum vapor deposition. Here, the layer number is a number imparted serially from air serving as a medium through which the light enters, toward the quartz glass substrate ($SiO_2$). Further, also in the following examples, the layer numbers are in the order starting from the medium on the light entering side.

TABLE 1

| Layer number | Material | Refractive index | Thickness [nm] |
|---|---|---|---|
| Incident medium | Air | 1.000 | — |
| 1 | $SiO_2$ | 1.479 | 63.0 |
| 2 | $Ta_2O_5$ | 2.299 | 70.9 |
| 3 | $SiO_2$ | 1.479 | 24.7 |
| 4 | $Ta_2O_5$ | 2.299 | 8.8 |
| Substrate | $SiO_2$ | 1.479 | — |

Then, a reflection layer 13 is formed on one surface of a quartz glass substrate serving as the transparent substrate 14b. Specifically, in Examples 1 to 13, $Ta_2O_5$ and $SiO_2$ are alternately stacked by vacuum vapor deposition into a predetermined film thickness respectively described in Tables 2 and 3. Here, the layer number is a number imparted serially from the quartz glass substrate ($SiO_2$) serving as a medium through which the light enters, toward air.

TABLE 2

| Layer number | Material | Refractive index | Film thickness [nm] | | | | | | |
|---|---|---|---|---|---|---|---|---|---|
| | | | Example 1 | Example 2 | Example 3 | Example 4 | Example 5 | Example 6 | Example 7 |
| Incident medium | SiO$_2$ | 1.479 | | | | | | | |
| 1 | Ta$_2$O$_5$ | 2.299 | 34.2 | 33.5 | 31.9 | 30.3 | 26.6 | 27.7 | 25.7 |
| 2 | SiO$_2$ | 1.479 | 55.2 | 53.4 | 52.5 | 52.8 | 55.0 | 40.2 | 34.4 |
| 3 | Ta$_2$O$_5$ | 2.299 | 28.4 | 27.3 | 26.5 | 24.7 | 23.7 | 34.4 | 43.5 |
| 4 | SiO$_2$ | 1.479 | 59.5 | 62.2 | 63.8 | 67.5 | 69.4 | 60.0 | 51.2 |
| 5 | Ta$_2$O$_5$ | 2.299 | 35.1 | 35.4 | 36.2 | 36.5 | 36.6 | 37.4 | 37.1 |
| 6 | SiO$_2$ | 1.479 | 67.6 | 67.9 | 68.3 | 68.7 | 69.0 | 66.4 | 63.4 |
| 7 | Ta$_2$O$_5$ | 2.299 | 38.7 | 38.6 | 38.0 | 37.0 | 34.6 | 33.4 | 33.6 |
| 8 | SiO$_2$ | 1.479 | 68.2 | 66.9 | 66.2 | 65.2 | 66.6 | 62.8 | 63.7 |
| 9 | Ta$_2$O$_5$ | 2.299 | 37.7 | 37.0 | 35.7 | 34.3 | 31.8 | 35.1 | 36.5 |
| 10 | SiO$_2$ | 1.479 | 65.1 | 63.6 | 62.8 | 62.5 | 65.6 | 59.7 | 54.1 |
| 11 | Ta$_2$O$_5$ | 2.299 | 35.3 | 34.8 | 34.5 | 34.5 | 33.2 | 40.5 | 47.6 |
| 12 | SiO$_2$ | 1.479 | 62.6 | 62.6 | 63.4 | 65.8 | 72.7 | 66.7 | 63.3 |
| 13 | Ta$_2$O$_5$ | 2.299 | 34.9 | 35.7 | 37.1 | 38.2 | 37.8 | 43.4 | 47.6 |
| 14 | SiO$_2$ | 1.479 | 65.7 | 67.5 | 69.4 | 72.7 | 77.7 | 76.4 | 79.4 |
| 15 | Ta$_2$O$_5$ | 2.299 | 37.9 | 39.7 | 41.4 | 42.3 | 41.3 | 47.7 | 51.0 |
| 16 | SiO$_2$ | 1.479 | 72.4 | 73.5 | 75.0 | 77.4 | 82.8 | 68.4 | 58.1 |
| 17 | Ta$_2$O$_5$ | 2.299 | 41.6 | 43.3 | 44.2 | 44.7 | 42.2 | 50.8 | 53.4 |
| 18 | SiO$_2$ | 1.479 | 77.3 | 76.9 | 77.8 | 79.2 | 83.5 | 72.2 | 66.7 |
| 19 | Ta$_2$O$_5$ | 2.299 | 43.8 | 45.2 | 45.6 | 44.9 | 43.1 | 50.0 | 54.1 |
| 20 | SiO$_2$ | 1.479 | 79.6 | 78.5 | 79.1 | 80.0 | 86.0 | 72.1 | 66.6 |
| 21 | Ta$_2$O$_5$ | 2.299 | 44.7 | 46.1 | 45.9 | 45.4 | 43.3 | 50.3 | 54.0 |
| 22 | SiO$_2$ | 1.479 | 80.5 | 77.5 | 77.3 | 80.4 | 84.1 | 72.3 | 66.6 |
| 23 | Ta$_2$O$_5$ | 2.299 | 45.1 | 47.6 | 48.6 | 45.2 | 41.4 | 50.4 | 54.0 |
| 24 | SiO$_2$ | 1.479 | 80.8 | 76.2 | 75.2 | 81.8 | 91.5 | 72.3 | 66.5 |
| 25 | Ta$_2$O$_5$ | 2.299 | 45.2 | 48.0 | 48.5 | 44.5 | 40.0 | 50.4 | 54.0 |
| 26 | SiO$_2$ | 1.479 | 81.0 | 76.4 | 75.3 | 82.0 | 89.1 | 72.3 | 66.5 |
| 27 | Ta$_2$O$_5$ | 2.299 | 45.2 | 48.1 | 48.4 | 45.4 | 39.2 | 50.6 | 53.9 |
| 28 | SiO$_2$ | 1.479 | 80.9 | 76.1 | 75.0 | 81.6 | 89.7 | 72.0 | 66.3 |
| 29 | Ta$_2$O$_5$ | 2.299 | 46.0 | 47.6 | 48.5 | 45.8 | 43.4 | 48.8 | 53.4 |
| Substrate | Air | 1.000 | | | | — | | | |

TABLE 3

| Layer number | Material | Refractive index | Film thickness [nm] | | | | | |
|---|---|---|---|---|---|---|---|---|
| | | | Example 8 | Example 9 | Example 10 | Example 11 | Example 12 | Example 13 |
| Incident medium | SiO$_2$ | 1.479 | | | | | | |
| 1 | Ta$_2$O$_5$ | 2.299 | 14.6 | 14.6 | 13.3 | 94.8 | 99.4 | 94.6 |
| 2 | SiO$_2$ | 1.479 | 58.7 | 58.9 | 59.2 | 24.3 | 32.6 | 32.4 |
| 3 | Ta$_2$O$_5$ | 2.299 | 31.0 | 31.1 | 30.0 | 92.5 | 84.3 | 89.3 |
| 4 | SiO$_2$ | 1.479 | 59.1 | 58.2 | 57.2 | 40.4 | 45.2 | 48.7 |
| 5 | Ta$_2$O$_5$ | 2.299 | 30.8 | 29.9 | 28.3 | 88.4 | 104.1 | 91.6 |
| 6 | SiO$_2$ | 1.479 | 68.2 | 68.6 | 69.1 | 46.0 | 44.4 | 51.6 |
| 7 | Ta$_2$O$_5$ | 2.299 | 33.0 | 35.2 | 37.5 | 108.0 | 81.9 | 94.1 |
| 8 | SiO$_2$ | 1.479 | 69.1 | 71.2 | 73.1 | 50.8 | 56.7 | 50.0 |
| 9 | Ta$_2$O$_5$ | 2.299 | 34.6 | 38.4 | 41.8 | 51.7 | 45.3 | 70.9 |
| 10 | SiO$_2$ | 1.479 | 73.1 | 75.1 | 77.0 | 50.1 | 62.4 | 52.6 |
| 11 | Ta$_2$O$_5$ | 2.299 | 39.4 | 42.2 | 45.0 | 48.7 | 48.8 | 57.6 |
| 12 | SiO$_2$ | 1.479 | 78.4 | 79.6 | 80.9 | 59.6 | 69.7 | 55.9 |
| 13 | Ta$_2$O$_5$ | 2.299 | 42.0 | 43.5 | 45.3 | 52.7 | 50.2 | 57.1 |
| 14 | SiO$_2$ | 1.479 | 82.4 | 83.1 | 83.9 | 66.1 | 72.4 | 62.1 |
| 15 | Ta$_2$O$_5$ | 2.299 | 41.8 | 42.3 | 43.4 | 49.5 | 48.3 | 51.1 |
| 16 | SiO$_2$ | 1.479 | 85.1 | 85.4 | 85.8 | 77.5 | 78.1 | 77.4 |
| 17 | Ta$_2$O$_5$ | 2.299 | 41.3 | 41.4 | 42.0 | 45.5 | 46.0 | 45.2 |
| 18 | SiO$_2$ | 1.479 | 86.6 | 86.7 | 87.0 | 81.2 | 80.1 | 82.1 |
| 19 | Ta$_2$O$_5$ | 2.299 | 41.2 | 41.0 | 41.4 | 44.8 | 45.5 | 44.0 |
| 20 | SiO$_2$ | 1.479 | 87.5 | 87.5 | 87.7 | 81.3 | 80.1 | 82.0 |
| 21 | Ta$_2$O$_5$ | 2.299 | 41.1 | 40.8 | 41.0 | 44.9 | 45.5 | 44.0 |
| 22 | SiO$_2$ | 1.479 | 87.9 | 87.9 | 88.0 | 81.5 | 80.2 | 82.2 |
| 23 | Ta$_2$O$_5$ | 2.299 | 41.0 | 40.6 | 40.8 | 44.9 | 45.5 | 44.0 |
| 24 | SiO$_2$ | 1.479 | 88.1 | 88.1 | 88.1 | 81.6 | 80.2 | 82.3 |
| 25 | Ta$_2$O$_5$ | 2.299 | 40.8 | 40.5 | 40.6 | 44.9 | 45.5 | 43.9 |
| 26 | SiO$_2$ | 1.479 | 88.2 | 88.2 | 88.2 | 81.7 | 80.3 | 82.4 |
| 27 | Ta$_2$O$_5$ | 2.299 | 40.3 | 40.0 | 40.1 | 44.8 | 45.5 | 43.8 |
| 28 | SiO$_2$ | 1.479 | 88.7 | 88.7 | 88.7 | 81.6 | 80.2 | 82.4 |
| 29 | Ta$_2$O$_5$ | 2.299 | 43.2 | 43.0 | 43.0 | 45.8 | 46.1 | 45.1 |
| Substrate | Air | 1.000 | | | | — | | |

Then, in the quartz glass substrates corresponding to the transparent substrate 14a and the transparent substrate 14b, polyimide is applied on the surface opposite to the vapor deposition surface. Then, after baking, rubbing is performed so that an alignment film whose alignment is in one direction is formed. After that, the two quartz glass substrates are stacked in a manner that the rubbing directions are in parallel to each other, and then sealed with using a spacer having a desired thickness. Then, liquid crystal is injected into a gap formed between the two quartz glass substrates so that the substrates are sealed. Then, UV light is projected so that the liquid crystal is cured. As such, the phase difference layer 12 is fabricated that is composed of liquid crystal polymer whose optic axes are aligned in the thickness direction. As a result, the reflection type wave plate 10 is obtained.

Then, linearly polarized light of wavelength 405 nm is projected onto the reflection type wave plate in a state that the incident angle is $\epsilon=45°$ relative to the normal of the plane of the antireflection layer 11. At that time, as for the entering linearly polarized light, an effective azimuth angle $\theta$ is imparted such that the azimuth angle $\phi$ of the phase difference layer 12 should be the angle described in Tables 4 and 5 corresponding to each example. Here, the effective azimuth angle $\theta$ is a value provided with reference to the direction of p-polarization in the plane 21 shown in FIG. 2A. Further, the phase difference $\Delta$ corresponds to the phase difference generated between the light component in the direction of the fast axis and the light component in the direction of the slow axis when the light of wavelength 405 nm enters from the normal direction of the plane of the phase difference layer 12. Further, Tables 4 and 5 show: the effective phase difference $\Gamma$ of the phase difference layer 12 in the case of entering into the reflection type wave plate at an incident angle $\epsilon=45°$; and the value of the phase difference $\psi_r$ in the reflection layer 13 having the configuration described in Tables 2 and 3. Here, the calculation of the phase difference layer 12 was based on a 4×4 matrix method, and the calculation of the reflection layer 13 was based on a characteristic matrix method.

TABLE 4

|  | Example 1 | Example 2 | Example 3 | Example 4 | Example 5 | Example 6 | Example 7 |
|---|---|---|---|---|---|---|---|
| Phase difference layer azimuth angle $\phi$ [deg] | 15.6 | 15.8 | 16.0 | 16.7 | 17.4 | 18.6 | 20.0 |
| Phase difference layer phase difference $\Delta$ [deg] | −130.4 | −121.2 | −112.4 | −103.2 | −94.4 | −85.6 | −77.6 |
| Effective azimuth angle $\theta$ [deg] | 17.5 | 17.6 | 17.9 | 18.6 | 19.5 | 20.7 | 22.3 |
| Effective phase difference $\Gamma$ [deg] | −117.9 | −109.9 | −101.7 | −93.7 | −85.8 | −78.1 | −70.9 |
| Reflection layer phase difference $\psi_r$ [deg] | −3.4 | −17.2 | −31.3 | −45.7 | −60.2 | −74.8 | −89.7 |
| $S_{3o}$ (405 nm) | 1.000 | 1.000 | 1.000 | 1.000 | 1.000 | 1.000 | 1.000 |
| Ellipticity $\kappa$ (405 nm) | 0.995 | 0.997 | 0.993 | 0.997 | 0.997 | 0.997 | 0.998 |
| Ellipticity $\kappa$ (395 nm) | 0.930 | 0.932 | 0.918 | 0.916 | 0.913 | 0.912 | 0.912 |
| Ellipticity $\kappa$ (415 nm) | 0.823 | 0.838 | 0.863 | 0.877 | 0.896 | 0.904 | 0.924 |

TABLE 5

|  | Example 8 | Example 9 | Example 10 | Example 11 | Example 12 | Example 13 |
|---|---|---|---|---|---|---|
| Phase difference layer azimuth angle $\phi$ [deg] | 22.0 | 24.5 | 27.8 | 31.7 | 36.2 | 41.5 |
| Phase difference layer phase difference $\Delta$ [deg] | −69.6 | −62.5 | −56.2 | −51.0 | −47.4 | −45.4 |
| Effective azimuth angle $\theta$ [deg] | 24.4 | 27.1 | 30.7 | 34.7 | 39.6 | 44.8 |
| Effective phase difference $\Gamma$ [deg] | −64.2 | −58.1 | −52.7 | −48.6 | −46.0 | −45.0 |
| Reflection layer phase difference $\psi_r$ [deg] | −104.6 | −119.7 | −134.9 | −150.2 | −165.0 | −179.9 |
| $S_{3o}$ (405 nm) | 1.000 | 1.000 | 1.000 | 1.000 | 1.000 | 1.000 |
| Ellipticity $\kappa$ (405 nm) | 0.997 | 0.998 | 0.996 | 0.998 | 0.997 | 0.998 |
| Ellipticity $\kappa$ (395 nm) | 0.918 | 0.916 | 0.920 | 0.926 | 0.933 | 0.929 |
| Ellipticity $\kappa$ (415 nm) | 0.923 | 0.928 | 0.931 | 0.929 | 0.938 | 0.932 |

Tables 4 and 5 show also the results of calculation of $S_{3o}$ which is the $S_3$ component of the Stokes parameter and the ellipticity $\kappa$ obtained for the light reflected by and exiting the reflection type wave plate with these conditions. As a result, $S_{3o}$ for the light of wavelength 405 nm is 1.000 for the conditions of Examples 1 to 13. Further, the ellipticity $\kappa$ has a value as high as 0.993 or greater for all cases. Further, with these conditions, the ellipticity $\kappa$ for the light of wavelength 395 nm and the light of wavelength 415 nm has a value as high as 0.823 or greater for all cases. This shows that the light exiting the reflection type wave plate in the case of entering of light of a particular band around the wavelength of 405 nm is approximately circularly polarized light.

Example 14

Examples 1 to 13 have been described for the calculation of the polarization state of the light exiting the reflection type wave plate in the case of entering of light of wavelength 395 to 415 nm around the wavelength of 405 nm. In contrast, in Example 14, the polarization state was investigated for the light exiting the reflection type wave plate in a case that the wavelength bandwidth of the entering light is extended further. In Example 14, the same conditions as those in Example 1 were employed for the antireflection layer and the phase difference layer. Further, the reflection layer 13 was formed by alternately stacking $Ta_2O_5$ and $SiO_2$ into a multilayer film having a predetermined film thickness as described in Table 6.

TABLE 6

| Layer number | Material | Refractive index | Film thickness [nm] |
|---|---|---|---|
| Incident medium | $SiO_2$ | 1.479 | — |
| 1 | $Ta_2O_5$ | 2.299 | 22.0 |
| 2 | $SiO_2$ | 1.479 | 51.9 |
| 3 | $Ta_2O_5$ | 2.299 | 25.9 |
| 4 | $SiO_2$ | 1.479 | 83.8 |
| 5 | $Ta_2O_5$ | 2.299 | 19.9 |
| 6 | $SiO_2$ | 1.479 | 84.3 |
| 7 | $Ta_2O_5$ | 2.299 | 28.8 |
| 8 | $SiO_2$ | 1.479 | 62.2 |
| 9 | $Ta_2O_5$ | 2.299 | 34.7 |
| 10 | $SiO_2$ | 1.479 | 61.3 |
| 11 | $Ta_2O_5$ | 2.299 | 28.1 |
| 12 | $SiO_2$ | 1.479 | 85.6 |
| 13 | $Ta_2O_5$ | 2.299 | 30.9 |
| 14 | $SiO_2$ | 1.479 | 63.2 |
| 15 | $Ta_2O_5$ | 2.299 | 37.3 |
| 16 | $SiO_2$ | 1.479 | 64.0 |
| 17 | $Ta_2O_5$ | 2.299 | 37.3 |
| 18 | $SiO_2$ | 1.479 | 63.6 |
| 19 | $Ta_2O_5$ | 2.299 | 37.7 |
| 20 | $SiO_2$ | 1.479 | 64.9 |
| 21 | $Ta_2O_5$ | 2.299 | 40.3 |
| 22 | $SiO_2$ | 1.479 | 68.0 |
| 23 | $Ta_2O_5$ | 2.299 | 44.4 |
| 24 | $SiO_2$ | 1.479 | 70.9 |
| 25 | $Ta_2O_5$ | 2.299 | 47.5 |
| 26 | $SiO_2$ | 1.479 | 72.6 |
| 27 | $Ta_2O_5$ | 2.299 | 48.9 |
| 28 | $SiO_2$ | 1.479 | 73.6 |
| 29 | $Ta_2O_5$ | 2.299 | 50.0 |
| 30 | $SiO_2$ | 1.479 | 74.9 |
| 31 | $Ta_2O_5$ | 2.299 | 49.4 |
| 32 | $SiO_2$ | 1.479 | 76.1 |
| 33 | $Ta_2O_5$ | 2.299 | 50.0 |
| 34 | $SiO_2$ | 1.479 | 76.1 |
| 35 | $Ta_2O_5$ | 2.299 | 49.2 |
| 36 | $SiO_2$ | 1.479 | 76.2 |
| 37 | $Ta_2O_5$ | 2.299 | 48.8 |
| 38 | $SiO_2$ | 1.479 | 76.2 |
| 39 | $Ta_2O_5$ | 2.299 | 48.7 |
| Substrate | Air | 1.000 | — |

Figure 10:
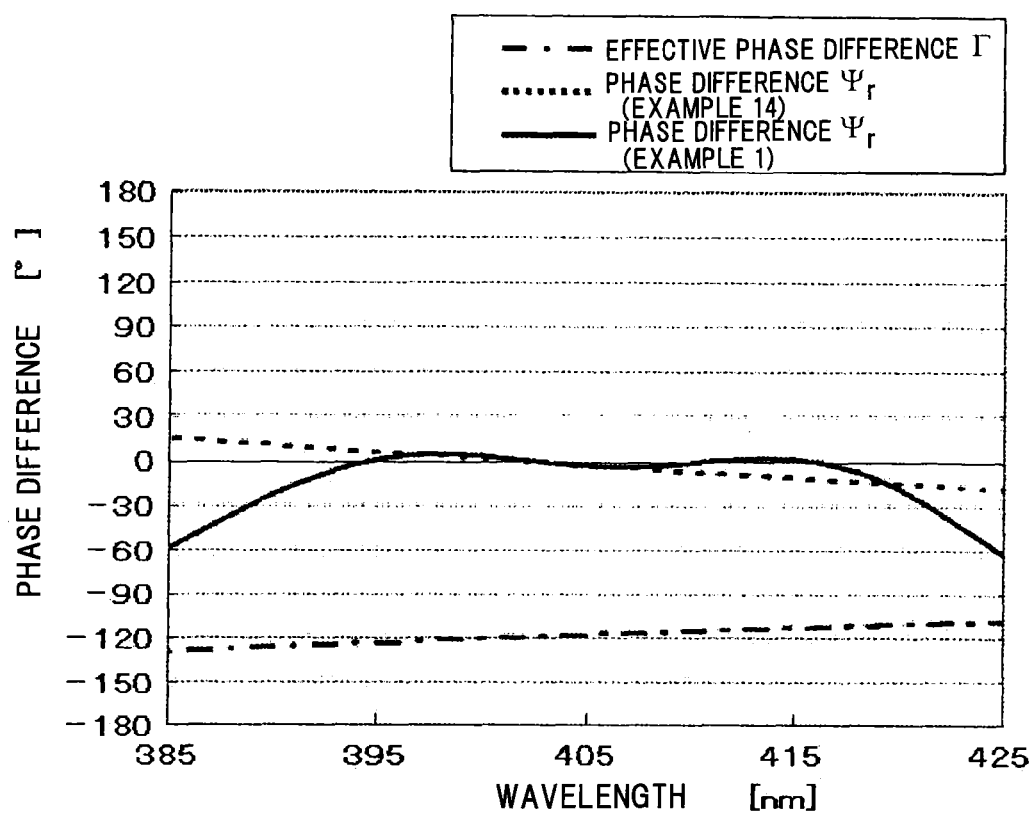
FIG. 10 is a graph showing the wavelength dependence of the effective phase difference $\Gamma$ of a phase difference layer and the phase difference $\psi_r$ of a reflection layer in a reflection type wave plate according to Examples 1 and 14.

Then, FIG. 10 shows the results of calculation of the effective phase difference $\Gamma$ of the phase difference layer and the phase difference $\psi_r$ of the reflection layer with taking into consideration the wavelength dependence (referred to as the wavelength dispersion characteristics, hereinafter) of the refractive index of the utilized material so as to change the wavelength of the entering light within the range from 385 nm to 425 nm. Here, as for the phase difference $\psi_r$ of the reflection layer, the result obtained in Example 1 is shown simultaneously. As seen from this result, in the present example, in particular, when the wavelength band from 385 nm to 425 nm around the wavelength of 405 nm is considered, the phase difference $\psi_r$ of the reflection layer is stabilized further.

Figure 11A:
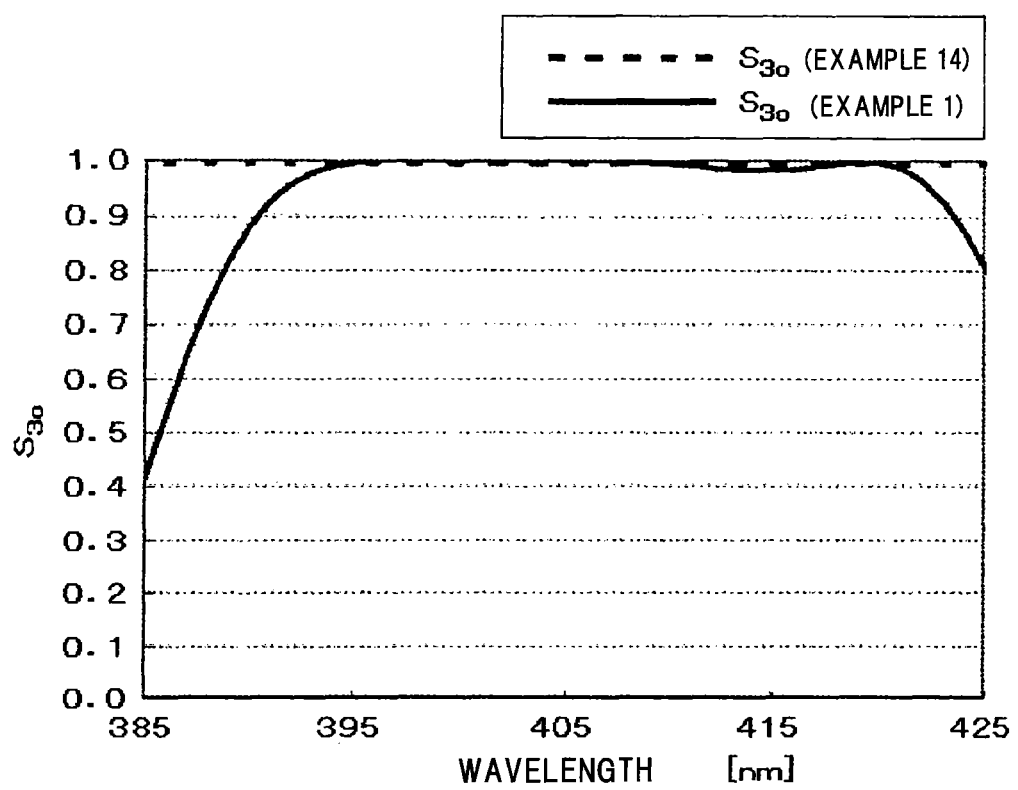
FIG. 11A is a graph showing the wavelength dependence of $S_{3o}$ component of the Stokes parameter in a reflection type wave plate according to Examples 1 and 14.
Figure 11B:
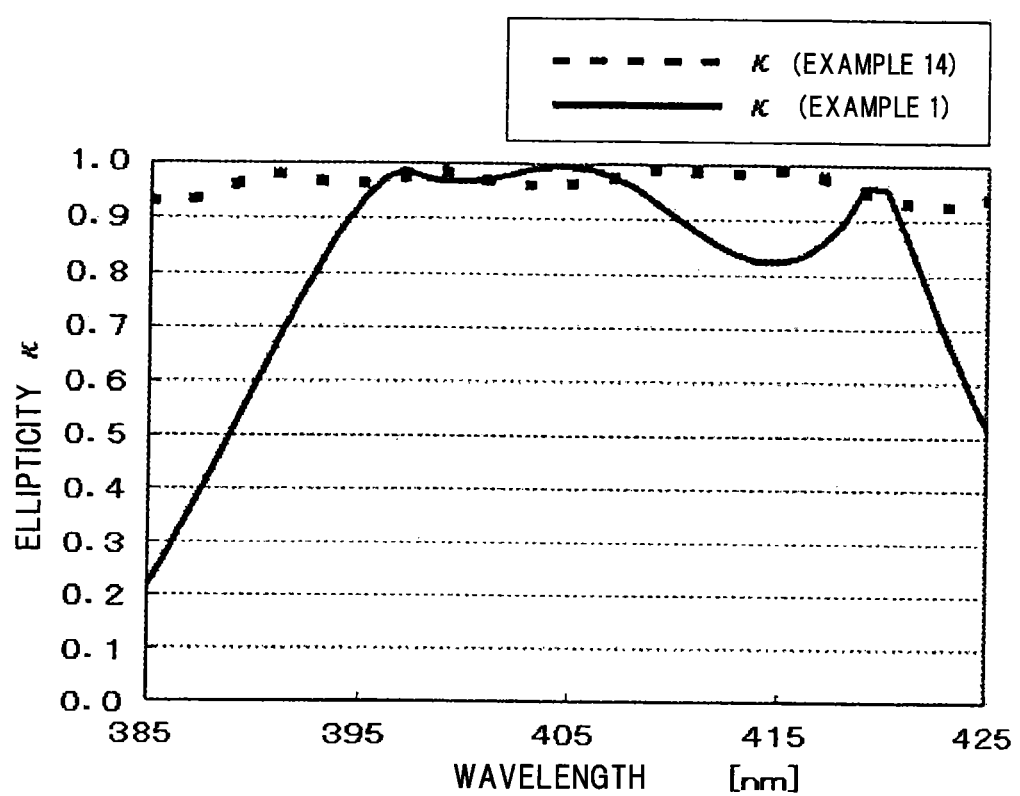
FIG. 11B is a graph showing the wavelength dependence of the ellipticity κ of light exiting a reflection type wave plate according to Examples 1 and 14.

Further, FIGS. 11A and 11B show respectively the results of calculation of $S_{3o}$ which is the $S_3$ component of the Stokes parameter and the ellipticity $\kappa$ for the wavelength range from 385 nm to 425 nm of the entering light. Here, the result obtained in Example 1 is shown simultaneously. As seen from this result, in the present example, in particular, when the wavelength band from 385 nm to 425 nm around the wavelength of 405 nm is considered, $S_{3o}$ and the ellipticity $\kappa$ are stabilized further.

Example 15

Examples 1 to 14 have been described for a design for a case that the entering light has a wavelength band around the wavelength of 405 nm. In contrast, in the present example, in a case that the wavelength of the entering light is composed of two wavelength bands consisting of a 660-nm wavelength band (640 to 680 nm) and a 780-nm wavelength band (760 to 800 nm), the polarization state was investigated for the light of each wavelength band exiting the reflection type wave plate. Here, also in the present example, linearly polarized light is projected in a state that the incident angle is $\epsilon=45°$ relative to the normal of the plane of the antireflection layer 11. In Example 15, as described in Table 7, an antireflection layer is employed that has $Ta_2O_5$ and $SiO_2$ formed alternately in a predetermined film thickness.

TABLE 7

| Layer number | Material | Refractive index | Film thickness [nm] |
|---|---|---|---|
| Incident medium | Air | 1.000 | — |
| 1 | $SiO_2$ | 1.479 | 76.7 |
| 2 | $Ta_2O_5$ | 2.299 | 40.4 |
| 3 | $SiO_2$ | 1.479 | 11.9 |
| 4 | $Ta_2O_5$ | 2.299 | 98.2 |
| 5 | $SiO_2$ | 1.479 | 139.5 |
| 6 | $Ta_2O_5$ | 2.299 | 45.4 |
| 7 | $SiO_2$ | 1.479 | 19.9 |
| 8 | $Ta_2O_5$ | 2.299 | 109.7 |
| Substrate | $SiO_2$ | 1.479 | — |

Further, the phase difference layer 12 has the characteristics that the azimuth angle $\Phi$ is 16° in the X-Y plane corresponding to the plane of the phase difference layer 12 and that the phase difference $\Delta$ is −133.6° for light of wavelength 660 nm and −110.9° for light of wavelength 780 nm. Then, as described in Table 8, the reflection layer 13 is formed by alternately stacking $Ta_2O_5$ and $SiO_2$ into a multilayer film having a predetermined film thickness.

TABLE 8

| Layer number | Material | Refractive index | Film thickness [nm] |
|---|---|---|---|
| Incident medium | $SiO_2$ | 1.479 | — |
| 1 | $Ta_2O_5$ | 2.299 | 17.4 |
| 2 | $SiO_2$ | 1.479 | 184.0 |
| 3 | $Ta_2O_5$ | 2.299 | 33.2 |
| 4 | $SiO_2$ | 1.479 | 89.1 |
| 5 | $Ta_2O_5$ | 2.299 | 85.7 |
| 6 | $SiO_2$ | 1.479 | 81.9 |
| 7 | $Ta_2O_5$ | 2.299 | 55.1 |
| 8 | $SiO_2$ | 1.479 | 116.3 |
| 9 | $Ta_2O_5$ | 2.299 | 65.8 |
| 10 | $SiO_2$ | 1.479 | 109.9 |
| 11 | $Ta_2O_5$ | 2.299 | 66.6 |
| 12 | $SiO_2$ | 1.479 | 108.1 |
| 13 | $Ta_2O_5$ | 2.299 | 69.3 |
| 14 | $SiO_2$ | 1.479 | 99.6 |
| 15 | $Ta_2O_5$ | 2.299 | 61.9 |
| 16 | $SiO_2$ | 1.479 | 109.1 |
| 17 | $Ta_2O_5$ | 2.299 | 66.0 |
| 18 | $SiO_2$ | 1.479 | 118.9 |

TABLE 8-continued

| Layer number | Material | Refractive index | Film thickness [nm] |
|---|---|---|---|
| 19 | $Ta_2O_5$ | 2.299 | 68.4 |
| 20 | $SiO_2$ | 1.479 | 117.4 |
| 21 | $Ta_2O_5$ | 2.299 | 70.2 |
| 22 | $SiO_2$ | 1.479 | 111.3 |
| 23 | $Ta_2O_5$ | 2.299 | 76.6 |
| 24 | $SiO_2$ | 1.479 | 144.6 |
| 25 | $Ta_2O_5$ | 2.299 | 252.6 |
| 26 | $SiO_2$ | 1.479 | 121.9 |
| 27 | $Ta_2O_5$ | 2.299 | 66.1 |
| 28 | $SiO_2$ | 1.479 | 113.5 |
| 29 | $Ta_2O_5$ | 2.299 | 85.2 |
| 30 | $SiO_2$ | 1.479 | 126.7 |
| 31 | $Ta_2O_5$ | 2.299 | 75.2 |
| 32 | $SiO_2$ | 1.479 | 141.3 |
| 33 | $Ta_2O_5$ | 2.299 | 91.4 |
| 34 | $SiO_2$ | 1.479 | 132.3 |
| 35 | $Ta_2O_5$ | 2.299 | 91.9 |
| 36 | $SiO_2$ | 1.479 | 145.3 |
| 37 | $Ta_2O_5$ | 2.299 | 77.3 |
| 38 | $SiO_2$ | 1.479 | 168.8 |
| 39 | $Ta_2O_5$ | 2.299 | 79.0 |
| 40 | $SiO_2$ | 1.479 | 144.8 |
| 41 | $Ta_2O_5$ | 2.299 | 102.7 |
| 42 | $SiO_2$ | 1.479 | 135.9 |
| 43 | $Ta_2O_5$ | 2.299 | 125.9 |
| 44 | $SiO_2$ | 1.479 | 158.6 |
| 45 | $Ta_2O_5$ | 2.299 | 103.7 |
| 46 | $SiO_2$ | 1.479 | 137.3 |
| 47 | $Ta_2O_5$ | 2.299 | 55.6 |
| 48 | $SiO_2$ | 1.479 | 214.3 |
| 49 | $Ta_2O_5$ | 2.299 | 93.5 |
| Substrate | Air | 1.000 | — |

Figure 12:
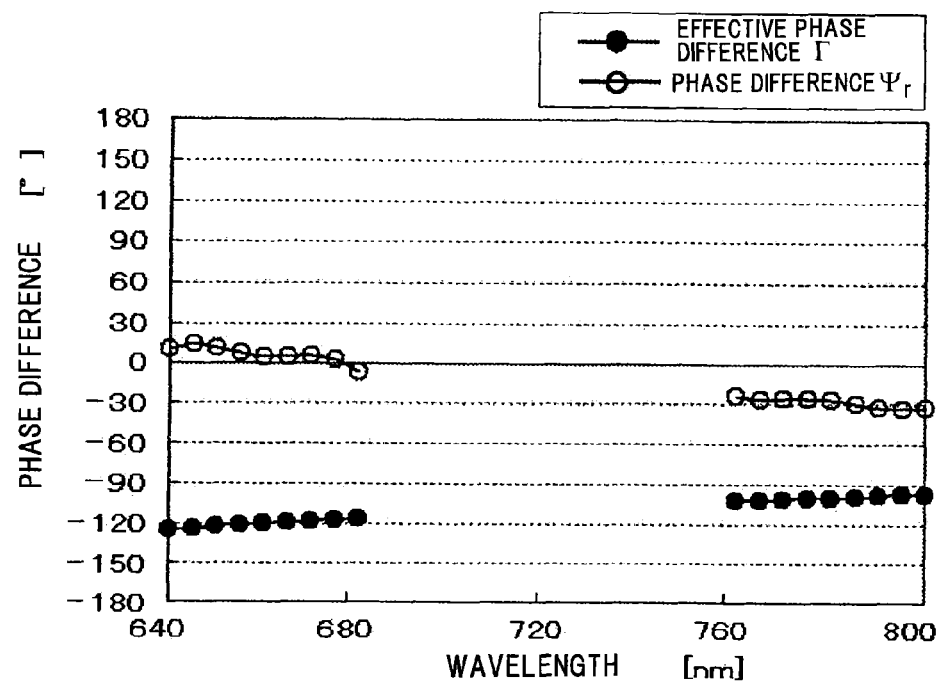
FIG. 12 is a graph showing the wavelength dependence of the effective phase difference Γ of a phase difference layer and the phase difference $\psi_r$ of a reflection layer in a reflection type wave plate according to Example 15.
Figure 13A:
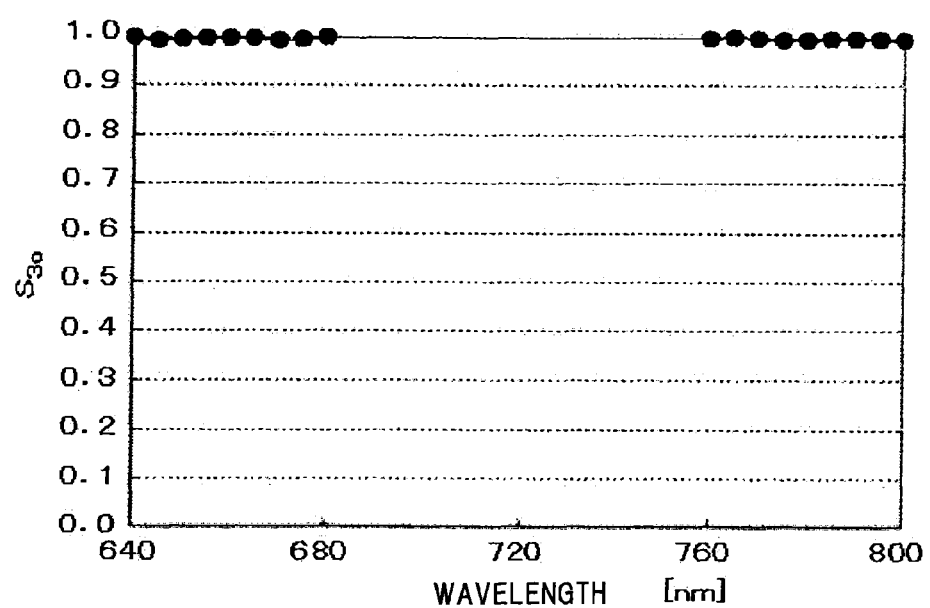
FIG. 13A is a graph showing the wavelength dependence of $S_{3o}$ component of the Stokes parameter in a reflection type wave plate according to Example 15.
Figure 13B:
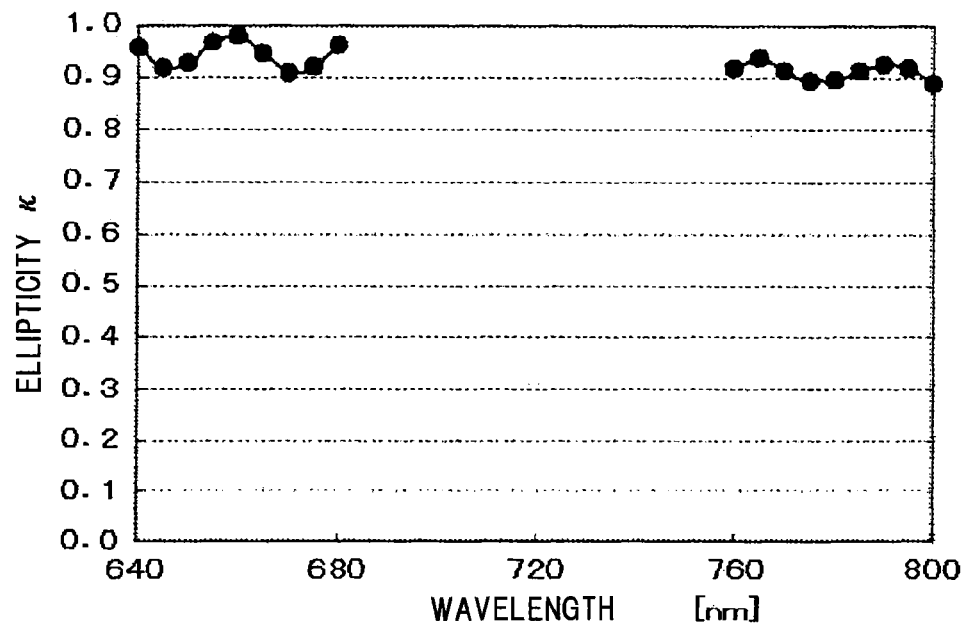
FIG. 13B is a graph showing the wavelength dependence of the ellipticity κ of light exiting a reflection type wave plate according to Example 15.

At that time, the effective azimuth angle θ becomes 18° for light entering at an incident angle of ε=45°. Thus, the effective phase difference Γ and the phase difference ψ$_r$ of the reflection layer 13 for each wavelength band are as shown in FIG. 12. Further, FIGS. 13A and 13B show respectively the results of calculation of S$_{3o}$ which is the S$_3$ component of the Stokes parameter and the ellipticity κ for exiting light of 660-nm wavelength band and 780-nm wavelength band. As seen from these results, in the present example, when the 660-nm wavelength band and the 780-nm wavelength band are considered, S$_{3o}$ and the ellipticity κ are stabilized further. In particular, in these wavelength bands, the ellipticity of the exiting light becomes 0.88 or greater.

Example 16

Each of Examples 1 to 15 has been described for a design for a case that the polarization states of the entering light is linearly polarized. In contrast, in the design in the present example, the entering light 15a (in FIG. 1A or the like) of wavelength 405 nm enters as light having a polarization state different from linear polarization and then is changed into circularly polarized light by a reflection type wave plate. In Example 16, the same antireflection layer as that in the Example described in Table 1 is employed. Further, the phase difference layer 12 has the characteristics that the azimuth angle Φ is −22.8° in the X-Y plane corresponding to the plane of the phase difference layer 12 and that the phase difference Δ is −118.8° for light of wavelength 405 nm. Then, as described in Table 9, the reflection layer 13 is formed by alternately stacking $Ta_2O_5$ and $SiO_2$ into a multilayer film having a predetermined film thickness.

TABLE 9

| Layer number | Material | Refractive index | Film thickness [nm] |
|---|---|---|---|
| Incident medium | $SiO_2$ | 1.479 | — |
| 1 | $Ta_2O_5$ | 2.299 | 59.1 |
| 2 | $SiO_2$ | 1.479 | 22.2 |
| 3 | $Ta_2O_5$ | 2.299 | 13.4 |
| 4 | $SiO_2$ | 1.479 | 79.2 |
| 5 | $Ta_2O_5$ | 2.299 | 46.5 |
| 6 | $SiO_2$ | 1.479 | 77.9 |
| 7 | $Ta_2O_5$ | 2.299 | 45.5 |
| 8 | $SiO_2$ | 1.479 | 77.9 |
| 9 | $Ta_2O_5$ | 2.299 | 45.5 |
| 10 | $SiO_2$ | 1.479 | 77.8 |
| 11 | $Ta_2O_5$ | 2.299 | 45.5 |
| 12 | $SiO_2$ | 1.479 | 77.6 |
| 13 | $Ta_2O_5$ | 2.299 | 45.5 |
| 14 | $SiO_2$ | 1.479 | 77.5 |
| 15 | $Ta_2O_5$ | 2.299 | 45.5 |
| 16 | $SiO_2$ | 1.479 | 77.4 |
| 17 | $Ta_2O_5$ | 2.299 | 45.6 |
| 18 | $SiO_2$ | 1.479 | 77.3 |
| 19 | $Ta_2O_5$ | 2.299 | 45.6 |
| Substrate | Air | 1.000 | — |

Figure 14:
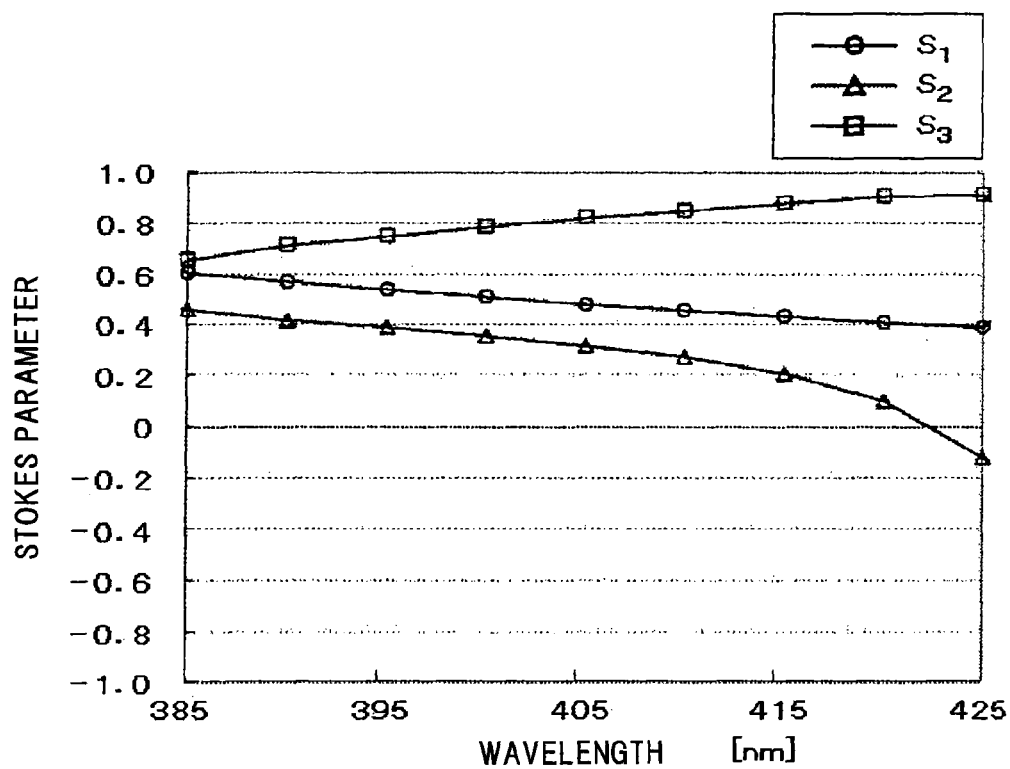
FIG. 14 is a graph showing the Stokes parameter expressing the polarization state of light entering a reflection type wave plate according to Example 16.
Figure 15:
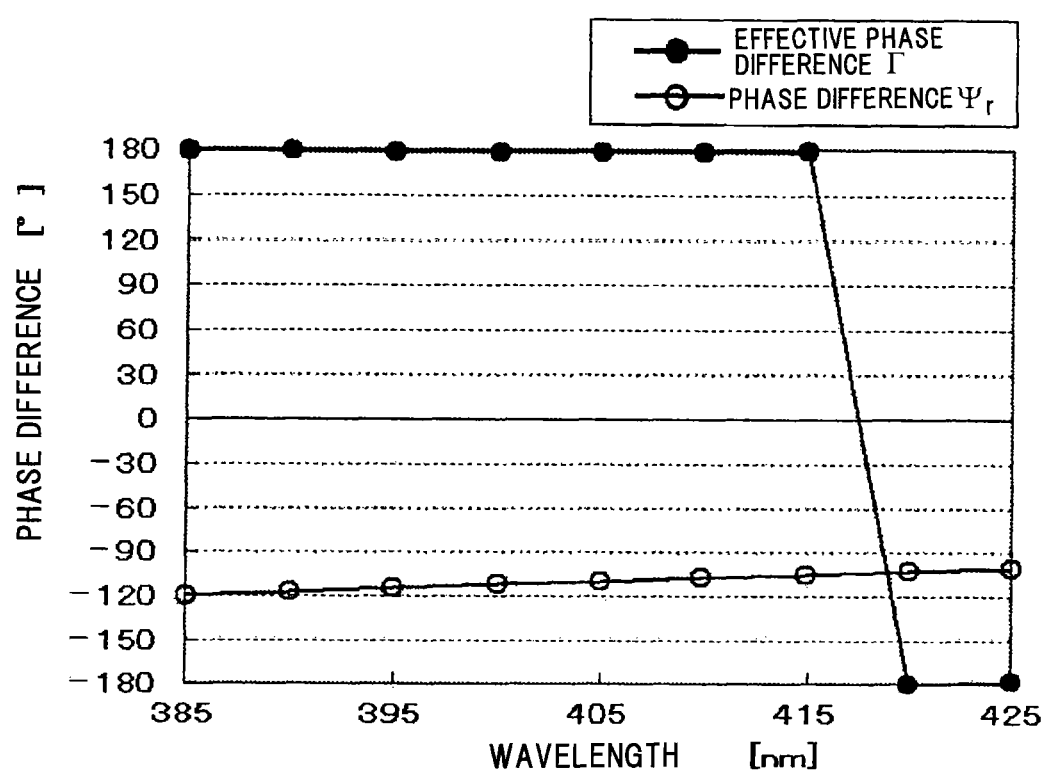
FIG. 15 is a graph showing the wavelength dependence of the effective phase difference Γ of a phase difference layer and the phase difference $\psi_r$ of a reflection layer in a reflection type wave plate according to Example 16.
Figure 16A:
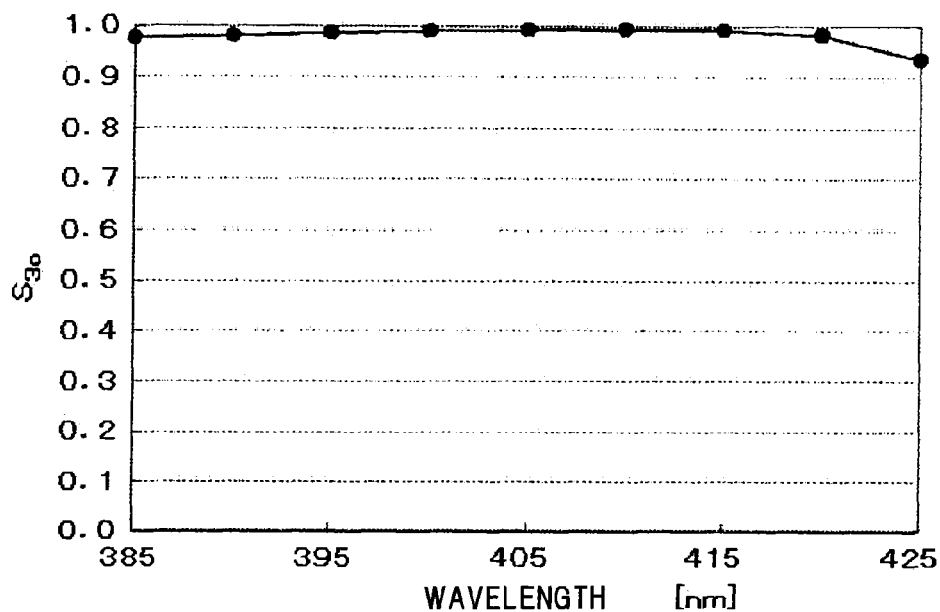
FIG. 16A is a graph showing the wavelength dependence of $S_{3o}$ component of the Stokes parameter in a reflection type wave plate according to Example 16.
Figure 16B:
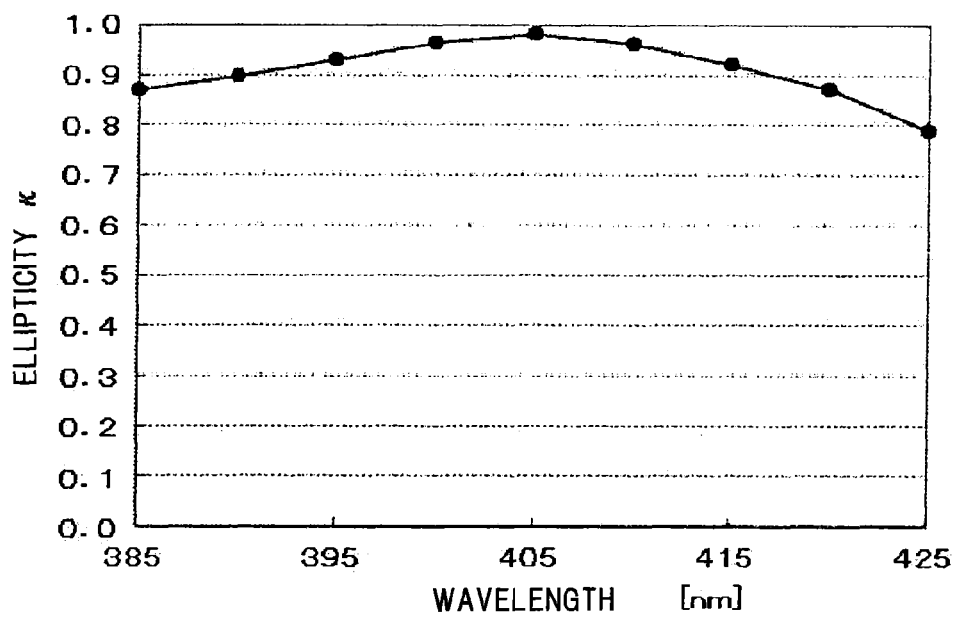
FIG. 16B is a graph showing the wavelength dependence of the ellipticity κ of light exiting a reflection type wave plate according to Example 16.

Further, FIG. 14 shows the three-dimensional vector (S$_1$, S$_2$, S$_3$) of the Stokes parameter expressing the polarization state of the entering light of 405-nm wavelength band. At that time, the effective azimuth angle θ becomes −25° for light entering at an incident angle of ε=45°. Thus, the effective phase difference Γ and the phase difference ψ$_r$ of the reflection layer 13 for 405-nm wavelength band are as shown in FIG. 15. Further, FIGS. 16A and 16B show respectively the results of calculation of S$_{3o}$ which is the S$_3$ component of the Stokes parameter and the ellipticity κ for exiting light of 405-nm wavelength band. As seen from these results, in the present example, when the 405-nm wavelength band is considered, S$_{3o}$ and the ellipticity κ are stabilized further. Thus, in this wavelength band, the ellipticity of the exiting light becomes 0.78 or greater.

Example 17

In Examples 1 to 16, the reflection type wave plate has been designed such as to reflect entering light and bring the light into circularly polarized light. In contrast, in the present example, the reflection type wave plate was designed such that entering light of 780-nm wavelength band and 660-nm wavelength band is reflected and brought into circularly polarized light and that entering light of 405-nm wavelength band is transmitted and brought into circularly polarized light. Here, Example 17 corresponds to the reflection type wave plate 30 according to the second embodiment.

Here, also in the present example, linearly polarized light parallel to the direction of p-polarization is projected in a state that the incident angle is ε=45° relative to the normal of the plane of the antireflection layer 11. In Example 17, the antireflection layer described in Table 7 of Example 15 is employed. Further, the phase difference layer 32 has the characteristics that the azimuth angle Φ is 43° in the X-Y plane corresponding to the plane of the phase difference layer 32 and that the phase difference Δ is −38.1° for light of wavelength 780 nm, −45.9° for light of wavelength 660 nm, and −90.0° for light of wavelength 405 nm. Then, as described in Table 10, the reflection layer 33 is formed by alternately stacking $Ta_2O_5$ and $SiO_2$ into a multilayer film having a predetermined film thickness.

TABLE 10

| Layer number | Material | Refractive index | Film thickness [nm] |
|---|---|---|---|
| Incident medium | $SiO_2$ | 1.479 | — |
| 1 | $Ta_2O_5$ | 2.299 | 10.3 |
| 2 | $SiO_2$ | 1.479 | 10.0 |
| 3 | $Ta_2O_5$ | 2.299 | 87.4 |
| 4 | $SiO_2$ | 1.479 | 46.8 |
| 5 | $Ta_2O_5$ | 2.299 | 13.2 |
| 6 | $SiO_2$ | 1.479 | 166.3 |
| 7 | $Ta_2O_5$ | 2.299 | 80.2 |
| 8 | $SiO_2$ | 1.479 | 134.5 |
| 9 | $Ta_2O_5$ | 2.299 | 87.6 |
| 10 | $SiO_2$ | 1.479 | 138.1 |
| 11 | $Ta_2O_5$ | 2.299 | 87.9 |
| 12 | $SiO_2$ | 1.479 | 135.0 |
| 13 | $Ta_2O_5$ | 2.299 | 81.0 |
| 14 | $SiO_2$ | 1.479 | 74.0 |
| 15 | $Ta_2O_5$ | 2.299 | 12.4 |
| 16 | $SiO_2$ | 1.479 | 40.5 |
| 17 | $Ta_2O_5$ | 2.299 | 23.1 |
| 18 | $SiO_2$ | 1.479 | 107.1 |
| 19 | $Ta_2O_5$ | 2.299 | 6.9 |
| 20 | $SiO_2$ | 1.479 | 17.4 |
| 21 | $Ta_2O_5$ | 2.299 | 67.3 |
| 22 | $SiO_2$ | 1.479 | 137.5 |
| 23 | $Ta_2O_5$ | 2.299 | 86.1 |
| 24 | $SiO_2$ | 1.479 | 143.7 |
| 25 | $Ta_2O_5$ | 2.299 | 83.6 |
| 26 | $SiO_2$ | 1.479 | 144.5 |
| 27 | $Ta_2O_5$ | 2.299 | 84.2 |
| 28 | $SiO_2$ | 1.479 | 140.6 |
| 29 | $Ta_2O_5$ | 2.299 | 85.7 |
| 30 | $SiO_2$ | 1.479 | 146.8 |
| 31 | $Ta_2O_5$ | 2.299 | 72.9 |
| 32 | $SiO_2$ | 1.479 | 63.3 |
| Substrate | Air | 1.000 | — |

At that time, the effective azimuth angle θ for light entering at an incident angle of $\epsilon=45°$ is 46.5° for light of wavelength 780 nm, 46.7° for light of wavelength 660 nm, and 46.4° for light of wavelength 405 nm. Then, the effective phase difference Γ is −39.2° for light of wavelength 780 nm, −45.8° for light of wavelength 660 nm, and −89.6° for light of wavelength 405 nm. Further, the phase difference $\psi_r$ at the time of reflection by the reflection layer 33 is −179.4° for light of wavelength 780 nm and 179.6° for light of wavelength 660 nm. Furthermore, the phase difference $\psi_t$ at the time of transmission through the reflection layer 33 is −2.3° for light of wavelength 405 nm.

Figure 17A:
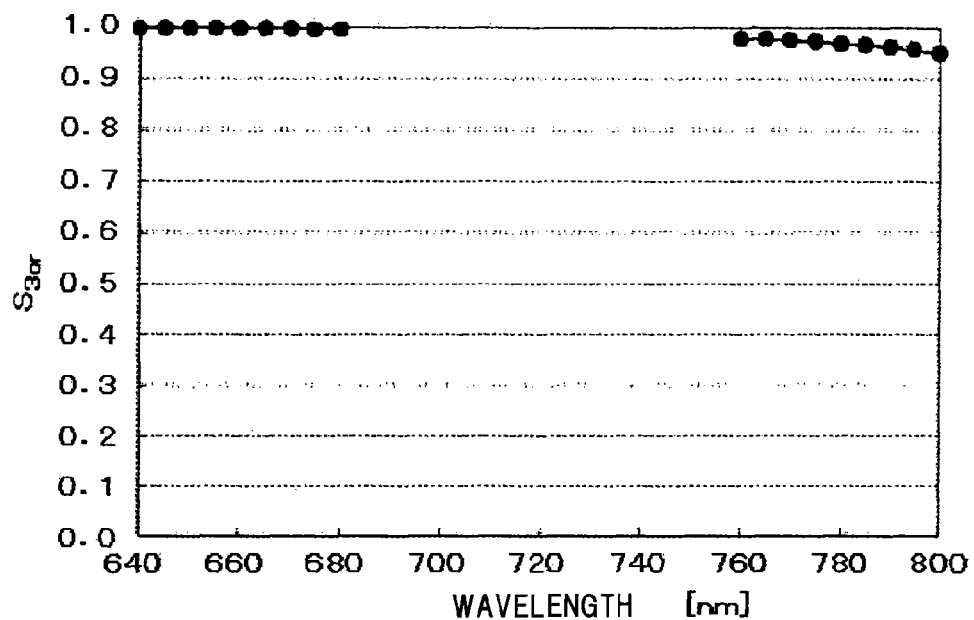
FIG. 17A is a graph showing the wavelength dependence (640 to 800 nm) of $S_{3or}$ component of the Stokes parameter in a reflection type wave plate according to Example 17.
Figure 17B:
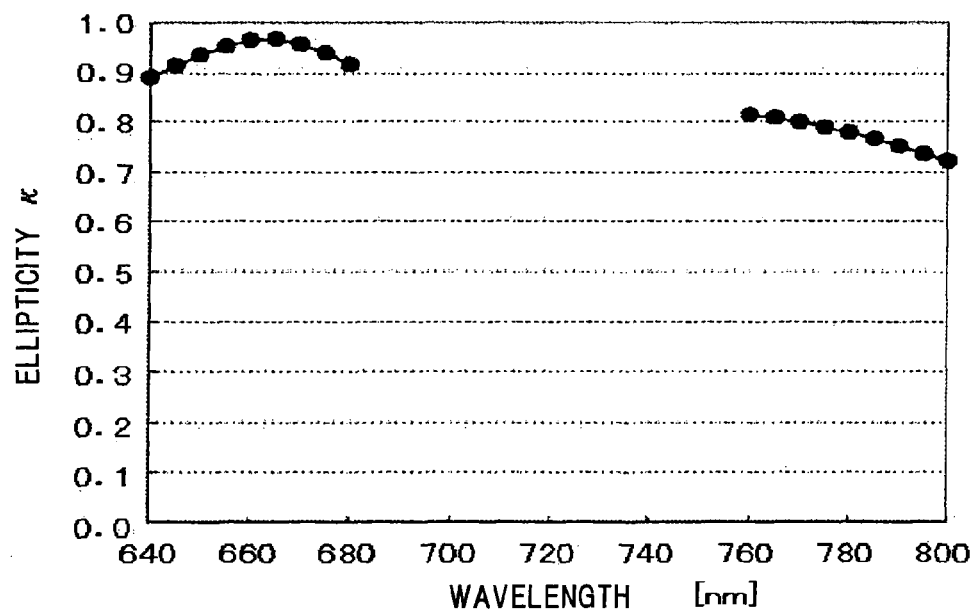
FIG. 17B is a graph showing the wavelength dependence (640 to 800 nm) of the ellipticity κ of light exiting a reflection type wave plate according to Example 17.
Figure 17C:
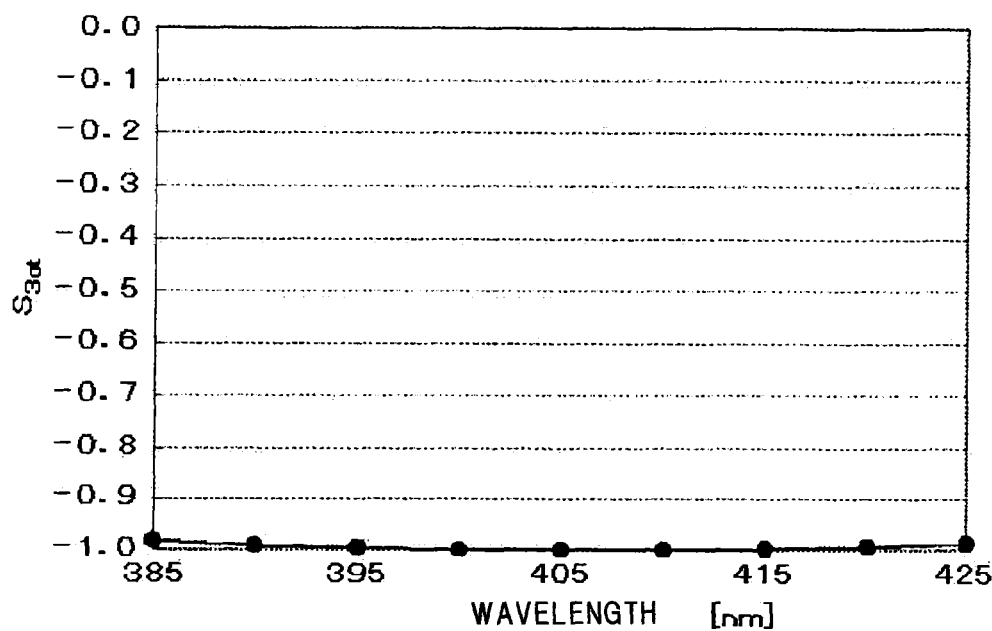
FIG. 17C is a graph showing the wavelength dependence (385 to 425 nm) of $S_{3ot}$ component of the Stokes parameter in a reflection type wave plate according to Example 17.
Figure 17D:
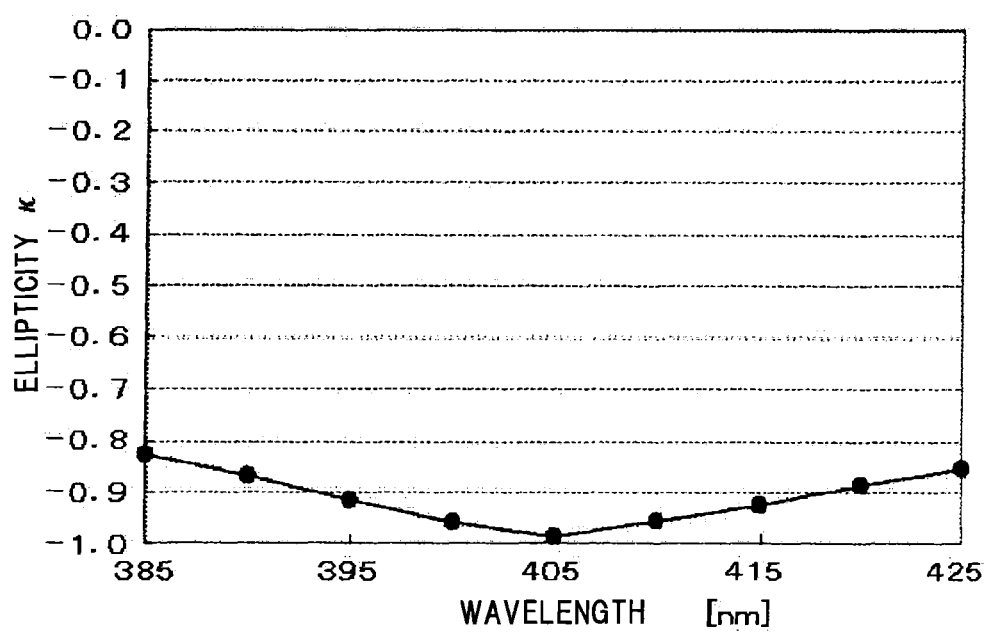
FIG. 17D is a graph showing the wavelength dependence (385 to 425 nm) of the ellipticity κ of light exiting a reflection type wave plate according to Example 17.

Further, FIGS. 17A to 17D show the results of calculation of $S_{3o}$ and the ellipticity κ of light of each wavelength band with these conditions. First, FIG. 17A shows $S_{3o}$ ($=S_{3or}$) for light of 780-nm wavelength band and light of 660-nm wavelength band calculated on the basis of Formulas (4) and (5a) to (5c). FIG. 17B shows the result of characteristics of the ellipticity κ of the light 16a in FIG. 3. Further, FIG. 17C shows $S_{3o}$ ($=S_{3ot}$) for light of 405-nm wavelength band calculated on the basis of Formulas (8) and (9a) to (9c). FIG. 17D shows the result of characteristics of the ellipticity κ of the light 37 in FIG. 3. As seen from this result, the light of each wavelength band reflected by or transmitted through the reflection type wave plate according to the present example exits in the form of circularly polarized light having an ellipticity κ of 0.7 or greater.

Example 18

The present example corresponds to the reflection type wave plate 40 according to the third embodiment. Then, a configuration is employed that the first phase difference layer 42a and the second phase difference layer 42b each having an optic axis aligned in the thickness direction are stacked in a manner that their optic axes intersect with each other. Each of the first phase difference layer 42a and the second phase difference layer 42b is composed of liquid crystal polymer fabricated by polymerization and curing of a liquid crystal monomer. In the reflection type wave plate according to the present example, after formation of liquid crystal polymer corresponding to the first phase difference layer 42a, the substrate opposite to the quartz glass substrate corresponding to the transparent substrate 14a is removed. Similarly, after formation of liquid crystal polymer corresponding to the second phase difference layer 42b, the substrate opposite to the quartz glass substrate corresponding to the transparent substrate 14b is removed. Then, the layers are bonded to each other with transparent adhesives in a manner that the liquid crystal polymer films are opposite to each other and that the directions of the slow axes differ from each other.

Here, also in the present example, linearly polarized light parallel to the direction of p-polarization is projected in a state that the incident angle is $\epsilon=45°$ relative to the normal of the plane of the antireflection layer 11. In Example 18, the antireflection layer described in Table 7 of Example 15 is employed. Further, the first phase difference layer 42a has the characteristics that the azimuth angle Φ is 96.5° in the X-Y plane corresponding to the plane of the first phase difference layer 42a and that the phase difference Δ is −162.7° for light of wavelength 780 nm, −195.9° for light of wavelength 660 nm, and −384.0° for light of wavelength 405 nm. Further, the second phase difference layer 42b has the characteristics that the azimuth angle Φ is 46.2° in the X-Y plane corresponding to the plane of the second phase difference layer 42b and that the phase difference Δ is −42.4° for light of wavelength 780 nm, −51.0° for light of wavelength 660 nm, and −100.0° for light of wavelength 405 nm. Then, as described in Table 11, the reflection layer 43 is formed by alternately stacking $Ta_2O_5$ and $SiO_2$ into a multilayer film having a predetermined film thickness.

TABLE 11

| Layer number | Material | Refractive index | Film thickness [nm] |
|---|---|---|---|
| Incident medium | $SiO_2$ | 1.479 | — |
| 1 | $Ta_2O_5$ | 2.299 | 16.3 |
| 2 | $SiO_2$ | 1.479 | 46.1 |
| 3 | $Ta_2O_5$ | 2.299 | 34.1 |
| 4 | $SiO_2$ | 1.479 | 47.4 |
| 5 | $Ta_2O_5$ | 2.299 | 16.5 |
| 6 | $SiO_2$ | 1.479 | 391.1 |
| 7 | $Ta_2O_5$ | 2.299 | 94.3 |
| 8 | $SiO_2$ | 1.479 | 209.2 |
| 9 | $Ta_2O_5$ | 2.299 | 86.4 |
| 10 | $SiO_2$ | 1.479 | 117.3 |
| 11 | $Ta_2O_5$ | 2.299 | 88.3 |
| 12 | $SiO_2$ | 1.479 | 143.4 |
| 13 | $Ta_2O_5$ | 2.299 | 83.8 |
| 14 | $SiO_2$ | 1.479 | 142.1 |
| 15 | $Ta_2O_5$ | 2.299 | 85.2 |
| 16 | $SiO_2$ | 1.479 | 140.2 |
| 17 | $Ta_2O_5$ | 2.299 | 85.6 |
| 18 | $SiO_2$ | 1.479 | 140.3 |
| 19 | $Ta_2O_5$ | 2.299 | 84.1 |
| 20 | $SiO_2$ | 1,479 | 141.0 |
| 21 | $Ta_2O_5$ | 2.299 | 77.6 |
| 22 | $SiO_2$ | 1.479 | 133.1 |
| 23 | $Ta_2O_5$ | 2.299 | 84.4 |
| 24 | $SiO_2$ | 1.479 | 17.7 |
| 25 | $Ta_2O_5$ | 2.299 | 93.5 |
| 26 | $SiO_2$ | 1.479 | 133.1 |
| 27 | $Ta_2O_5$ | 2.299 | 87.1 |
| 28 | $SiO_2$ | 1.479 | 139.1 |
| 29 | $Ta_2O_5$ | 2.299 | 71.3 |
| 30 | $SiO_2$ | 1.479 | 57.0 |
| Substrate | Air | 1.000 | — |

At that time, for light entering at an incident angle of $\epsilon=45°$, the effective azimuth angle $\theta_1$ of the first phase difference layer 42a is 95.8° for light of wavelength 780 nm, 95.8° for light of wavelength 660 nm, and 46.4° for light of wavelength 405 nm. Then, the effective phase difference $\Gamma_1$ of the first phase difference layer 42a is −182.9° for light of wavelength 780 nm, −220.1° for light of wavelength 660 nm, and −429.6° for light of wavelength 405 nm.

Further, the effective azimuth angle $\theta_2$ of the second phase difference layer 42b is 49.7° for light of wavelength 780 nm, 49.8° for light of wavelength 660 nm, and 49.6° for light of wavelength 405 nm. Then, the effective phase difference $\Gamma_2$ of the second phase difference layer 42b is −42.8° for light of wavelength 780 nm, −51.6° for light of wavelength 660 nm, and −101.0° for light of wavelength 405 nm. Further, the phase difference $\psi_r$ at the time of reflection by the reflection layer is −165.9° for light of wavelength 780 nm and 143.0° for light of wavelength 660 nm. Furthermore, the phase difference $\psi_t$ at the time of transmission through the reflection layer is 0.0° for light of wavelength 405 nm.

Figure 18A:
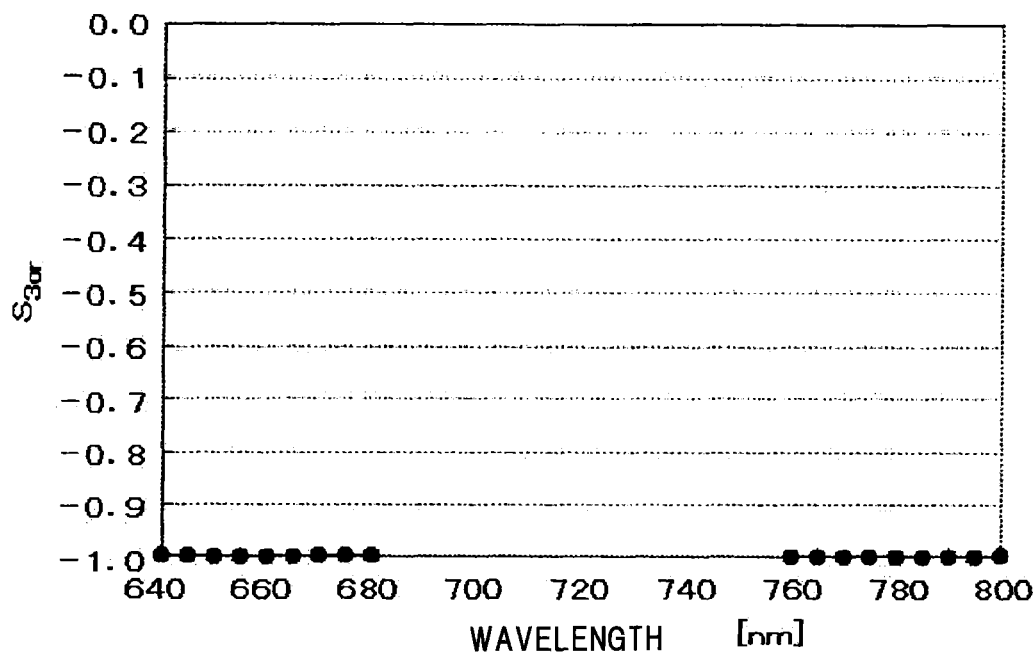
FIG. 18A is a graph showing the wavelength dependence (640 to 800 nm) of $S_{3o}$ component of the Stokes parameter in a reflection type wave plate according to Example 18.
Figure 18B:
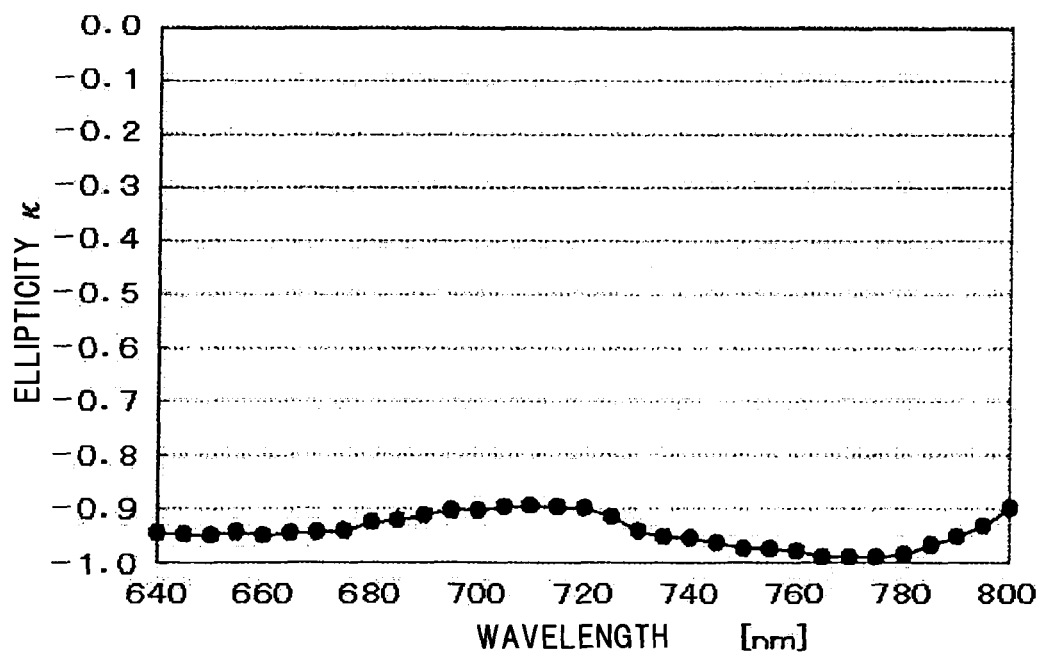
FIG. 18B is a graph showing the wavelength dependence (640 to 800 nm) of the ellipticity κ of light exiting a reflection type wave plate according to Example 18.
Figure 18C:
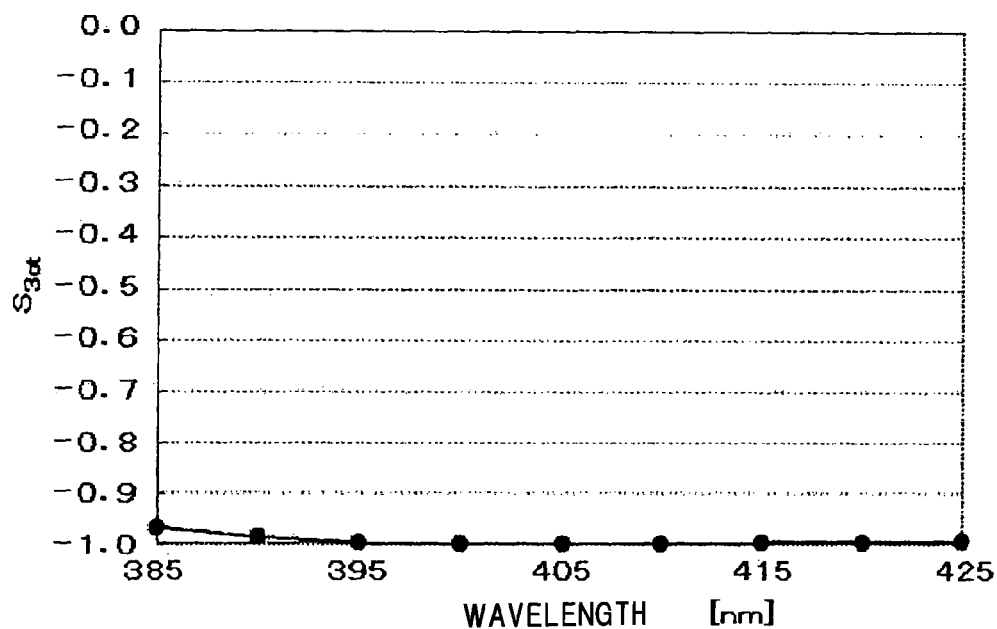
FIG. 18C is a graph showing the wavelength dependence (385 to 425 nm) of $S_{3ot}$ component of the Stokes parameter in a reflection type wave plate according to Example 18.
Figure 18D:
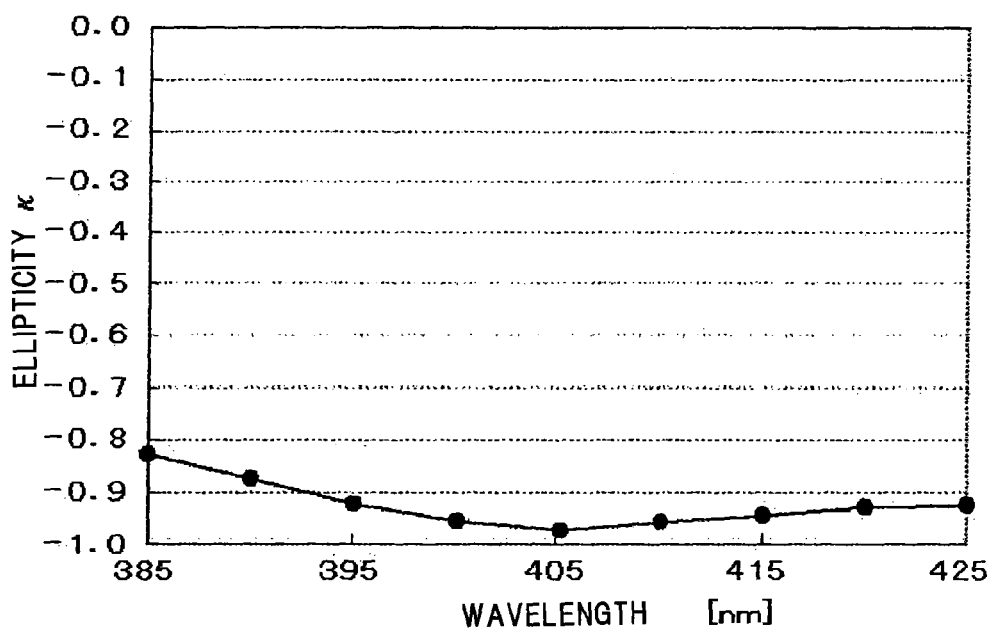
FIG. 18D is a graph showing the wavelength dependence (385 to 425 nm) of the ellipticity κ of light exiting a reflection type wave plate according to Example 18.

Further, FIGS. 18A to 18D show the results of calculation of $S_{3o}$ and the ellipticity κ of light of each wavelength band with these conditions. First, FIG. 18A shows $S_{3o}$ ($=S_{3or}$) for light of 780-nm wavelength band and light of 660-nm wavelength band calculated on the basis of Formula (11a). FIG. 18B shows the result of characteristics of the ellipticity κ of the light 16a in FIG. 4. Further, FIG. 18C shows $S_{3o}$ ($=S_{3ot}$) for light of 405-nm wavelength band calculated on the basis of Formula (11b). FIG. 18D shows the result of characteristics of the ellipticity κ of the light 47 in FIG. 4. As seen from this result, the light of each wavelength band reflected by or transmitted through the reflection type wave plate according to the present example exits in the form of circularly polarized light having an ellipticity κ of 0.8 or greater.

Example 19

The present example treats a modification of the reflection type wave plate 40 according to the third embodiment, and provides calculation for a design configuration that without the transparent substrate 14a, the antireflection layer 11 is formed on the first phase difference layer 42a. In the transparent substrate 14b, a multilayer film described in Table 11 is formed on one plane of a quartz glass substrate. Then, a liquid crystal polymer corresponding to the second phase difference layer 42b having the same configuration as that of Example 18 is formed on the opposite surface. Further, a liquid crystal polymer corresponding to the first phase difference layer 42a having the same configuration as Example 18 is formed on one plane of a quartz glass substrate. Then, the layers are bonded to each other with transparent adhesives in a manner that the liquid crystal polymer films are opposite to each other and that the directions of the slow axes differ from each other. After that, the quartz glass substrate on the liquid crystal polymer side corresponding to the first phase difference layer 42a is removed. Then, the antireflection layer 11 described in Table 7 of Example 15 is formed on the liquid crystal polymer.

Figure 19A:
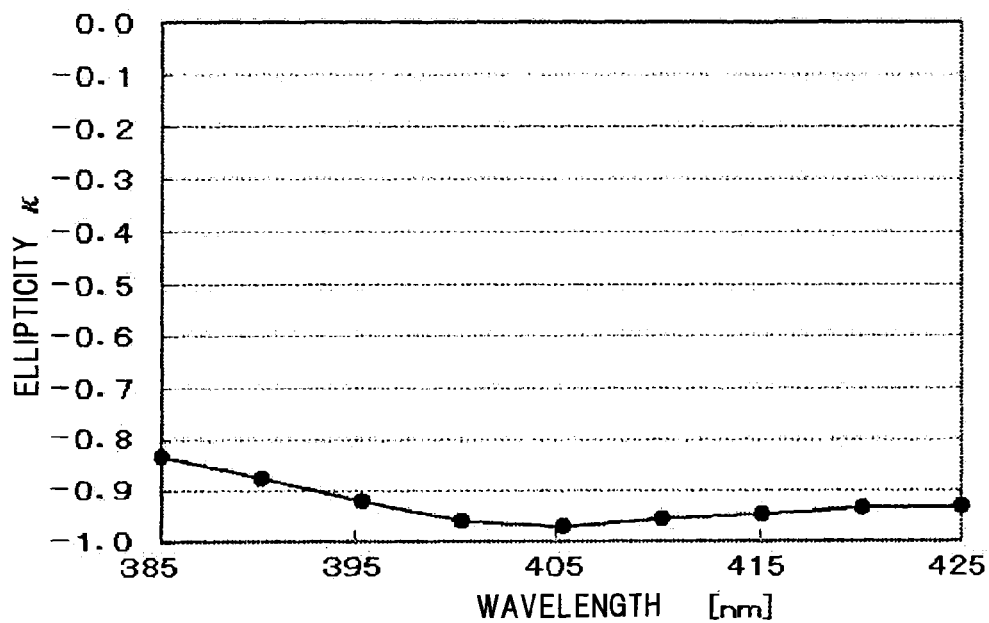
FIG. 19A is a graph showing the wavelength dependence (385 to 425 nm) of the ellipticity κ of light exiting a reflection type wave plate according to Example 19.
Figure 19B:
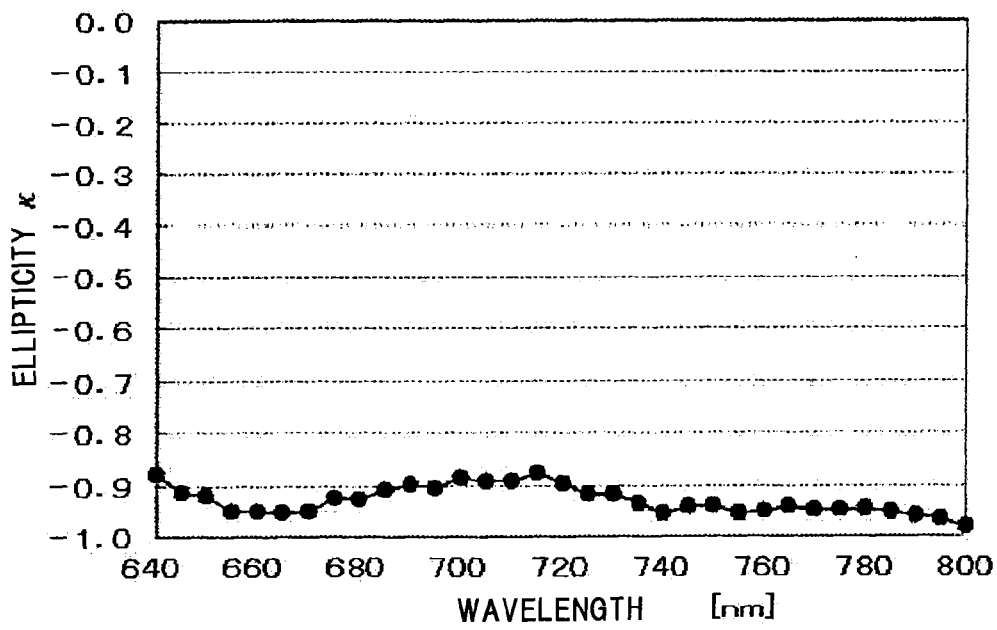
FIG. 19B is a graph showing the wavelength dependence (640 to 800 nm) of the ellipticity κ of light exiting a reflection type wave plate according to Example 19.

The conditions of entering light are the same as those in Example 18. FIGS. 19A and 19B show the results of calculation of the ellipticity κ of light of each wavelength band with these conditions. As seen from this result, the light of each wavelength band reflected by or transmitted through the reflection type wave plate according to the present example exits in the form of circularly polarized light having an ellipticity κ of 0.8 or greater.

Example 20

In the present example, a situation is considered that the reflection type wave plate 40 in Example 18 is employed and that a reflection mirror for reflecting light of 405-nm wavelength band is provided in the direction of travel of the light of 405-nm wavelength band that travels straight and is transmitted through the reflection type wave plate 40 in the form of circularly polarized light. In particular, the positional relation between the reflection type wave plate 40 and the reflection mirror 205 in the optical head device 200 is considered. Further, in the reflection mirror, a multilayer film formed by alternately stacking $Ta_2O_5$ and $SiO_2$ onto a transparent substrate into a predetermined film thickness as described in Table 12 is arranged at an angle of 45° relative to the direction of travel of the light. Here, such a design is adopted that a phase difference of −180° is generated for the entering light of 405-nm wavelength band.

TABLE 12

| Layer number | Material | Refractive index | Film thickness [nm] |
|---|---|---|---|
| Incident medium | Air | 1.000 | — |
| 1 | $SiO_2$ | 1.479 | 79.8 |
| 2 | $Ta_2O_5$ | 2.299 | 145.4 |
| 3 | $SiO_2$ | 1.479 | 34.4 |
| 4 | $Ta_2O_5$ | 2.299 | 170.2 |
| 5 | $SiO_2$ | 1.479 | 36.8 |
| 6 | $Ta_2O_5$ | 2.299 | 223.2 |
| 7 | $SiO_2$ | 1.479 | 54.2 |
| 8 | $Ta_2O_5$ | 2.299 | 17.8 |
| 9 | $SiO_2$ | 1.479 | 58.3 |
| 10 | $Ta_2O_5$ | 2.299 | 132.6 |
| 11 | $SiO_2$ | 1.479 | 66.7 |
| 12 | $Ta_2O_5$ | 2.299 | 149.4 |
| 13 | $SiO_2$ | 1.479 | 77.5 |
| 14 | $Ta_2O_5$ | 2.299 | 60.6 |
| 15 | $SiO_2$ | 1.479 | 81.6 |
| 16 | $Ta_2O_5$ | 2.299 | 55.6 |
| 17 | $SiO_2$ | 1.479 | 79.6 |
| 18 | $Ta_2O_5$ | 2.299 | 51.0 |
| 19 | $SiO_2$ | 1.479 | 75.4 |
| 20 | $Ta_2O_5$ | 2.299 | 47.9 |
| 21 | $SiO_2$ | 1.479 | 76.1 |
| 22 | $Ta_2O_5$ | 2.299 | 44.6 |
| 23 | $SiO_2$ | 1.479 | 76.4 |
| 24 | $Ta_2O_5$ | 2.299 | 43.9 |
| 25 | $SiO_2$ | 1.479 | 76.4 |
| 26 | $Ta_2O_5$ | 2.299 | 46.5 |
| 27 | $SiO_2$ | 1.479 | 76.2 |
| 28 | $Ta_2O_5$ | 2.299 | 43.1 |
| 29 | $SiO_2$ | 1.479 | 75.8 |
| 30 | $Ta_2O_5$ | 2.299 | 41.7 |
| 31 | $SiO_2$ | 1.479 | 392.6 |
| 32 | $Ta_2O_5$ | 2.299 | 42.6 |
| 33 | $SiO_2$ | 1.479 | 76.9 |
| 34 | $Ta_2O_5$ | 2.299 | 46.6 |
| Substrate | $SiO_2$ | 1.479 | — |

Figure 20:
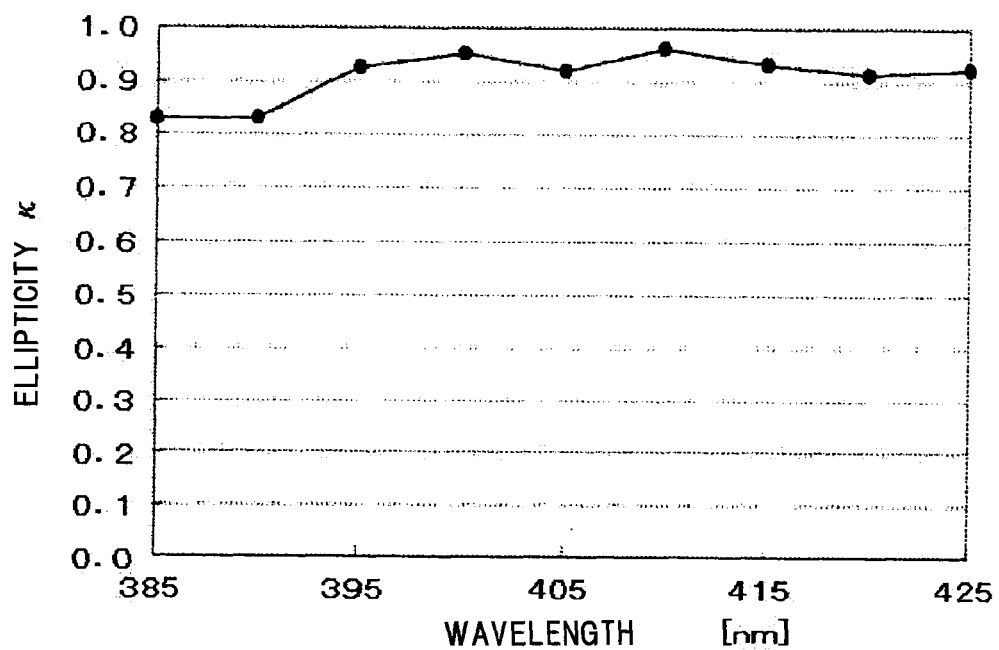
FIG. 20 is a graph showing the wavelength dependence of the ellipticity κ of light reflected by a reflection mirror according to Example 20.

The conditions of entering light are the same as those in Example 18. FIG. 20 shows the result of calculation of the ellipticity κ of light of 405-nm wavelength band with these conditions. As seen from this result, the light of each wavelength band reflected by or transmitted through the reflection type wave plate according to the present example exits in the form of circularly polarized light having an ellipticity κ of 0.8 or greater.

Example 21

The present example corresponds to the reflection type wave plate 50 according to the fourth embodiment. Then, a configuration is employed that the first phase difference layer 52a and the second phase difference layer 52b each having an optic axis aligned in the thickness direction are stacked in a manner that their optic axes intersect with each other. The first phase difference layer 52a and the second phase difference layer 52b are formed by the fabrication method according to Example 18, and then bonded with transparent adhesives in a manner that their liquid crystal polymer layers are opposite to each other and the directions of their slow axes are different from each other. In the present example, the reflection type wave plate was designed such that entering light of 780-nm wavelength band and 660-nm wavelength band are reflected and brought into circularly polarized light and that entering light of 405-nm wavelength band is transmitted and brought into linearly polarized light in the direction of approximately 45° relative to the direction of p-polarized light.

Here, also in the present example, linearly polarized light parallel to the direction of p-polarization is projected in a state that the incident angle is $\epsilon=45°$ relative to the normal of the plane of the antireflection layer 11. In Example 21, as described in Table 7 in Example 15, an antireflection layer is employed that has $Ta_2O_5$ and $SiO_2$ formed alternately in a predetermined film thickness. Further, the first phase difference layer 52a has the characteristics that the azimuth angle Φ is 85.0° in the X-Y plane corresponding to the plane of the first phase difference layer 52a and that the phase difference Δ is −76.3° for light of wavelength 780 nm, −91.8° for light of wavelength 660 nm, and −180.0° for light of wavelength 405 nm. Further, the second phase difference layer 52b has the characteristics that the azimuth angle Φ is 15.6° in the X-Y plane corresponding to the plane of the second phase difference layer 52b and that the phase difference Δ is −84.8° for light of wavelength 780 nm, −102.0° for light of wavelength 660 nm, and −200.0° for light of wavelength 405 nm. Then, as described in Table 13, the reflection layer 53 is formed by alternately stacking $Ta_2O_5$ and $SiO_2$ into a multilayer film having a predetermined film thickness.

TABLE 13

| Layer number | Material | Refractive index | Film thickness [nm] |
|---|---|---|---|
| Incident medium | $SiO_2$ | 1.479 | — |
| 1 | $Ta_2O_5$ | 2.299 | 10.3 |
| 2 | $SiO_2$ | 1.479 | 10.0 |
| 3 | $Ta_2O_5$ | 2.299 | 87.4 |
| 4 | $SiO_2$ | 1.479 | 46.8 |
| 5 | $Ta_2O_5$ | 2.299 | 13.2 |
| 6 | $SiO_2$ | 1.479 | 166.3 |
| 7 | $Ta_2O_5$ | 2.299 | 80.2 |
| 8 | $SiO_2$ | 1.479 | 134.5 |
| 9 | $Ta_2O_5$ | 2.299 | 87.6 |
| 10 | $SiO_2$ | 1.479 | 138.1 |
| 11 | $Ta_2O_5$ | 2.299 | 87.9 |
| 12 | $SiO_2$ | 1.479 | 135.0 |
| 13 | $Ta_2O_5$ | 2.299 | 81.0 |
| 14 | $SiO_2$ | 1.479 | 74.0 |
| 15 | $Ta_2O_5$ | 2.299 | 12.4 |
| 16 | $SiO_2$ | 1.479 | 40.5 |
| 17 | $Ta_2O_5$ | 2.299 | 23.1 |
| 18 | $SiO_2$ | 1.479 | 107.1 |
| 19 | $Ta_2O_5$ | 2.299 | 6.9 |
| 20 | $SiO_2$ | 1.479 | 17.4 |
| 21 | $Ta_2O_5$ | 2.299 | 67.3 |
| 22 | $SiO_2$ | 1.479 | 137.5 |
| 23 | $Ta_2O_5$ | 2.299 | 86.1 |
| 24 | $SiO_2$ | 1.479 | 143.7 |
| 25 | $Ta_2O_5$ | 2.299 | 83.6 |
| 26 | $SiO_2$ | 1.479 | 144.5 |
| 27 | $Ta_2O_5$ | 2.299 | 84.2 |
| 28 | $SiO_2$ | 1.479 | 140.6 |
| 29 | $Ta_2O_5$ | 2.299 | 85.7 |
| 30 | $SiO_2$ | 1.479 | 146.8 |
| 31 | $Ta_2O_5$ | 2.299 | 72.9 |
| 32 | $SiO_2$ | 1.479 | 63.3 |
| Substrate | Air | 1.000 | — |

At that time, for light entering at an incident angle of $\epsilon=45°$, the effective azimuth angle $\theta_1$ of the first phase difference layer 52a is 85.6° for light of wavelength 780 nm, 85.6° for light of wavelength 660 nm, and 85.6° for light of wavelength 405 nm. Then, the effective phase difference $\Gamma_1$ of the first phase difference layer 52a is −85.8° for light of wavelength 780 nm, −103.1° for light of wavelength 660 nm, and −201.3° for light of wavelength 405 nm.

Further, the effective azimuth angle $\theta_2$ of the second phase difference layer 52b is 17.6° for light of wavelength 780 nm, 17.5° for light of wavelength 660 nm, and 17.4° for light of wavelength 405 nm. Then, the effective phase difference $\Gamma_2$ of the second phase difference layer 52b is −76.3° for light of wavelength 780 nm, −92.0° for light of wavelength 660 nm, and −181.1° for light of wavelength 405 nm. Further, the phase difference $\psi_r$ at the time of reflection by the reflection layer 53 is −179.4° for light of wavelength 780 nm and 179.6° for light of wavelength 660 nm. Furthermore, the phase difference $\psi_t$ at the time of transmission through the reflection layer 53 is −2.3° for light of wavelength 405 nm.

Figure 21A:
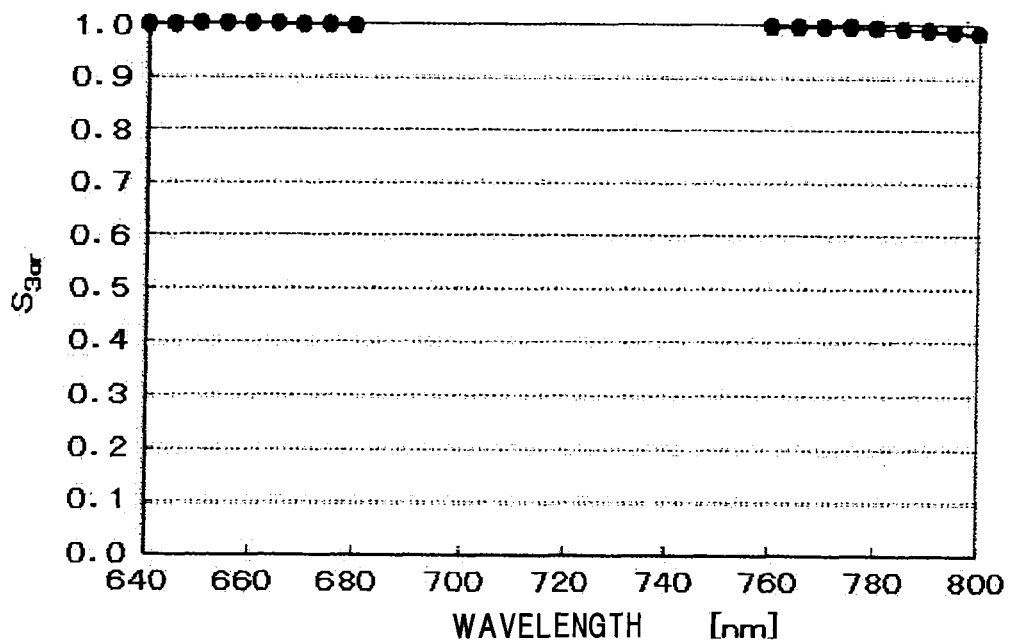
FIG. 21A is a graph showing the wavelength dependence (640 to 800 nm) of $S_{3or}$ component of the Stokes parameter in a reflection type wave plate according to Example 21.
Figure 21B:
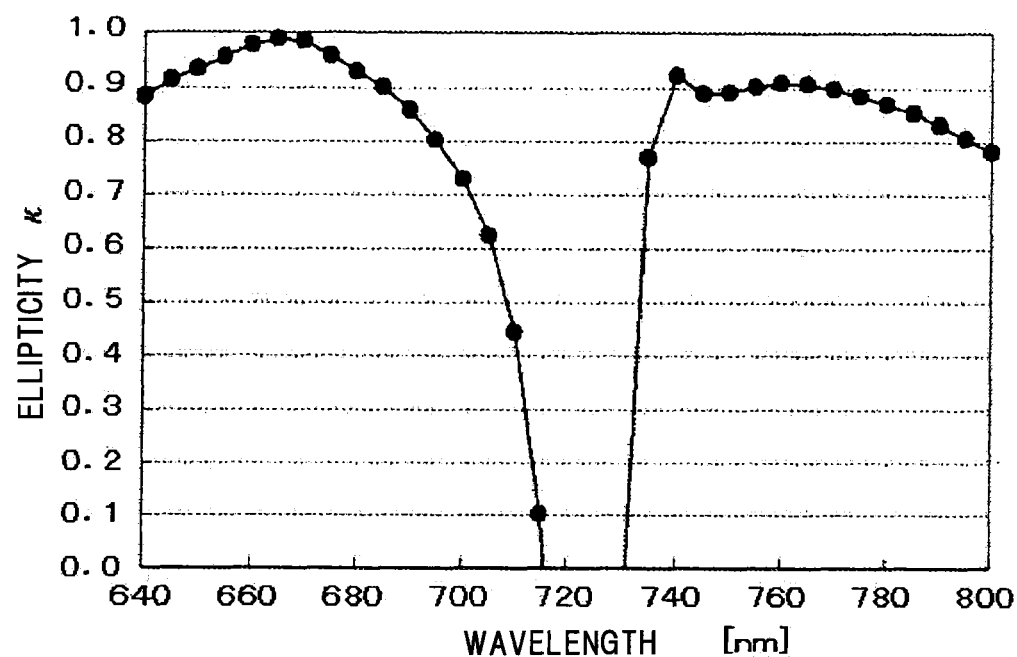
FIG. 21B is a graph showing the wavelength dependence (640 to 800 nm) of the ellipticity κ of light exiting a reflection type wave plate according to Example 21.
Figure 21C:
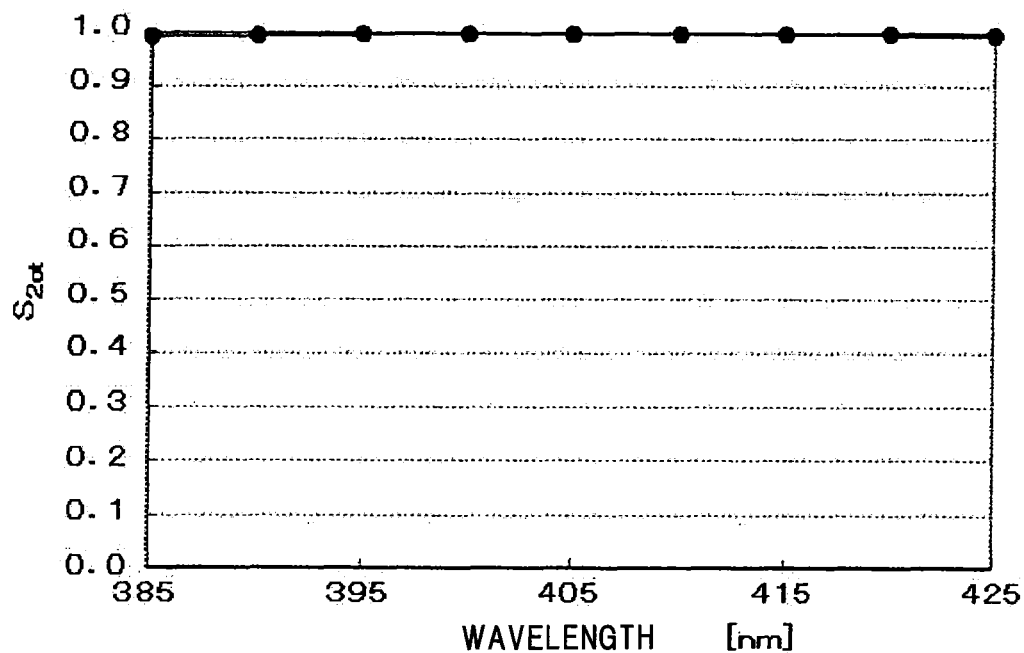
FIG. 21C is a graph showing the wavelength dependence (385 to 425 nm) of $S_{2ot}$ component of the Stokes parameter in a reflection type wave plate according to Example 21.
Figure 21D:
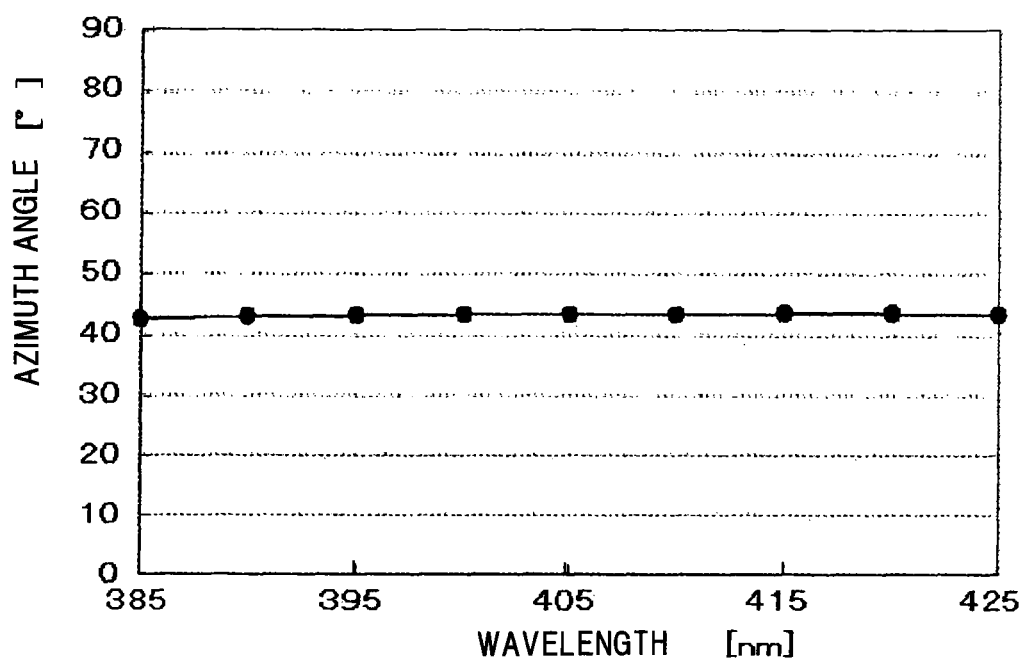
FIG. 21D is a graph showing the wavelength dependence (385 to 425 nm) of the azimuth angle of light exiting a reflection type wave plate according to Example 21.

Further, FIGS. 21A to 21D show the results of calculation of $S_{3o}$ of the light of each wavelength band and the ellipticity κ or the azimuth angle (of the transmitted light) with this condition. First, FIG. 21A shows $S_{3o}$ (=$S_{3or}$) for light of 780-nm wavelength band and light of 660-nm wavelength band calculated on the basis of Formula (11a). FIG. 21B shows the result of characteristics of the ellipticity κ of the light 16a in FIG. 5. Further, FIG. 21C shows $S_{2o}$ (=$S_{2ot}$) for the light of 405-nm wavelength band. FIG. 21D shows the result of the azimuth angle of the light 57 in FIG. 5. As seen from this result, the light of 780-nm wavelength band and 660-nm wavelength band reflected by the reflection type wave plate according to the present example exits in the form of circularly polarized light having an ellipticity κ of 0.77 or greater. Then, the light of 405-nm wavelength band transmitted through the reflection type wave plate according to the present example, when regarded as elliptically polarized light, has the direction of major axis of ellipse falling within the range from 40° to 50°. Accordingly, this exiting light is approximately linearly polarized.

Example 22

In the present example, a situation is considered that the reflection type wave plate 50 in Example 21 is employed and that a reflection mirror for reflecting light of 405-nm wavelength band is provided in the direction of travel of the light of 405-nm wavelength band that travels straight and is transmitted through the reflection type wave plate 50 in the form of linearly polarized light. In particular, the positional relation between the reflection type wave plate 50 and the reflection mirror 205 in the optical head device 200 is considered. Further, in the reflection mirror, a multilayer film formed by alternately stacking $Ta_2O_5$ and $SiO_2$ onto a transparent substrate into a predetermined film thickness as described in Table 14 is arranged at an angle of 45° relative to the direction of travel of the light. Here, such a design is adopted that a phase difference of −90° is generated for the entering light of 405-nm wavelength band.

TABLE 14

| Layer number | Material | Refractive index | Film thickness [nm] |
|---|---|---|---|
| Incident medium | Air | 1.000 | — |
| 1 | $SiO_2$ | 1.479 | 89.4 |
| 2 | $Ta_2O_5$ | 2.299 | 149.0 |
| 3 | $SiO_2$ | 1.479 | 19.7 |
| 4 | $Ta_2O_5$ | 2.299 | 214.8 |

TABLE 14-continued

| Layer number | Material | Refractive index | Film thickness [nm] |
|---|---|---|---|
| 5 | SiO$_2$ | 1.479 | 48.9 |
| 6 | Ta$_2$O$_5$ | 2.299 | 218.5 |
| 7 | SiO$_2$ | 1.479 | 50.0 |
| 8 | Ta$_2$O$_5$ | 2.299 | 29.2 |
| 9 | SiO$_2$ | 1.479 | 61.9 |
| 10 | Ta$_2$O$_5$ | 2.299 | 131.8 |
| 11 | SiO$_2$ | 1.479 | 60.6 |
| 12 | Ta$_2$O$_5$ | 2.299 | 130.4 |
| 13 | SiO$_2$ | 1.479 | 63.8 |
| 14 | Ta$_2$O$_5$ | 2.299 | 36.7 |
| 15 | SiO$_2$ | 1.479 | 69.2 |
| 16 | Ta$_2$O$_5$ | 2.299 | 40.0 |
| 17 | SiO$_2$ | 1.479 | 73.3 |
| 18 | Ta$_2$O$_5$ | 2.299 | 45.5 |
| 19 | SiO$_2$ | 1.479 | 73.9 |
| 20 | Ta$_2$O$_5$ | 2.299 | 48.5 |
| 21 | SiO$_2$ | 1.479 | 77.2 |
| 22 | Ta$_2$O$_5$ | 2.299 | 47.6 |
| 23 | SiO$_2$ | 1.479 | 78.4 |
| 24 | Ta$_2$O$_5$ | 2.299 | 47.7 |
| 25 | SiO$_2$ | 1.479 | 78.7 |
| 26 | Ta$_2$O$_5$ | 2.299 | 47.6 |
| 27 | SiO$_2$ | 1.479 | 78.7 |
| 28 | Ta$_2$O$_5$ | 2.299 | 47.5 |
| 29 | SiO$_2$ | 1.479 | 78.7 |
| 30 | Ta$_2$O$_5$ | 2.299 | 47.4 |
| 31 | SiO$_2$ | 1.479 | 396.8 |
| 32 | Ta$_2$O$_5$ | 2.299 | 47.7 |
| 33 | SiO$_2$ | 1.479 | 79.0 |
| 34 | Ta$_2$O$_5$ | 2.299 | 48.7 |
| Substrate | SiO$_2$ | 1.479 | — |

Figure 22:
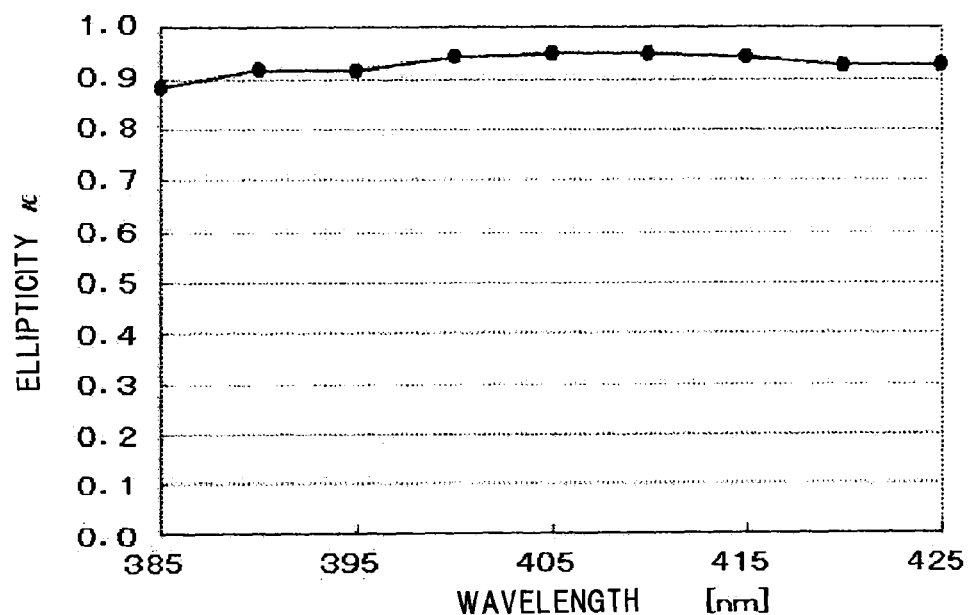
FIG. 22 is a graph showing the wavelength dependence of the ellipticity κ of light reflected by a reflection mirror according to Example 22.

The conditions of entering light are the same as those in Example 21. FIG. 22 shows the result of calculation of the ellipticity κ of light of 405-nm wavelength band with these conditions. As seen from this result, the light of each wavelength band reflected by or transmitted through the reflection type wave plate according to the present example exits in the form of circularly polarized light having an ellipticity κ of 0.88 or greater.

Example 23

The present example corresponds to the reflection type wave plate 60 according to the fifth embodiment. Then, a configuration is employed that the first phase difference layer 62a and the second phase difference layer 62b each having an optic axis aligned in the thickness direction are stacked in a manner that their optic axes intersect with each other. The first phase difference layer 62a and the second phase difference layer 62b are formed by the fabrication method according to Example 18, and then bonded with transparent adhesives in a manner that their liquid crystal polymer layers are opposite to each other and the directions of their slow axes are different from each other. In the present example, the reflection type wave plate has been designed such as to reflect entering light of 780-nm wavelength band, 660-nm wavelength band, and 405-nm wavelength band and bring the light into circularly polarized light.

Here, also in the present example, linearly polarized light parallel to the direction of p-polarization is projected in a state that the incident angle is ε=45° relative to the normal of the plane of the antireflection layer 11. In Example 23, as described in Table 7 in Example 15, an antireflection layer is employed that has Ta$_2$O$_5$ and SiO$_2$ formed alternately in a predetermined film thickness. Further, the first phase difference layer 62a has the characteristics that the azimuth angle Φ is −14.0° in the X-Y plane corresponding to the plane of the first phase difference layer 62a and that the phase difference Δ is −75.4° for light of wavelength 780 nm, −90.8° for light of wavelength 660 nm, and −178.0° for light of wavelength 405 nm. Further, the second phase difference layer 62b has the characteristics that the azimuth angle Φ is −81.9° in the X-Y plane corresponding to the plane of the second phase difference layer 62b and that the phase difference Δ is −46.6° for light of wavelength 780 nm, −56.1° for light of wavelength 660 nm, and −110.0° for light of wavelength 405 nm. Then, as described in Table 15, the reflection layer 63 is formed by alternately stacking Ta$_2$O$_5$ and SiO$_2$ into a multilayer film having a predetermined film thickness.

TABLE 15

| Layer number | Material | Refractive index | Film thickness [nm] |
|---|---|---|---|
| Incident medium | SiO$_2$ | 1.479 | — |
| 1 | Ta$_2$O$_5$ | 2.299 | 107.8 |
| 2 | SiO$_2$ | 1.479 | 31.5 |
| 3 | Ta$_2$O$_5$ | 2.299 | 17.9 |
| 4 | SiO$_2$ | 1.479 | 126.0 |
| 5 | Ta$_2$O$_5$ | 2.299 | 56.8 |
| 6 | SiO$_2$ | 1.479 | 69.5 |
| 7 | Ta$_2$O$_5$ | 2.299 | 34.0 |
| 8 | SiO$_2$ | 1.479 | 87.0 |
| 9 | Ta$_2$O$_5$ | 2.299 | 58.3 |
| 10 | SiO$_2$ | 1.479 | 71.6 |
| 11 | Ta$_2$O$_5$ | 2.299 | 37.9 |
| 12 | SiO$_2$ | 1.479 | 81.0 |
| 13 | Ta$_2$O$_5$ | 2.299 | 49.5 |
| 14 | SiO$_2$ | 1.479 | 74.4 |
| 15 | Ta$_2$O$_5$ | 2.299 | 38.8 |
| 16 | SiO$_2$ | 1.479 | 85.3 |
| 17 | Ta$_2$O$_5$ | 2.299 | 132.3 |
| 18 | SiO$_2$ | 1.479 | 101.8 |
| 19 | Ta$_2$O$_5$ | 2.299 | 115.2 |
| 20 | SiO$_2$ | 1.479 | 113.2 |
| 21 | Ta$_2$O$_5$ | 2.299 | 86.0 |
| 22 | SiO$_2$ | 1.479 | 143.9 |
| 23 | Ta$_2$O$_5$ | 2.299 | 82.4 |
| 24 | SiO$_2$ | 1.479 | 131.0 |
| 25 | Ta$_2$O$_5$ | 2.299 | 102.3 |
| 26 | SiO$_2$ | 1.479 | 123.6 |
| 27 | Ta$_2$O$_5$ | 2.299 | 85.2 |
| 28 | SiO$_2$ | 1.479 | 62.4 |
| 29 | Ta$_2$O$_5$ | 2.299 | 43.8 |
| 30 | SiO$_2$ | 1.479 | 68.7 |
| 31 | Ta$_2$O$_5$ | 2.299 | 4.5 |
| 32 | SiO$_2$ | 1.479 | 80.3 |
| 33 | Ta$_2$O$_5$ | 2.299 | 65.8 |
| 34 | SiO$_2$ | 1.479 | 169.8 |
| 35 | Ta$_2$O$_5$ | 2.299 | 70.0 |
| 36 | SiO$_2$ | 1.479 | 136.1 |
| 37 | Ta$_2$O$_5$ | 2.299 | 85.8 |
| 38 | SiO$_2$ | 1.479 | 119.1 |
| 39 | Ta$_2$O$_5$ | 2.299 | 97.6 |
| Substrate | Air | 1.000 | — |

At that time, for light entering at an incident angle of ε=45°, the effective azimuth angle θ$_1$ of the first phase difference layer 62a is −15.8° for light of wavelength 780 nm, −15.8° for light of wavelength 660 nm, and −15.7° for light of wavelength 405 nm. Then, the effective phase difference Γ$_1$ of the first phase difference layer 62a is −67.6° for light of wavelength 780 nm, −81.5° for light of wavelength 660 nm, and −160.6° for light of wavelength 405 nm.

Further, the effective azimuth angle θ$_2$ of the second phase difference layer 62b is −82.9° for light of wavelength 780 nm, −82.9° for light of wavelength 660 nm, and −82.8° for light of wavelength 405 nm. Then, the effective phase difference Γ$_2$ of the second phase difference layer 62b is −52.3° for light of wavelength 780 nm, −63.1° for light of wavelength 660 nm, and −123.0° for light of wavelength 405 nm. Further, the phase difference ψ$_r$ at the time of reflection by the reflection layer 63 is −179.4° for the light of wavelength 780 nm, 179.6° for the light of wavelength 660 nm, and 179.8° for the light of wavelength 405 nm.

Figure 23A:
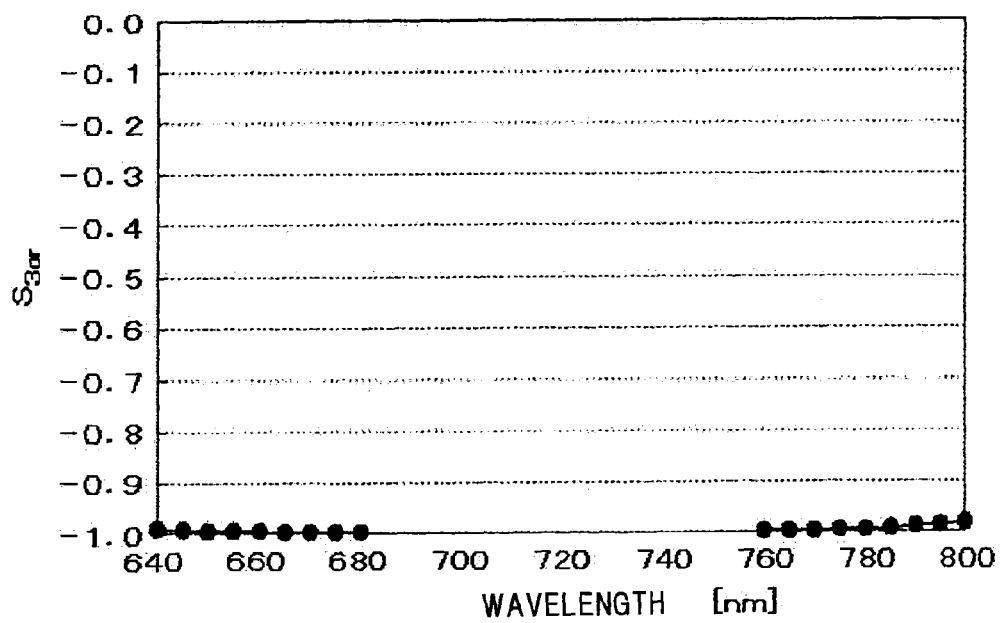
FIG. 23A is a graph showing the wavelength dependence (640 to 800 nm) of $S_{3or}$ component of the Stokes parameter in a reflection type wave plate according to Example 23.
Figure 23B:
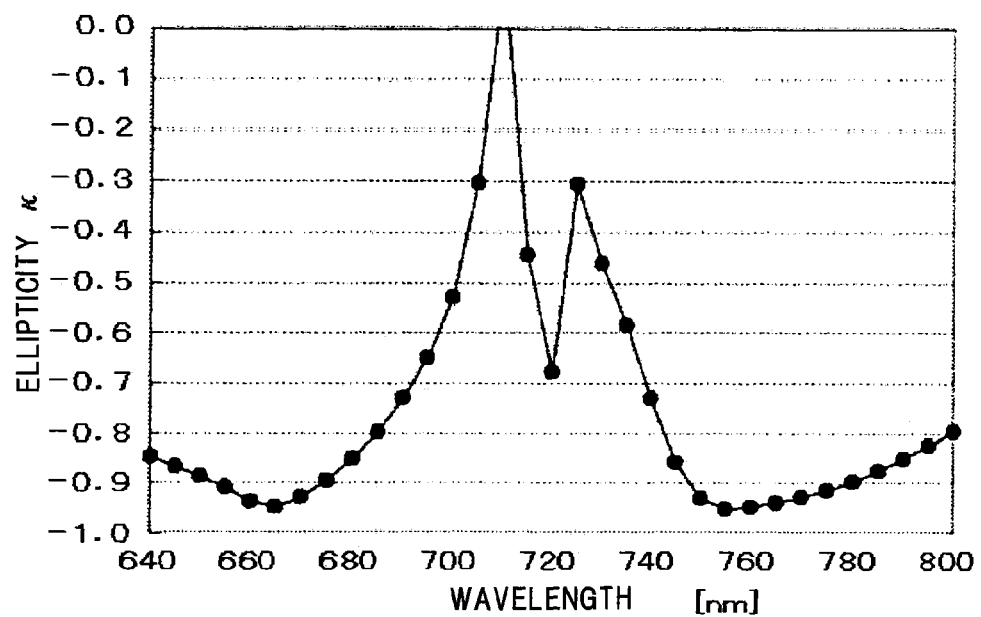
FIG. 23B is a graph showing the wavelength dependence (640 to 800 nm) of the ellipticity κ of light exiting a reflection type wave plate according to Example 23.
Figure 23C:
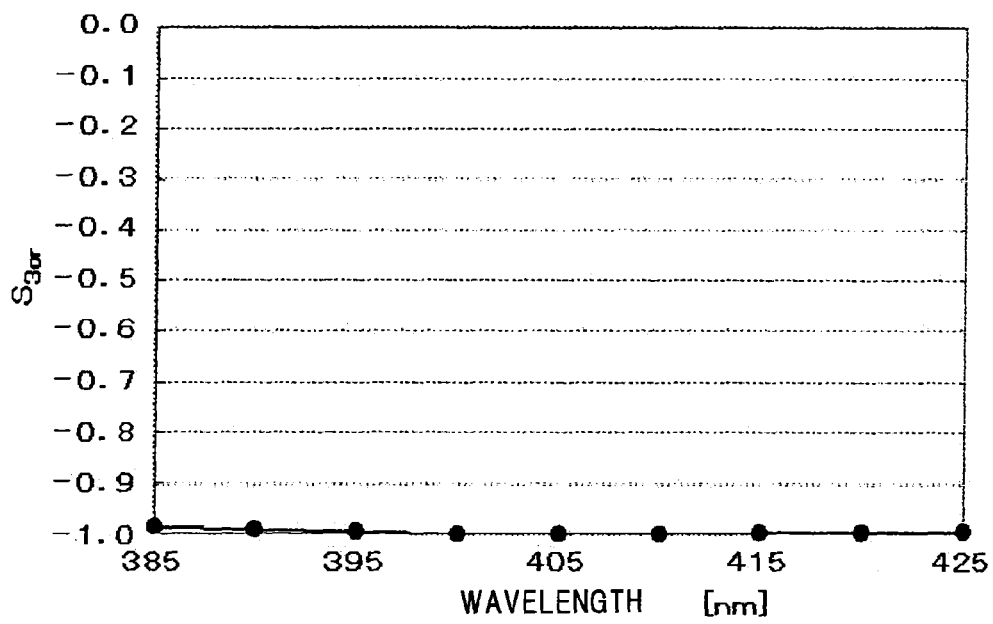
FIG. 23C is a graph showing the wavelength dependence (385 to 425 nm) of $S_{3ot}$ component of the Stokes parameter in a reflection type wave plate according to Example 23.
Figure 23D:
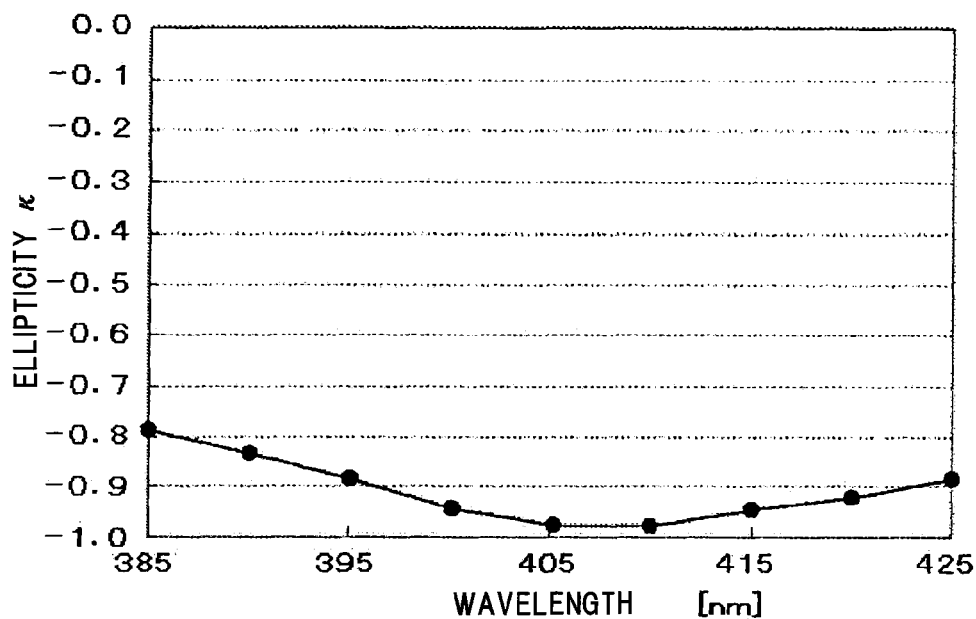
FIG. 23D is a graph showing the wavelength dependence (385 to 425 nm) of the ellipticity κ of light exiting a reflection type wave plate according to Example 23.

Further, FIGS. 23A to 23D show the results of calculation of $S_{3o}$ and the ellipticity κ of light of each wavelength band with these conditions. First, FIG. 23A shows $S_{3o}$ (=$S_{3or}$) for light of 780-nm wavelength band and light of 660-nm wavelength band calculated on the basis of Formula (15). FIG. 23B shows the result of characteristics of the ellipticity κ of the light of these wavelength. Further, FIG. 23C shows $S_{3o}$ (=$S_{3or}$) for light of 405-nm wavelength band calculated also on the basis of Formula (15). FIG. 23D shows the result of characteristics of the ellipticity κ of the light of 405-nm wavelength band. As seen from this result, the light of each wavelength band reflected by the reflection type wave plate according to the present example exits in the form of circularly polarized light having an ellipticity κ of 0.78 or greater.

Comparison Example

Figure 24A:
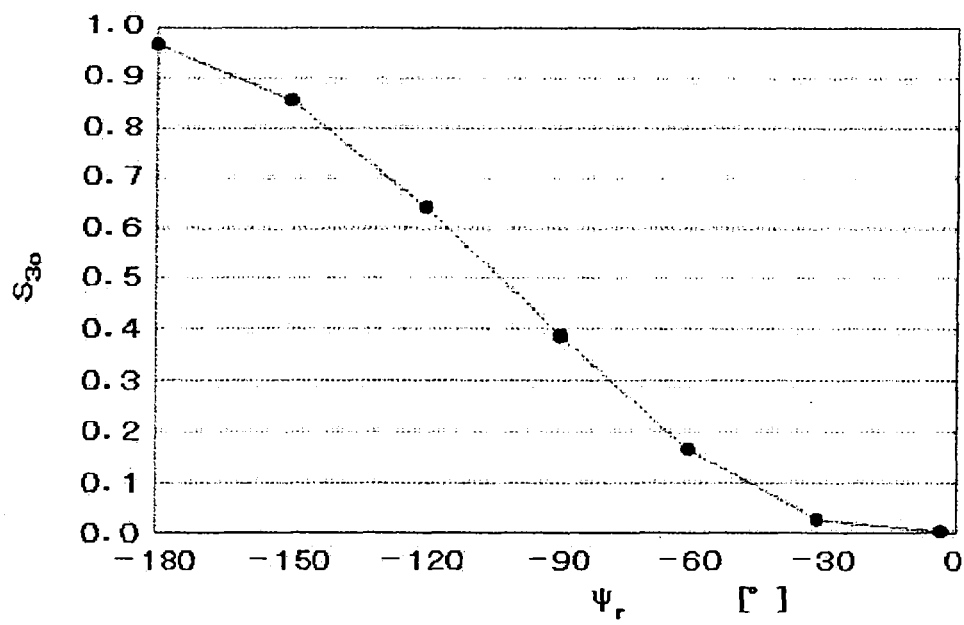
FIG. 24A is a graph showing the phase difference dependence in reflection in the $S_{3o}$ component of the Stokes parameter of a (½) wave plate according to a comparison example.

As a comparison example, in the configuration of the reflection type wave plate 10 in FIG. 1A, the optical characteristics were investigated with the following conditions. First, an antireflection layer is employed that has $Ta_2O_5$ and $SiO_2$ formed alternately in a predetermined film thickness as described in Table 1. The phase difference layer 12 has the characteristics that the azimuth angle Φ is π/4 [ rad ] in the X-Y plane corresponding to the plane of the phase difference layer 12 and that the phase difference Δ is 2π/7 [ rad ] for light of wavelength 660 nm. At that time, linearly polarized light of wavelength 405 nm is projected onto the reflection type wave plate in a state that the incident angle is ϵ=45° relative to the normal of the plane of the antireflection layer 11. FIG. 24A shows the result of calculation of the value of $S_{3o}$ of the Stokes parameter S obtained on the basis of Formula (3).

Figure 24B:
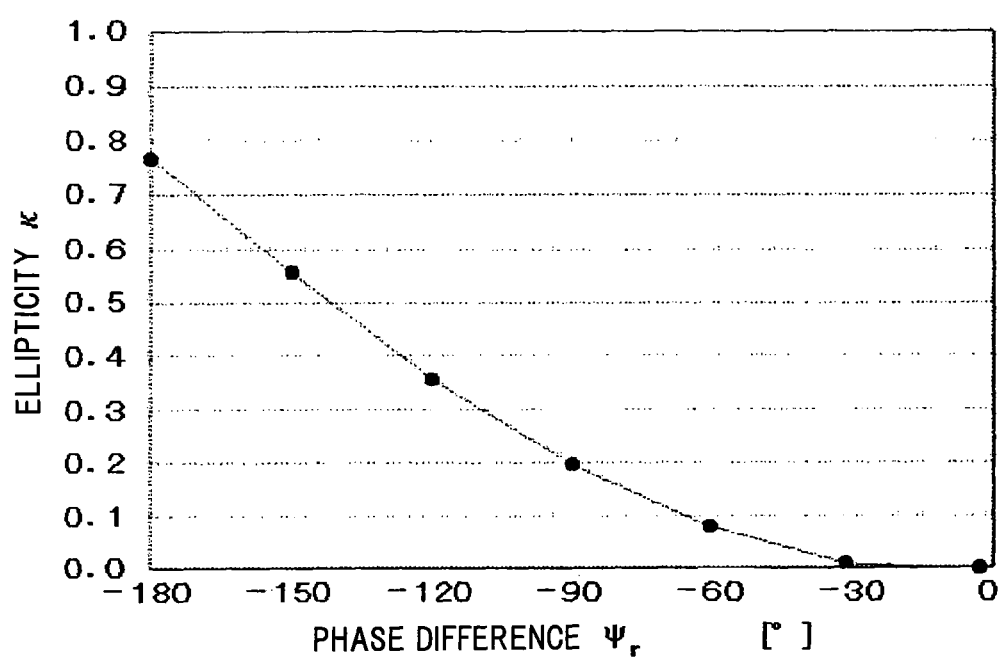
FIG. 24B is a graph showing the phase difference dependence in reflection in the ellipticity κ of a (½) wave plate according to a comparison example.

As seen from the result in FIG. 24A, when the phase difference $\psi_r$ generated by the reflection layer 13 in the comparison example varies, the value of $S_{3o}$ varies greatly. Further, in the comparison example, FIG. 24B shows the result of calculation of the ellipticity κ in the polarization state of the light of wavelength 405 nm exiting the reflection type wave plate with respect to the phase difference $\psi_r$ generated by the reflection layer 13. As seen from this result, the ellipticity κ exceeds 0.7 at the phase difference $\psi_r$=−180°. However, when other phase difference $\psi_r$ is set up, the ellipticity κ goes below 0.7 and hence the light reflected by the reflection type wave plate in the comparison example is not satisfactorily circularly polarized. Further, when the wavelength dependence of the ellipticity for the wavelength range of a predetermined band is taken into consideration, satisfactorily circularly polarized light is not obtained.

The present application has been described in detail with reference to particular embodiments. However, it is obvious for the person skilled in the art that without departing from the spirit and the scope of the present invention, various kinds of modifications and corrections may be added. The present application is based on a Japanese patent application (Japanese Laid-Open Patent Application No. 2009-241523) filed on Oct. 20, 2009. The contents thereof are incorporated herein by reference.

INDUSTRIAL APPLICABILITY

As described above, in the reflection type wave plate according to the present invention, one or plural kinds of light of different wavelengths are used and light entering from an oblique direction is reflected or alternatively reflected and transmitted so that its polarization state is changed and hence stably circularly polarized light exits especially for light of wavelength in a predetermined band. Further, in the optical head device employing this reflection type wave plate, the effects of a high efficiency of light utilization, size reduction, and stable recording/reproduction are obtained.

DESCRIPTION OF REFERENCE NUMERALS 10, 10a, 10b, 30, 40, 50, 60 Reflection type wave plate
11 Antireflection layer
12, 32, 42, 52, 62 Phase difference layer
12a Direction of optic axis of phase difference layer
12p Direction obtained by projecting direction of p-polarization of entering light
13, 33, 43, 53, 63 Reflection layer
14a 14b Transparent substrate
15a, 15b, 15c, 16a, 16b, 16c, 37, 47, 57 Light
21 Plane perpendicular to direction of travel of light 15b
21a Polarization state of light 15b (linear polarization)
22 Plane perpendicular to direction of travel of light 15c
22a Polarization state of light 15c (elliptical polarization)
23 Plane perpendicular to direction of travel of light 16c
23a Polarization state of light 16c (elliptical polarization)
23 Plane perpendicular to direction of travel of light 16b
23a Polarization state of light 16b (circular polarization)
42a, 52a, 62a First phase difference layer
42b, 52b, 62b Second phase difference layer
100, 200, 300 Optical head device
101, 201a, 201b Light source
102, 203 Polarization beam splitter
103, 204 Collimator lens
104, 206a, 206b, 301 Objective lens
105, 207a, 207b, 302 Optical disk
106 Photodetector
202 Dichroic prism
205 Reflection mirror

The invention claimed is:
1. A reflection type wave plate comprising:
a phase difference layer having birefringence; and
a reflection layer for reflecting entering light, wherein:
as for light entering the phase difference layer and the reflection layer in this order from an oblique direction relative to a normal direction of a plane of the phase difference layer, light having gone forward and backward through the phase difference layer exits in a changed polarization state; and
when the entering light has a wavelength $\lambda_1$ with a 20-nm bandwidth, the exiting light has an ellipticity of 0.7 or greater.
2. The reflection type wave plate according to claim 1, wherein
when the entering light has a wavelength $\lambda_2$ ($\lambda_1 \neq \lambda_2$) with a 20-nm bandwidth, the exiting light has an ellipticity of 0.7 or greater.
3. The reflection type wave plate according to claim 2, wherein
the wavelength $\lambda_1$ is 770 to 790 nm and the wavelength $\lambda_2$ is 650 to 670 nm.
4. The reflection type wave plate according to claim 1, wherein
an antireflection layer is provided on the light-entering side.
5. The reflection type wave plate according to claim 1, wherein
the entering light is linearly polarized.

6. A reflection type wave plate comprising:
a phase difference layer having birefringence; and
a reflection layer for reflecting entering light, wherein:
as for light entering the phase difference layer and the reflection layer in this order from an oblique direction relative to a normal direction of a plane of the phase difference layer, light having gone forward and backward through the phase difference layer exits in a changed polarization state; and
when the entering light is light of wavelength $\lambda_1$, light of wavelength $\lambda_2$, and light of wavelength $\lambda_3$ ($\lambda_1 \neq \lambda_2 \neq \lambda_3$), the exiting light has an ellipticity of 0.7 or greater.

7. The reflection type wave plate according to claim 6, wherein:
the phase difference plate has a first phase difference layer and a second phase difference layer whose slow axes are aligned when viewed from a thickness direction; and
these layers are stacked in a manner that the slow axis of the first phase difference layer and the slow axes of the second phase difference layer are different from each other.

8. The reflection type wave plate according to claim 6, wherein
the wavelength $\lambda_1$ is 780 nm, the wavelength $\lambda_2$ is 660 nm, and the wavelength $\lambda_3$ is 405 nm.

9. The reflection type wave plate according to claim 6, wherein
an antireflection layer is provided on the light-entering side.

10. The reflection type wave plate according to claim 6, wherein
the entering light is linearly polarized.

11. A reflection type wave plate comprising:
a phase difference layer having birefringence; and
a reflection layer for wavelength-selectively reflecting and transmitting the entering light, wherein
as for light entering the phase difference layer and the reflection layer in this order from an oblique direction relative to a normal direction of a plane of the phase difference layer, light reflected by the reflection layer so as to go forward and backward through the phase difference layer and then exit in a changed polarization state has an ellipticity of 0.7 or greater and light transmitted through the reflection layer has an ellipticity of 0.7 or greater.

12. The reflection type wave plate according to claim 11, wherein
when the entering light is light of wavelength $\lambda_1$, light of wavelength $\lambda_2$, and light of wavelength $\lambda_3$ ($\lambda_1 \neq \lambda_2 \neq \lambda_3$), the light of wavelength $\lambda_1$ and the light of wavelength $\lambda_2$ are reflected and the light of wavelength $\lambda_3$ is transmitted.

13. The reflection type wave plate according to claim 11, wherein:
the phase difference plate has a first phase difference layer and a second phase difference layer whose slow axes are aligned when viewed from a thickness direction; and
these layers are stacked in a manner that the slow axis of the first phase difference layer and the slow axes of the second phase difference layer are different from each other.

14. The reflection type wave plate according to claim 11, wherein
the wavelength $\lambda_1$ is 780 nm, the wavelength $\lambda_2$ is 660 nm, and the wavelength $\lambda_3$ is 405 nm.

15. A reflection type wave plate comprising:
a phase difference layer having birefringence; and
a reflection layer for wavelength-selectively reflecting and transmitting the entering light, wherein
as for light entering the phase difference layer and the reflection layer in this order from an oblique direction relative to a normal direction of a plane of the phase difference layer, light reflected by the reflection layer so as to go forward and backward through the phase difference layer and then exit in a changed polarization state has an ellipticity of 0.7 or greater and light transmitted through the reflection layer has elliptical polarization whose major axis of ellipse is in a direction of approximate ±45° relative to a direction of p-polarized light which is a light component in parallel to an incident plane.

16. The reflection type wave plate according to claim 15, wherein
when the entering light is light of wavelength $\lambda_1$, light of wavelength $\lambda_2$, and light of wavelength $\lambda_3$ ($\lambda_1 \neq \lambda_2 \neq \lambda_3$), the light of wavelength $\lambda_1$ and the light of wavelength $\lambda_2$ are reflected and the light of wavelength $\lambda_3$ is transmitted.

17. An optical head device comprising:
a light source;
an objective lens for focusing light emitted from the light source onto an optical disk;
a photodetector for detecting light reflected by the optical disk; and
a reflection type wave plate, provided in the optical path between the light source and the objective lens, including: a phase difference layer having birefringence; and a reflection layer for reflecting entering light, wherein:
as for light entering the phase difference layer and the reflection layer in this order from an oblique direction relative to a normal direction of a plane of the phase difference layer, light having gone forward and backward through the phase difference layer exits in a changed polarization state; and
when the entering light has a wavelength $\lambda_1$ with a 20-nm bandwidth, the exiting light has an ellipticity of 0.7 or greater.

18. The optical head device according to claim 17, wherein:
the light source emits plural kinds of light of different wavelengths; and
the reflection type wave plate and a reflection mirror are provided in the optical path between the light source and the objective lens.

19. The optical head device according to claim 18, wherein
the reflection mirror reflects the entering light without changing the phase, or alternatively reflects the light with changing the phase by an integral multiple of 180°.

20. The optical head device according to claim 18, wherein
the reflection mirror brings entering light, having elliptical polarization whose major axis of ellipse is in a direction of approximate ±45° relative to a direction of p-polarized light which is a light component in parallel to an incident plane, into a polarization state of ellipticity of 0.7 or greater.

* * * * *